(12) United States Patent
Kleiner et al.

(10) Patent No.: US 10,310,507 B2
(45) Date of Patent: Jun. 4, 2019

(54) SYSTEMS AND METHODS FOR CONFIGURABLE OPERATION OF A ROBOT BASED ON AREA CLASSIFICATION

(71) Applicant: iRobot Corporation, Bedford, MA (US)

(72) Inventors: Alexander D. Kleiner, Pasadena, CA (US); Mario E. Munich, La Canada, CA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 15/943,083

(22) Filed: Apr. 2, 2018

(65) Prior Publication Data

US 2018/0284792 A1 Oct. 4, 2018

Related U.S. Application Data

(63) Continuation of application No. 15/704,814, filed on Sep. 14, 2017, now Pat. No. 10,168,709.
(Continued)

(51) Int. Cl.
*G05D 1/00* (2006.01)
*G05D 1/02* (2006.01)
(Continued)

(52) U.S. Cl.
CPC .......... *G05D 1/0219* (2013.01); *A47L 9/0488* (2013.01); *A47L 9/2852* (2013.01);
(Continued)

(58) Field of Classification Search
CPC ............. A47L 11/4011; A47L 2201/04; A47L 2201/06; A47L 9/0488; A47L 9/2852;
(Continued)

(56) References Cited

U.S. PATENT DOCUMENTS 6,389,329 B1 5/2002 Colens
6,532,404 B2 3/2003 Colens
(Continued)

FOREIGN PATENT DOCUMENTS

EP 2804065 11/2014

OTHER PUBLICATIONS

Diosi et al. "Interactive SLAM using Laser and Advanced Sonar" Proceedings of the 2005 IEEE International Conference on Robotics and Automation (pp. 1103-1108) (Apr. 2005).
(Continued)

*Primary Examiner* — Jerrah Edwards
(74) *Attorney, Agent, or Firm* — Myers Bigel, P.A.

(57) ABSTRACT

A method of operating a mobile robot includes generating a segmentation map defining respective regions of a surface based on occupancy data that is collected by a mobile robot responsive to navigation of the surface, identifying sub-regions of at least one of the respective regions as non-clutter and clutter areas, and computing a coverage pattern based on identification of the sub-regions. The coverage pattern indicates a sequence for navigation of the non-clutter and clutter areas, and is provided to the mobile robot. Responsive to the coverage pattern, the mobile robot sequentially navigates the non-clutter and clutter areas of the at least one of the respective regions of the surface in the sequence indicated by the coverage pattern. Related methods, computing devices, and computer program products are also discussed.

22 Claims, 38 Drawing Sheets

Related U.S. Application Data

(60) Provisional application No. 62/394,638, filed on Sep. 14, 2016.

(51) Int. Cl.
  *A47L 9/04* (2006.01)
  *A47L 9/28* (2006.01)
  *A47L 11/40* (2006.01)

(52) U.S. Cl.
  CPC .......... *A47L 9/2857* (2013.01); *A47L 9/2894* (2013.01); *A47L 11/4011* (2013.01); *G05D 1/0016* (2013.01); *G05D 1/0044* (2013.01); *G05D 1/0274* (2013.01); *A47L 2201/04* (2013.01); *G05D 2201/0203* (2013.01); *Y10S 901/01* (2013.01)

(58) Field of Classification Search
  CPC ... A47L 9/2857; A47L 9/2894; G05D 1/0219; G05D 1/0251; G05D 1/0228; G05D 1/0274; G05D 1/0285; G05D 2201/0203; G05D 2201/0215; G05D 2201/0208; Y10S 901/01; A01D 2101/00; A01D 34/008; B25J 5/007; B25J 9/0081; B25J 9/1674
  See application file for complete search history.

(56) References Cited

U.S. PATENT DOCUMENTS

| | | | |
|---|---|---|---|
| 6,594,844 B2 | 7/2003 | Jones | |
| 6,690,134 B1 | 2/2004 | Jones et al. | |
| 6,781,338 B2 | 8/2004 | Jones et al. | |
| 6,809,490 B2 | 10/2004 | Jones et al. | |
| 6,965,209 B2 | 11/2005 | Jones et al. | |
| 7,155,308 B2 | 12/2006 | Jones | |
| 7,173,391 B2 | 2/2007 | Jones et al. | |
| 7,196,487 B2 | 3/2007 | Jones et al. | |
| 7,388,343 B2 | 6/2008 | Jones et al. | |
| 7,389,156 B2 | 6/2008 | Ziegler et al. | |
| 7,448,113 B2 | 11/2008 | Jones et al. | |
| 7,571,511 B2 | 8/2009 | Jones et al. | |
| 7,636,982 B2 | 12/2009 | Jones et al. | |
| 7,761,954 B2 | 7/2010 | Ziegler et al. | |
| 9,220,386 B2 | 12/2015 | Gilbert, Jr. et al. | |
| 9,332,691 B2 * | 5/2016 | Fukuda | A01D 34/008 |
| 9,357,893 B2 * | 6/2016 | Lee | A47L 9/2894 |
| 9,380,922 B2 * | 7/2016 | Duffley | G05D 1/0016 |
| 2002/0016649 A1 | 2/2002 | Jones | |
| 2002/0120364 A1 | 8/2002 | Colens | |
| 2003/0025472 A1 | 2/2003 | Jones et al. | |
| 2004/0020000 A1 | 2/2004 | Jones | |
| 2004/0049877 A1 | 3/2004 | Jones et al. | |
| 2004/0187457 A1 | 9/2004 | Colens | |
| 2004/0207355 A1 | 10/2004 | Jones et al. | |
| 2005/0067994 A1 | 3/2005 | Jones et al. | |
| 2005/0204717 A1 | 9/2005 | Colens | |
| 2007/0266508 A1 | 11/2007 | Jones et al. | |
| 2007/0271003 A1 | 11/2007 | Bang et al. | |
| 2008/0140255 A1 | 6/2008 | Ziegler et al. | |
| 2008/0155768 A1 | 7/2008 | Ziegler et al. | |
| 2008/0307590 A1 | 12/2008 | Jones et al. | |
| 2009/0182464 A1 * | 7/2009 | Myeong | G05D 1/0246 701/25 |
| 2010/0049365 A1 | 2/2010 | Jones et al. | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2011/0194755 A1 | 8/2011 | Jeong et al. | |
| 2011/0264305 A1 | 10/2011 | Choe et al. | |
| 2012/0169497 A1 | 7/2012 | Schnittman et al. | |
| 2014/0071240 A1 | 3/2014 | Chen et al. | |
| 2014/0124004 A1 | 5/2014 | Rosenstein et al. | |
| 2014/0207280 A1 * | 7/2014 | Duffley | G05D 1/0016 700/257 |
| 2014/0207281 A1 | 7/2014 | Angle et al. | |
| 2014/0343783 A1 * | 11/2014 | Lee | A47L 9/2894 701/25 |
| 2015/0296707 A1 * | 10/2015 | Fukuda | A01D 34/008 701/25 |
| 2016/0037983 A1 | 2/2016 | Hillen et al. | |
| 2016/0103451 A1 | 4/2016 | Vicenti | |
| 2017/0010623 A1 | 1/2017 | Tang et al. | |
| 2017/0192435 A1 | 7/2017 | Bakhishev et al. | |
| 2017/0215680 A1 | 8/2017 | Chang | |
| 2017/0273527 A1 | 9/2017 | Han et al. | |

OTHER PUBLICATIONS

Notification of Transmittal of the International Search Report and the Written Opinion of the International Searching Authority, or the Declaration, in corresponding PCT Application No. PCT/US2017/051523 (20 pages) (dated Dec. 22, 2017).

\* cited by examiner

SYSTEMS AND METHODS FOR CONFIGURABLE OPERATION OF A ROBOT BASED ON AREA CLASSIFICATION

CLAIM OF PRIORITY

This application is a continuation application of and claims priority from U.S. patent application Ser. No. 15/704,814, filed Sep. 14, 2017, which claims priority from U.S. Provisional Patent Application No. 62/394,638, entitled "SYSTEMS AND METHODS FOR CONFIGURABLE OPERATION OF A ROBOT USING A REMOTE USER INTERFACE" and filed Sep. 14, 2016, in the United States Patent and Trademark Office, the disclosures of each are incorporated by reference herein.

FIELD

The present invention relates generally to robotic systems and, more specifically, to configuring the operation of autonomous robots.

BACKGROUND

Automated robots and robotic devices are used to perform tasks traditionally considered mundane, time-consuming, or dangerous. For example, substantially autonomous robots may be used to provide coverage of a surface to perform operations such as cleaning, performing surface treatments and/or painting. However, from a user's perspective, autonomous robot missions may be unpredictable leaving the user with a lack of understanding regarding which area the robot will move to next. Additionally, the user may lack any information and/or input regarding a mission.

SUMMARY

Some embodiments of the present invention include a computing device including a processor and a memory coupled to the processor, where the memory includes a non-transitory computer-readable storage medium storing computer-readable program code therein. The computer-readable program code is executable by the processor to perform operations including generating a segmentation map defining respective regions of a surface based on occupancy data that is collected by a mobile robot responsive to navigation of the surface, classifying or otherwise identifying sub-regions of at least one of the respective regions as first and second areas (such as non-clutter and clutter areas) based on differences therein, and computing a coverage pattern based on identification of the sub-regions. The coverage pattern indicates a sequence for navigation of the first and second areas (such as the non-clutter and clutter areas), and is provided to the mobile robot. Responsive to the coverage pattern, the mobile robot sequentially navigates the first and second areas (for example, the non-clutter and clutter areas) of the at least one of the respective regions of the surface in the sequence indicated by the coverage pattern.

Some embodiments of the present invention include a method of operating a mobile robot. The method includes executing, by at least one processor, computer readable instructions stored in a non-transitory computer readable storage medium to perform operations including generating a segmentation map defining respective regions of a surface based on occupancy data that is collected by the mobile robot responsive to navigation of the surface, classifying or otherwise identifying sub-regions of at least one of the respective regions as non-clutter and clutter areas, and computing a coverage pattern based on identification of the sub-regions. The coverage pattern indicates a sequence for navigation of the non-clutter and clutter areas, and is provided to the mobile robot. Responsive to the coverage pattern, the mobile robot sequentially navigates the non-clutter and clutter areas of the at least one of the respective regions of the surface in the sequence indicated by the coverage pattern.

Some embodiments of the present invention include a computer program product for operating a mobile robot. The computer program product includes a non-transitory computer readable medium having computer readable instructions stored therein, that, when executed by a processor, causes a processor to perform operations including generating a segmentation map defining respective regions of a surface based on occupancy data that is collected by the mobile robot responsive to navigation of the surface, classifying or otherwise identifying sub-regions of at least one of the respective regions as non-clutter and clutter areas, and computing a coverage pattern based on identification of the sub-regions. The coverage pattern indicates a sequence for navigation of the non-clutter and clutter areas, and is provided to the mobile robot. Responsive to the coverage pattern, the mobile robot sequentially navigates the non-clutter and clutter areas of the at least one of the respective regions of the surface in the sequence indicated by the coverage pattern.

In some embodiments, the computing device may be a component of the mobile robot, and the occupancy data may be detected by at least one sensor of the mobile robot. The operations may further include operating a drive of the mobile robot to sequentially navigate the non-clutter and clutter areas of the at least one of the respective regions of the surface in the sequence indicated by the coverage pattern.

In some embodiments, the computing device may be a component of a server communicatively coupled to the mobile robot. The operations may further include receiving the occupancy data from the mobile robot responsive to the navigation of the surface, and storing the segmentation map in a data store.

In some embodiments, the sequence may further include navigation of a perimeter of the surface, and the mobile robot may sequentially navigate the non-clutter area, the clutter area, and the perimeter of the surface in the sequence indicated by the coverage pattern.

In some embodiments, the coverage pattern may further indicate a rank direction for the non-clutter area. The rank direction may correspond to a dimension of the at least one of the respective regions that is longer than another dimension thereof, and the mobile robot may traverse the non-clutter area in the rank direction indicated by the coverage pattern.

In some embodiments, the respective regions defined by the segmentation map may correspond to respective rooms. The coverage pattern may further indicate an order of navigation of the respective rooms, and the mobile robot may sequentially navigate the non-clutter and clutter areas of one of the respective rooms in the sequence indicated by the coverage pattern before navigation of a next one of the respective rooms in the order indicated by the coverage pattern.

In some embodiments, computing the coverage pattern may further include determining a location on the surface for ending the navigation of the non-clutter area based on a proximity to the clutter area. Responsive to traversing the non-clutter area in the rank direction indicated by the coverage pattern, the mobile robot may end the navigation of the non-clutter area at the location having the proximity to the clutter area and may traverse the clutter area in a random pattern. Responsive to traversing the clutter area, the mobile robot may not traverse the non-clutter area in the rank direction before traversing at least one other of the sub-regions.

In some embodiments, the operations may further include providing the segmentation map to a user device. The user device may include a display or other user interface that is configured to display the segmentation map for viewing by a user. The operations may also include receiving, from the user device, a selection input responsive to providing the segmentation map thereto, and computing the coverage pattern based on the selection input.

In some embodiments, the selection input may include respective levels of cleaning for the at least one of the respective regions and/or the sub-regions thereof. The coverage pattern may be generated to indicate the respective levels of cleaning, and the mobile robot may execute a number of cleaning passes in navigating the at least one of the respective regions and/or the sub-regions thereof according to the respective levels of cleaning indicated by the coverage pattern.

In some embodiments, the selection input may include a user-defined boundary or label for one or more of the respective regions and/or sub-regions thereof. The coverage pattern may be generated to indicate the user-defined boundary or label, and the mobile robot may avoid navigation of the one or more of the respective regions and/or sub-regions thereof according to the user-defined boundary or label indicated by the coverage pattern.

In some embodiments, the operations may further include detecting respective flooring types of the sub-regions, and computing the coverage pattern may further include determining the sequence for navigation of the non-clutter and clutter areas based on the respective flooring types of the sub-regions corresponding thereto.

In some embodiments, the segmentation map may include data previously received from a user device and/or collected by the mobile robot responsive to at least one previous navigation of the surface.

In some embodiments, generating the segmentation map may include comparing the occupancy data collected by the mobile robot responsive to the navigation of the surface with the data collected by the mobile robot responsive to the at least one previous navigation of the surface, and updating the segmentation map to include commonalities indicated by the comparing and to exclude outliers indicated by the comparing.

In some embodiments, generating the segmentation map may include computing a binary image based on the occupancy data by applying a thresholding function, and performing a watershed transformation on the binary image to partition the binary image into the respective regions by applying a distance transform.

In some embodiments, the segmentation map may include simplified boundaries relative to actual boundaries indicated by the occupancy data collected by the mobile robot responsive to navigation of the surface.

In some embodiments, the operations may further include modifying the segmentation map having the simplified boundaries to indicate the clutter areas responsive to identification thereof prior to providing the segmentation map to a user device.

In some embodiments, identifying the sub-regions as non-clutter and clutter areas may further include accessing a data store comprising a plurality of patterns and identifications thereof, and classifying pixel regions within the sub-regions based on similarities to the plurality of patterns stored in the data store.

In some embodiments, one or more of the identifications of the plurality of patterns may be based on respective labeling inputs received from one or more user devices.

In some embodiments, identifying the sub-regions as non-clutter and clutter areas may further include classifying the pixel regions as static structures corresponding to walls or dynamic structures corresponding to clutter responsive to accessing the data store.

In some embodiments, identifying the sub-regions as non-clutter and clutter areas may further include identifying at least one boundary based on the occupancy data, and prior to accessing the data store, distinguishing the pixel regions as attached pixel regions that are adjacent the at least one boundary and detached pixel regions that are spaced apart from the at least one boundary.

Some embodiments of the present invention include methods for operating a mobile floor cleaning robot. Methods may include generating a segmentation map of a surface of an enclosed space using the mobile floor cleaning robot to identify a plurality of regions of the surface based on an occupancy grid that is generated by the mobile floor cleaning robot, sending the segmentation map of the surface to a user device that includes a display that is configured to display the segmentation map of the surface, and receiving a modified segmentation map from the user device based on inputs received from the user into the user device.

Some embodiments include performing a cleaning operation on the surface by sequentially performing the cleaning operation in individual ones of the plurality of regions, wherein the cleaning operation in a given one of the plurality of regions is completed before starting the cleaning operation in another of the plurality of regions.

In some embodiments, sending the segmentation map comprises wirelessly transmitting segmentation map data using at least one wireless communication link. Some embodiments provide that the at least one wireless communication link includes a local area network that provides communication between the user device and the mobile floor cleaning robot. In some embodiments, the at least one wireless communication link comprises a server that is configured to provide a persistent storage of the occupancy grid, the segmentation map and/or a modified segmentation map.

Some embodiments provide that the modified segmentation map identifies a subset of the plurality of regions to be cleaned, the subset including a portion of one of the plurality of regions, and the modified segmentation map identifies an order in which the plurality of regions are to be cleaned.

Some embodiments include performing a cleaning operation on the surface by performing the cleaning operation based on the modified segmentation map. In some embodiments, performing the cleaning operation based on the modified segmentation map comprises performing the cleaning operation on a subset of the plurality of regions. In some embodiments, performing the cleaning operation based on the modified segmentation map comprises performing the cleaning operation of ones of the plurality of regions each at a respective one of a plurality of levels that are selected by the user and in a rank direction that corresponds to a largest dimension of area in the respective region without obstacles, and the plurality of levels are associated with a number of cleaning passes the mobile floor cleaning robot makes in the ones of the plurality of regions.

In some embodiments, generating the occupancy grid by exploring the surface with the mobile floor cleaning robot comprises generating visual maps for localization of the mobile floor cleaning robot within the occupancy. Some embodiments provide that generating the visual maps for localization comprises detecting a feature using a plurality of images captured by the mobile floor cleaning robot, determining a feature description of the feature based on the image captured by the mobile floor cleaning robot, classifying the feature by performing a feature lookup in a feature database, determining a pose and position of the mobile floor cleaning robot that is associated with the plurality of images and generating a landmark in the occupancy grid that is associated with the pose and the position of the mobile floor cleaning robot. Some embodiments provide that the method further comprises augmenting the occupancy grid with updated landmark data that is generated over multiple missions of the mobile floor cleaning robot.

In some embodiments, the occupancy grid comprises a plurality of pixels each having a grayscale value that corresponds to whether the pixel location is occupied, traversable or unexplored. Some embodiments provide that generating the segmentation map of the surface using the occupancy grid to identify the plurality of regions of the surface comprises applying a median filter to the plurality of pixels that replaces each pixel value with a median value corresponding to pixels that surround the corresponding one of the plurality of pixels to generate a filtered occupancy grid, computing a binary image of the filtered occupancy grid by applying a thresholding function to the filtered occupancy grid, and performing a watershed transformation on the binary image to partition the binary image into the plurality of regions and vertices of the plurality of regions by applying a distance transform.

Some embodiments include performing a clutter removal operation on the plurality of regions in the binary image. In some embodiments, performing the clutter removal operation comprises identifying a boundary of the binary image, identifying and removing pixels that correspond to obstacles that are detached from the boundary of the binary image, and identifying and removing pixels that correspond to obstacles that are attached to the boundary region of the binary image. Some embodiments include merging the vertices of the plurality of regions to join the plurality of regions and to define corridors that are adjacent the plurality of regions.

Some embodiments include generating an automated floor coverage pattern that is based on the segmentation map that includes the plurality of regions, the automated floor coverage pattern including a selection of a rank direction corresponding to each of the plurality of regions. In some embodiments, the rank direction defines a dimension of the region that is longer than other dimensions of the region. Some embodiments provide that the rank direction defines a dimension of a portion of the respective region that is without obstacles and that is different from a dimension of the region that is longer than other dimensions of the region. In some embodiments, the automated floor coverage pattern includes, for each region of the plurality of regions, sequentially selecting an uncluttered portion of the region for coverage, a perimeter of the region for coverage and a cluttered portion of the region for coverage.

Some embodiments include sending the segmentation map of the surface to a remote computing device that is configured to communicate with the mobile floor cleaning robot and with a user mobile terminal that includes a display that is configured to display the segmentation map of the surface. In some embodiments, sending the segmentation map of the surface to the remote computing device is performed responsive to the generation of the segmentation map to maintain historical data corresponding to the mobile floor cleaning robot. Some embodiments include receiving a modified segmentation map from the remote computing device based on data sent from the mobile floor cleaning robot and/or inputs received from a user into the user device. Some embodiments include performing a cleaning operation on the surface by performing the cleaning operation based on the modified segmentation map. In some embodiments, the segmentation map includes operational data corresponding to the mobile floor cleaning robot. Some embodiments provide that the operational data comprises a cleaning function map that identifies debris collection that corresponds to a quantity of debris that is collected by the mobile floor cleaning robot as a function of location on the segmentation map.

Some embodiments of the present invention include a method of operating a user terminal, including executing, by at least one processor of the user terminal, computer readable instructions stored in a memory comprising a non-transitory computer readable storage medium to perform operations including receiving, via a transceiver of the user terminal, a segmentation map defining respective regions of a surface based on occupancy data that is collected by a mobile robot responsive to navigation of the surface. The segmentation map identifies sub-regions of at least one of the respective regions as clutter and non-clutter areas. The operations further include displaying, via a user interface of the user terminal, a graphical representation of the segmentation map, receiving, via the user interface, a selection input corresponding to one or more of the respective regions of the segmentation map and/or the sub-regions thereof, and transmitting, via the transceiver, a modified segmentation map including the selection input to the mobile robot.

Some embodiments of the present invention include computer program products that include a computer readable storage medium having computer readable program code embodied in the medium that when executed by a processor of a computer causes the computer to perform operations comprising receiving a segmentation map of a surface of an enclosed space, the segmentation map including a plurality of regions of the surface and generated by a mobile floor cleaning robot, displaying an image of the segmentation map on a display of the computer, receiving, via a user input device of the computer, a user input corresponding to the segmentation map of the surface, and sending, to the mobile floor cleaning robot, a modified segmentation map that is modified corresponding to the user input.

In some embodiments, receiving the user input comprises receiving the user input to modify an appearance of the image of the segmentation map. Some embodiments provide that the user input to modify the appearance of the image includes a user input to change an angle of perspective of the user relative to the image, a dimensional selection, a zoom selection, and a map feature selection. In some embodiments, the map feature selection comprises a heat map selection that causes the image of the segmentation map displayed to illustrate a level of historical debris collection as a function of location on the segmentation map. Some embodiments provide that the map feature selection comprises a clutter map selection that causes the image of the segmentation map displayed to selectively illustrate clutter on the segmentation map.

In some embodiments, receiving the user input comprises receiving a divide region input that is configured to cause one of the plurality of regions to divide into more than one region.

Some embodiments provide that receiving the user input comprises receiving a combine region input that is configured to cause more than one of the plurality of regions to combine into a single region.

In some embodiments, operations further comprise receiving, by the computer, a status communication that is generated by the mobile floor cleaning robot and responsive to receiving the status communication, displaying a message on the display of the computer. In some embodiments, the status communication comprises a progress update corresponding to a cleaning mission. Some embodiments provide that the progress update corresponding to the cleaning mission is displayed as an animated graphic of a cleaning operation on the image of the segmentation map. In some embodiments, the progress update is a substantially real-time progress update that includes a visual indication on the image of the segmentation map that is displayed.

In some embodiments, the status communication comprises an alert message that identifies a condition that is detected by the mobile floor cleaning robot. Some embodiments provide that the condition comprises an incomplete mission condition and the mobile floor cleaning robot is unable to complete a cleaning mission.

In some embodiments, the condition comprises an unexpected obstacle condition, the mobile floor cleaning robot detects an obstacle that is not included in the segmentation map, and a location of the unexpected obstacle is displayed on the image of the segmentation map.

Some embodiments provide that receiving the user input comprises receiving the user input that includes a cleaning mission instruction. In some embodiments, the cleaning mission instruction comprises a cleaning order instruction that includes an identification of which ones of the plurality of regions are to be cleaned in a given mission and a cleaning order corresponding to identified ones of the plurality of regions. In some embodiments, the cleaning mission instruction includes a first cleaning mission instruction that identifies a first selection of the plurality of regions to be cleaned and a second cleaning mission that identifies a second selection of the plurality of regions to be cleaned that is different from the first selection of the plurality of regions. Some embodiments provide that the first cleaning mission instruction includes a first scheduled time and the second cleaning mission includes a second scheduled time that is different from the first scheduled time.

In some embodiments, the cleaning mission instruction comprises a first cleaning level for a first region of the plurality of regions and a second cleaning level that is different from the first cleaning level for a second region of the plurality of regions, the first cleaning level identifies a first quantity of times that the mobile floor cleaning robot cleans the first region, and the second cleaning level identifies a second quantity of times that the mobile floor cleaning robot cleans the second region.

In some embodiments, the cleaning mission instruction comprises an identification of a portion of the occupancy floor space that is not to be cleaned by the mobile floor cleaning robot. Some embodiments provide that the identification of the portion of the occupancy floor space that is not to be cleaned by the mobile floor cleaning robot is persistent. In some embodiments, the identification of the portion of the occupancy floor space that is not to be cleaned by the mobile floor cleaning robot applies to a single cleaning mission.

Some embodiments provide that the cleaning mission instruction comprises a primary cleaning direction for each of the plurality of regions that identifies a cleaning direction that the mobile floor cleaning robot cleans in obstacle free portions of a cleaning operation.

In some embodiments, receiving the user input comprises receiving a user preference data input that includes a request for user preference data and operations further comprise displaying user preference data. Some embodiments provide that displaying user preference data comprises displaying historical user preference data and/or user preference data that corresponds to a single cleaning mission.

Some embodiments provide that receiving the user input comprises receiving a robot team configuration input that includes a first cleaning mission instruction corresponding to a first mobile floor cleaning robot and a second cleaning mission corresponding to a second mobile floor cleaning robot. In some embodiments, the first and second cleaning missions correspond to the segmentation map of the surface of the occupancy. Some embodiments provide that the first and second cleaning missions correspond to different segmentation maps of different portions of the occupancy. In some embodiments, the first mobile floor cleaning robot performs a first type of cleaning operation and the second mobile floor cleaning robot performs a second type of cleaning operation.

Some embodiments provide that the computer is a hand-held mobile terminal and the display is a touch-screen display. Some embodiments provide that the operations further comprise generating a graphical user interface via the touch-screen display and receiving the user input via the user input device comprises receiving the user input via the graphical user interface using the touch-screen.

In some embodiments, sending the modified segmentation map to the mobile floor cleaning robot comprises sending the modified segmentation map to a remote server that is configured to provide a persistent storage the modified segmentation map.

Some embodiments of the present invention include a robot management node comprising a processor and a memory coupled to the processor and comprising computer readable program code that when executed by the processor causes the processor to perform operations. The operations include receiving a segmentation map of a surface of an enclosed space from a robot, the segmentation map identifying a plurality of regions of the surface based occupancy data that is collected by the robot and storing the segmentation map of the surface of the occupancy in a data store that is associated with the robot.

In some embodiments, operations further comprise receiving user input data from a user device that receives a user input corresponding to the segmentation map. In some embodiments, the segmentation map is modified based on the user input data to generate a modified segmentation map. In some embodiments, operations further include sending the modified segmentation map based on the user input data and the segmentation map to the robot that is operable to perform a cleaning mission responsive to the modified segmentation map.

In some embodiments, receiving the segmentation map from the robot comprises receiving multiple segmentation maps that are generated by the robot during multiple cleaning missions, the segmentation map is updated and/or augmented by later received segmentation maps, and storing the segmentation map comprises storing the multiple segmentation maps to generate historical segmentation map data including the modified segmentation map.

Some embodiments provide that the modified segmentation map identifies a subset of the plurality of regions to be cleaned, the subset including a portion of one of the plurality of regions, and the modified segmentation map identifies an order in which the plurality of regions are to be cleaned.

Some embodiments provide that the cleaning mission includes performing a cleaning operation of ones of the plurality of regions each at a respective one of a plurality of levels that are selected by the user and in a rank direction that corresponds to a largest dimension of area in the respective region without obstacles and the plurality of levels are associated with a number of cleaning passes the robot makes in the ones of the plurality of regions.

In some embodiments, the rank direction defines a dimension of the region that is longer than other dimensions of the region.

Some embodiments provide that the rank direction defines a dimension of a portion of the respective region that is without obstacles and that is different from a dimension of the region that is longer than other dimensions of the region.

In some embodiments, the segmentation map includes operational data corresponding to the robot. Some embodiments provide that the operational data comprises a cleaning function map that identifies debris collection that corresponds to a quantity of debris that is collected by the robot as a function of location on the segmentation map. In some embodiments, the operational data comprises a cleaning function map that identifies a quantity of passes that are performed by the robot as a function of location on the segmentation map.

In some embodiments, receiving user input data comprises receiving a robot team configuration input that includes a first cleaning mission instruction corresponding to a robot and a second cleaning mission corresponding to a second robot.

Some embodiments provide that the processer and the memory are included in a cloud-based server that is remote from the robot and the occupancy.

Some embodiments are directed to an electronic device that is operable to performed operations described herein.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

Further features, advantages and details of the present invention will be appreciated by those of ordinary skill in the art from a reading of the figures and the detailed description of the embodiments that follow, such description being merely illustrative of the present invention. Other methods, devices, and computer program products according to embodiments will be or become apparent to one with skill in the art upon review of the following drawings and detailed description. It is intended that all such additional methods, devices, and computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Aspects of the present invention are illustrated by way of example and are not limited by the accompanying drawings. In the drawings

DETAILED DESCRIPTION OF EMBODIMENTS

Figure 1:
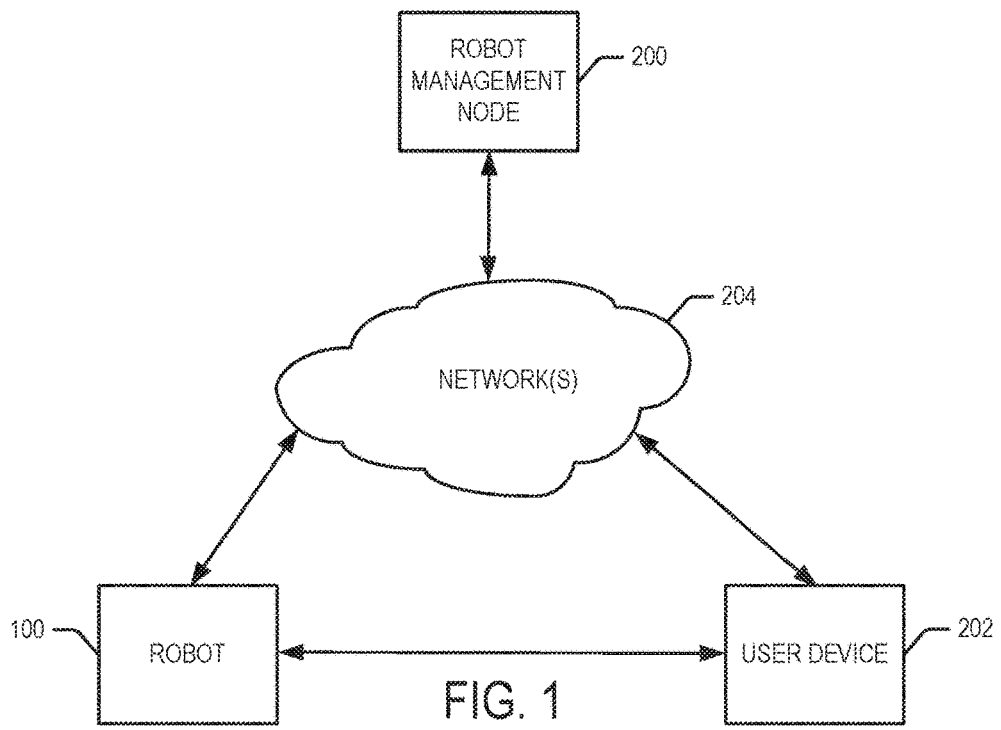
FIG. 1 is a block diagram illustrating a system of devices that may be used to provide robot management according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under," "below," "lower," "over," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

A "mobile robot" may refer to any device including a processor, memory, and drive system for navigating variable environment conditions and making autonomous decisions based on a plurality of sensor inputs. Mobile robots as described herein, may include robot cleaners (such as iRobot® ROOMBA®, BRAAVA®, and/or BRAAVA Jet™ cleaners). A "communication signal" may refer to any signal transmitted by a network-enabled electronic device. Such electronic devices may include a processor, memory, and a transmitter and/or receiver for communication via a wireless personal, local, and/or wide area network, and may include, but are not limited to, Internet-of-Things (IoT) devices. Wireless communication signals may include radio frequency signals, including but not limited to Wi-Fi signals, Bluetooth signals, and/or optical signals.

As used herein, a "wireless communication device" includes, but is not limited to, a device that is configured to receive/transmit communication signals via a wireless interface with, for example, a cellular network, a wireless local area network (WLAN), a digital television network such as a DVB-H network, a satellite network, an AM/FM broadcast transmitter, and/or another communication terminal. A wireless communication device may be referred to as a "wireless communication terminal," a "wireless terminal" and/or a "mobile terminal." Examples of wireless communication devices include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radio transceiver, including WLAN routers and the like.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a system of devices that may be used to provide robot management according to some embodiments of the present invention. Some embodiments provide that systems and/or operations disclosed herein may include a robot management node 200 that may be communicatively coupled to one or more robots 100 and/or one or more user devices 202 via one or more wired and/or wireless communication and/or data networks 204. In some embodiments, the robot 100 and the user device 202 may be directly communicatively coupled via a near field communication protocol. The user device 202 may be a wired or wireless communication terminal, such as a desktop or laptop computer, tablet, or smartphone. The user device 202 may include an application stored in a memory thereof for communication with the robot(s) 100 and/or the robot management node 200.

In some embodiments, the robot management node 200 may include a dedicated computer that includes a running instance of an application that is capable of receiving and transmitting communications to the one or more robots 100 and/or the one or more user devices 202. Some embodiments provide that the robot management node 200 may further include instances and/or operations corresponding to a file server, a database server, an application server and/or a web server, including cloud-based servers. In some embodiments, the robot management node 200 includes a stationary or fixed location processing device that receives power via a wired power connection to a facility and/or building power source. Some embodiments provide that the robot management node 200 transmits and/or receives data via a wired data connection. In some embodiments, the robot management node 200 may be provided on a mobile processing device that includes an on-board power source and that transmits and/or receives data using a wireless and/or wired data connection. As disclosed herein, the robot management node 200 may provide a persistent store of segmentation maps, user inputs, robot operational data, and the like. For example, the persistent store may include maps generated from occupancy data and/or wireless signal strength/coverage data collected by the robot(s) 100 during navigation of one or more operating environments, as described for example in U.S. patent application Ser. No. 15/588,117 entitled "METHODS, SYSTEMS, AND DEVICES FOR MAPPING WIRELESS COMMUNICATION SIGNALS FOR MOBILE ROBOT GUIDANCE," the disclosure of which is incorporated by reference.

Figure 2A:
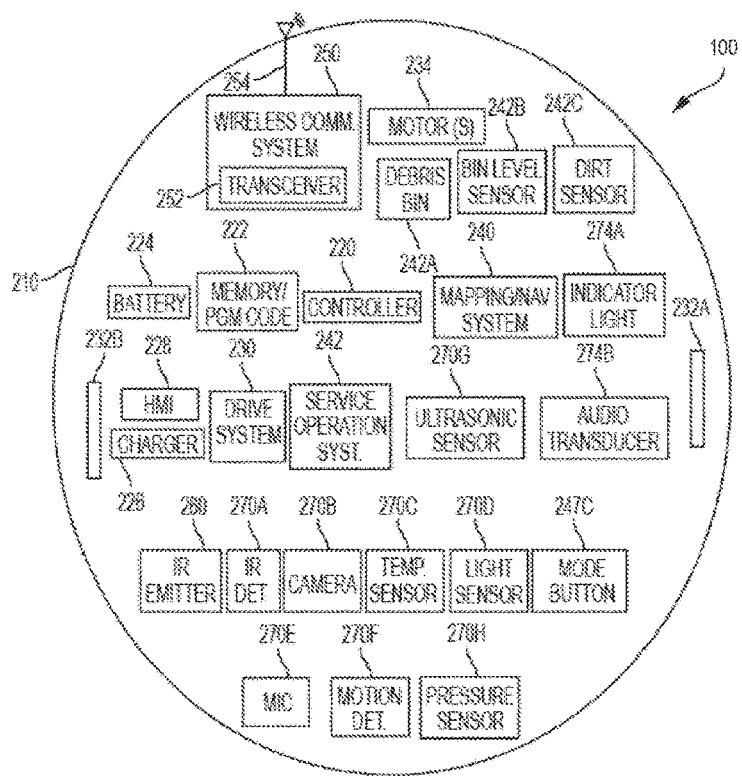
FIG. 2A is a schematic diagram representing a mobile robot according to some embodiments of the present invention.
Figure 2B:
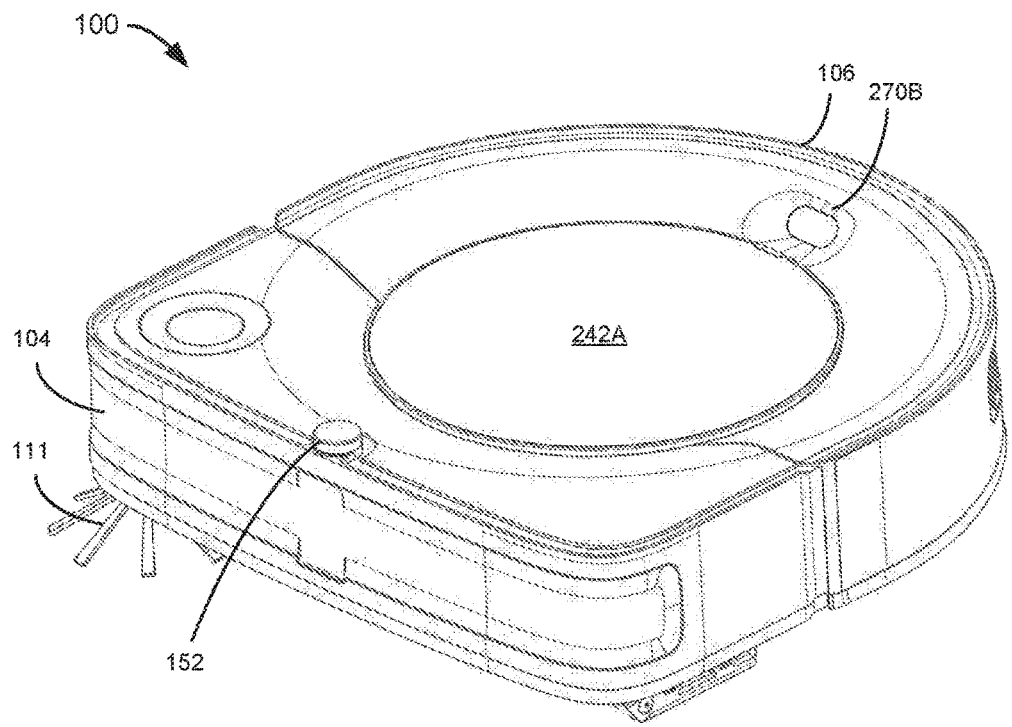
FIGS. 2B and 2C are top and bottom perspective views, respectively, of a mobile robot according to some embodiments of the present invention.
Figure 2C:
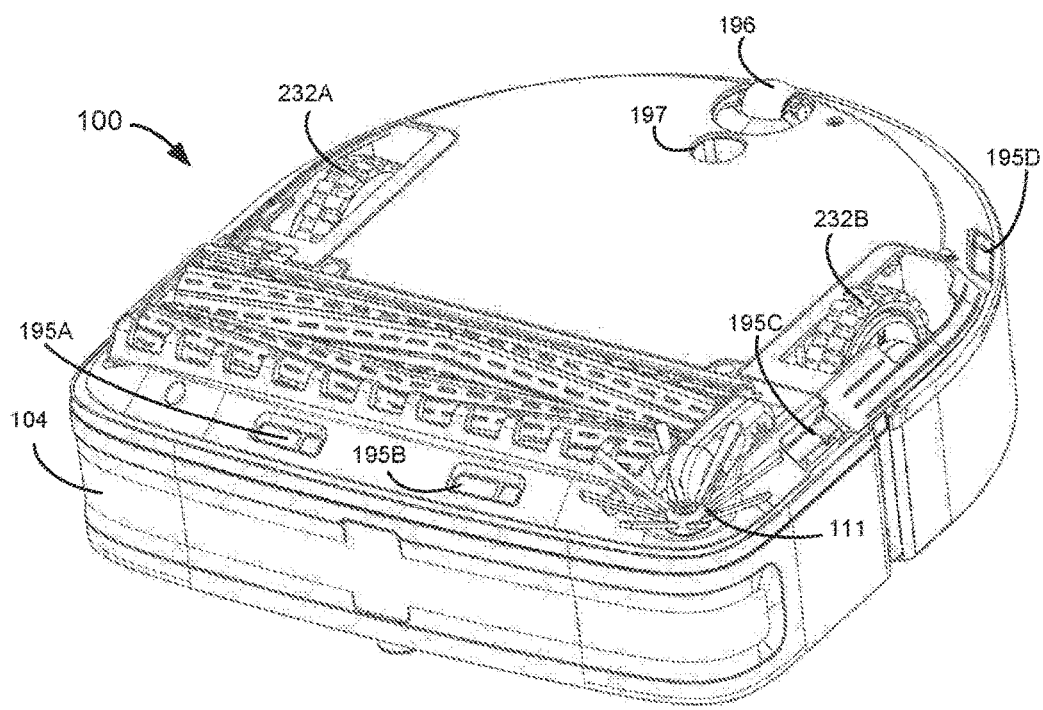

FIGS. 2A-2C illustrate an autonomous coverage robot system that includes a mobile robot 100 (illustrated as a vacuum cleaning robot). The mobile robot 100 is adapted to mate with a base station or charging dock and/or an evacuation dock. The system also includes a charging or energy management system and an auto-docking control system each including cooperatively operating components of the mobile robot 100 and the dock.

A communications/guidance signal detector 152 is mounted on the top front of the housing 106 of the mobile robot 100. The detector 152 is operable to receive signals projected from an emitter (e.g., the avoidance signal emitter and/or homing and alignment emitters of the dock) and (optionally) an emitter of a navigation or virtual wall beacon.

A navigational control system may be used advantageously in combination with the mobile robot 100 to enhance the cleaning efficiency thereof, by adding a deterministic component (in the form of a control signal that controls the movement of the mobile robot 100) to the motion algorithms, including random motion, autonomously implemented by the mobile robot 100. The navigational control system operates under the direction of a navigation control algorithm. The navigation control algorithm includes a definition of a predetermined triggering event. Broadly described, the navigational control system, under the direction of the navigation control algorithm, monitors the movement activity of the mobile robot 100. The predetermined triggering event is a specific occurrence or condition in the movement activity of the robot 100. Upon the realization of the predetermined triggering event, the navigational control system operates to generate and communicate a control signal to the robot 100. In response to the control signal, the mobile robot 100 operates to implement or execute a conduct prescribed by the control signal, i.e., the prescribed conduct. This prescribed conduct represents a deterministic component of the movement activity of the mobile robot 100.

While the mobile robot 100 is vacuuming, it will periodically approach the stationary dock. Contact with the dock could damage or move the dock into an area that would make docking impossible. Therefore, avoidance functionality is desirable. To avoid inadvertent contact, the dock may generate an avoidance signal that may be transmitted from the emitter on the top of the dock. The radial range of the avoidance signal from the dock may vary, depending on predefined factory settings, user settings, or other considerations. At a minimum, the avoidance signal need only project a distance sufficient to protect the dock from unintentional contact with the mobile robot 100. The avoidance signal range can extend from beyond the periphery of the dock, to up to and beyond several feet from the dock, depending on the application.

The mobile robot 100 may be any suitable robot and associated computing device(s), and it will be appreciated that not all of the components, features and functionality described herein are required in mobile robots according to embodiments of the present disclosure. With reference to FIGS. 2A-2C, the example mobile robot 100 may include a chassis 210, a controller 220, memory 222, a battery 224, a battery charger 226, a human-machine interface (HMI) 228, a drive system 230, a mapping/navigation system 240, a service operation system 242 (also referred to herein as "cleaning system" and "cleaning head"), a wireless communication system 250, an IR emitter 260, and environmental sensors 270A-H, a debris bin 242A (to store debris collected by a cleaning operation), a bin level sensor 242B, a dirt extraction sensor 242C (to detect the density of characteristics of the debris collected by the cleaning operation), an indicator light 274A, an audio transducer 274B, and a cleaning mode selection switch or button 274C.

The environmental sensors 270A-270H may include a camera 270B mounted on a top surface of the mobile robot 100, as shown in the top perspective view of FIG. 2A. The camera 270B can be used to navigate the robot 100 and acquire images for other operational use. In some embodiments, the camera 270B is a visual simultaneous location and mapping (VSLAM) camera and is used to detect features and landmarks in the operating environment and build an occupancy map based thereon.

As shown in the bottom perspective view of FIG. 2B, the mobile robot 100 may further include a bumper 104, cliff sensors 195A-195D, an edge brush 111 mounted or otherwise positioned at a periphery of the mobile robot housing 106. The housing 106 is illustrated in FIGS. 2A-2B as having a squared front section on which the bumper 104 is mounted; however, the housing may have a rounded or circular shape in other embodiments. A caster wheel 196 may be provided on the underside of the mobile robot 100. In some embodiments, the caster wheel 196 may be positioned at an opposite end of the mobile robot 100 than the cleaning head 242, with the drive rollers/tracks 232A, 232B therebetween, such that the cleaning head 242 is a cantilevered arrangement. The mobile robot 100 may also include downward- or floor-facing camera 197.

The cameras 270B and 197 and/or other imaging sensors may collectively operate as an image sensing device that can be used to acquire information for guidance and operation of the robot during various operations of the mobile robot 100. In some embodiments, the image sensing device is used to detect obstacles and hazards about the mobile robot 100 so that those obstacles and hazards can be avoided or otherwise addressed. Within the operational range of the image sensor device, a downwardly directed beam can be used to detect obstacles at or near the floor level as well as cliffs or depressions in the floor. An upwardly directed beam can be used to detect obstacles at or above the top of the robot 100 in order to detect and avoid obstacles under which the robot may become wedged. In some embodiments, the image sensing device is operative to effectively detect objects and voids up to at least 10 inches forward of the mobile robot 100 and, in some embodiments, up to at least 12 inches.

The controller 220 may include any suitably configured processor or processors. The processor(s) may include one or more data processing circuits, such as a general purpose and/or special purpose processor (such as a microprocessor and/or digital signal processor) that may be collocated or distributed across one or more networks. The processor is configured to execute program code stored in the memory 222, described below as a computer readable storage medium, to perform some or all of the operations and methods that are described above for one or more of the embodiments. The memory 222 is representative of the one or more memory devices containing the software and data used for facilitating operations of the robot in accordance with some embodiments of the present disclosure. The memory 222 may include, but is not limited to, the following types of devices: cache, ROM, PROM, EPROM, EEPROM, flash, SRAM, and DRAM. The processor is thus in communication with the controller 200, memory 222, the cleaning system 242 and drive system 230.

The drive system 230 may include any suitable mechanism or system for actively and controllably transiting the robot 100 through the living space 20. According to some embodiments, the drive system 230 includes a roller, rollers, track or tracks 232A, 232B and one or more onboard (i.e., carried by the mobile robot 100) electric motors 234 (collectively referred to herein as a "drive" or "drive system") operable by the controller 220 to convey the robot 100 across the floor of the operating environment 10.

The service operation system 242 may be optional in some embodiments, and is operable to execute a service operation in the living space 20. According to some embodiments, the service operation system 242 includes a floor cleaning system that cleans a floor surface of the living space 20 as the robot 100 transits through the space 20. In some embodiments, the service operation system 242 includes a suction head and an onboard vacuum generator to vacuum clean the floor. In some embodiments, the service operation system 242 includes an end effector such as (but not limited to) a sweeping or mopping mechanism, one or more rotating brushes, rollers, wet or dry stationary or oscillating and/or vibrating cloths, or multilayer pad assemblies.

The wireless communication system 250 includes a wireless communication transceiver or module 252 and an associated antenna 254 that are configured to send/receive data to/from one or more computing devices to enable wireless communication between the robot 100 and the various other connected devices in the operating environment 10, as well as network segments serviced by WAPs, gateways and hubs which make up the private network 160, of which the mobile robot 100 constitutes a node. For example, the wireless communication transceiver or module 252 may be a Wi-Fi module. In some embodiments, the robot 100 may communicate wirelessly directly with the dock using narrowband or broadband RF communication. For example, if the robot 100 is not equipped with a transmitter compatible with a wireless access point (WAP), the robot 100 may communicate with the dock, which may in turn relay data from the robot 100 onto the private network and onward to the intended network entity (such as the robot management server 200).

In some embodiments, the mobile robot 100 may be generally configured in the manner of or include features from floor cleaning robots and/or robots as described in U.S. Pat. No. 7,024,278 and U.S. Published Application No. 2007/0250212, the disclosures of which are incorporated herein by reference, with suitable modifications. Other suitable configurations for the vacuum cleaning system are disclosed in U.S. Pat. No. 9,215,957 to Cohen et al., U.S. Patent Publication No. 2016/0166126 to Morin et al., U.S. Pat. No. 8,881,339 to Gilbert, Jr. et al., U.S. Patent Publication No. 2014/0222279 to Stout et al., and U.S. patent application Ser. No. 15/647,677 to O'Brien et al. filed Jul. 12, 2017, the disclosures of which are incorporated herein by reference. Suitable structured light image sensing devices for use as the image sensing devices may include the Global Shutter Image Sensor available from PixArt Imaging, Inc. of Taiwan. The robot 100 may further include a bin detection system for sensing an amount of debris present in a cleaning bin (e.g., as described in U.S. Patent Publication No. 2012/0291809, the entirety of which is hereby incorporated by reference).

Execution of a room segmentation aims to reach optimality by avoiding unnecessary changes in direction when traversing an open environment. Also, based on predefined boundaries, frequent traveling across rooms while cleaning can be reduced or eliminated. This makes the behavior more understandable to the user, who may expect or desire the robot to systematically finish one room after another.

Figure 3:
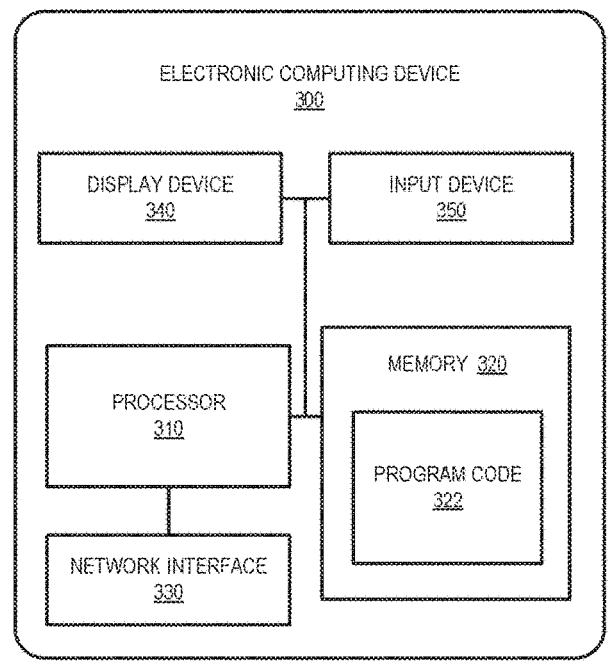
FIG. 3 is a block diagram of an electronic device that may be an example of the robot management node according to some embodiments of the present invention.

FIG. 3 is a block diagram of an electronic computing device that may be an example of the robot management node 200 according to some embodiments of the present invention. The electronic device 300 includes one or more network interfaces 330, processor circuitry ("processor") 310, and memory 320 containing program code 322. The processor 310 may include one or more data processing circuits, such as a general purpose and/or special purpose processor (e.g., microprocessor and/or digital signal processor) that may be collocated or distributed across one or more networks. The processor 310 is configured to execute program code 322 in the memory 320, described below as a computer readable storage medium, to perform some or all of the operations and methods that are described above for one or more of the embodiments. The memory 320 is representative of the one or more memory devices containing the software and data used for facilitating operations for managing the robot in accordance with some embodiments of the present invention. The memory 320 may include, but is not limited to, the following types of devices: cache, ROM, PROM, EPROM, EEPROM, flash, SRAM, and DRAM.

The electronic device 300 may also include a display device 340 (which may display a drag-and-drop user interface) and/or an input device 350, such as a keyboard, touch sensitive display device, mouse, pointer, etc. The network interface 330 can be configured to communicate through one or more networks with any associated available resource server(s) and/or data repositories.

Although FIG. 3 illustrates hardware/software architectures that may be used in managing a robot according to some embodiments described herein, it will be understood that the present invention is not limited to such a configuration but is intended to encompass any configuration capable of carrying out operations described herein.

Figure 4:
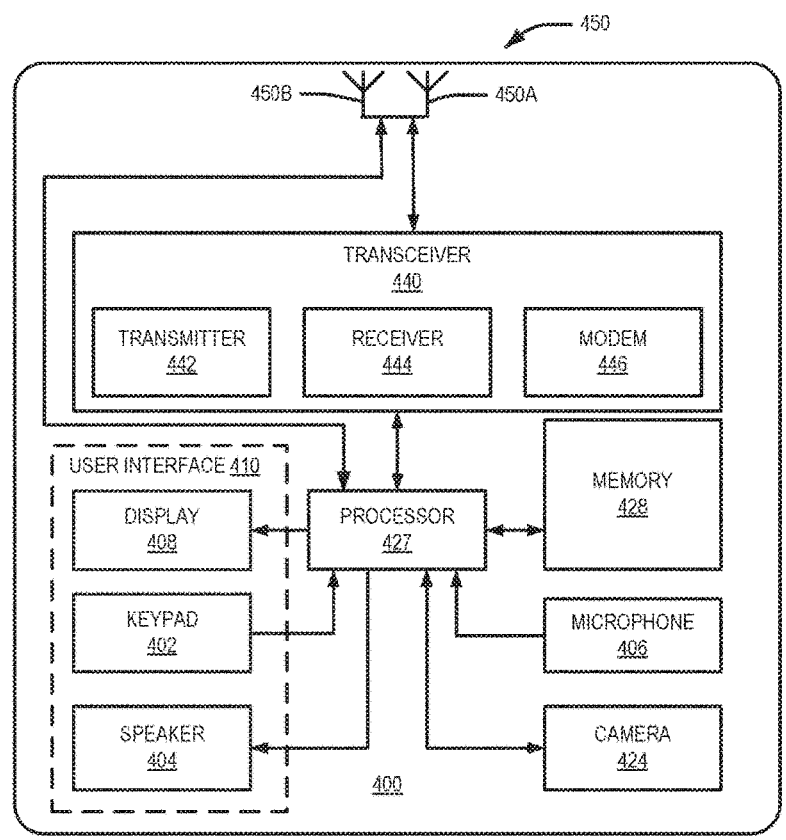
FIG. 4 is a block diagram of a wireless communication device and methods of operation according to some embodiments of the present invention

FIG. 4 is a block diagram of a wireless communication device and methods of operation according to some embodiments of the present invention. The wireless communication device 400 is configured to transmit and/or receive wireless signals over multiple wireless communication interfaces, and may be an example of the user device 202 described above. For example, a wireless communication device 400 according to some embodiments can include a cellular communication module, a Bluetooth module, an infrared communication module, a global positioning system (GPS) module, a WLAN module, and/or other types of communication modules.

In particular, the wireless communication device 400 includes a display 408, such as a liquid crystal display (LCD) and/or an organic light emitting diode (OLED) display. The wireless communication device 400 may optionally include a keypad 102 or other user input mechanism as a user interface 410 of the device 400. In some embodiments, the display 408 may be provided with touch screen capability to replace and/or supplement the keypad 402.

The wireless communication device 400 may include a microphone 406 and an earphone/speaker 404. The front housing may be designed to form an acoustic seal to the user's ear when the earphone/speaker 404 is placed against the user's head.

The keypad 402, display 408, microphone 406, speaker 404 and camera 424 may be coupled to a processor 427, such as a microprocessor or microcontroller, which may be configured to control operations of the wireless communication device 400. The wireless communication device 400 may further include a transceiver 440 and a memory 428 coupled to the processor 427. Other electronic circuitry, such as a WLAN communication interface, a Bluetooth interface, a GPS interface, a digital signal processor, etc., may also be included in the electronic circuitry of the device 400.

The memory 428 may be a general purpose memory that is used to store both program instructions for the processor 427 as well as data, such as audio data, video data, configuration data, and/or other data that may be accessed and/or used by the processor 427. The memory 428 may include a nonvolatile read/write memory, a read-only memory and/or a volatile read/write memory. In particular, the memory 428 may include a read-only memory in which basic operating system instructions are stored, a non-volatile read/write memory in which re-usable data, such as configuration information, directory information, and other information may be stored, as well as a volatile read/write memory, in which short-term instructions and/or temporary data may be stored.

The transceiver 440 typically includes a transmitter circuit 442, a receiver circuit 444, and a modem 446, which cooperate to transmit and receive radio frequency signals to remote transceivers via an antenna array 450. The radio frequency signals transmitted between the device 400 and the remote transceivers may comprise both traffic and control signals (e.g., paging signals/messages for incoming calls), which are used to establish and maintain communication with another party or destination. More particularly, the transceiver 440, in operational cooperation with the processor 427, may be configured for communication according to multiple radio access technologies. The radio access technologies may include, but are not limited to, WLAN (e.g., 802.11), WiMAX (Worldwide Interoperability for Microwave Access), 3GPP LTE (3rd Generation Partnership Project Long Term Evolution), Universal Mobile Telecommunications System (UMTS), Global Standard for Mobile (GSM) communication, General Packet Radio Service (GPRS), enhanced data rates for GSM evolution (EDGE), DCS, PDC, PCS, code division multiple access (CDMA), wideband-CDMA, and/or CDMA2000. Other radio access technologies and/or frequency bands can also be used in embodiments according to the invention.

Figure 5:
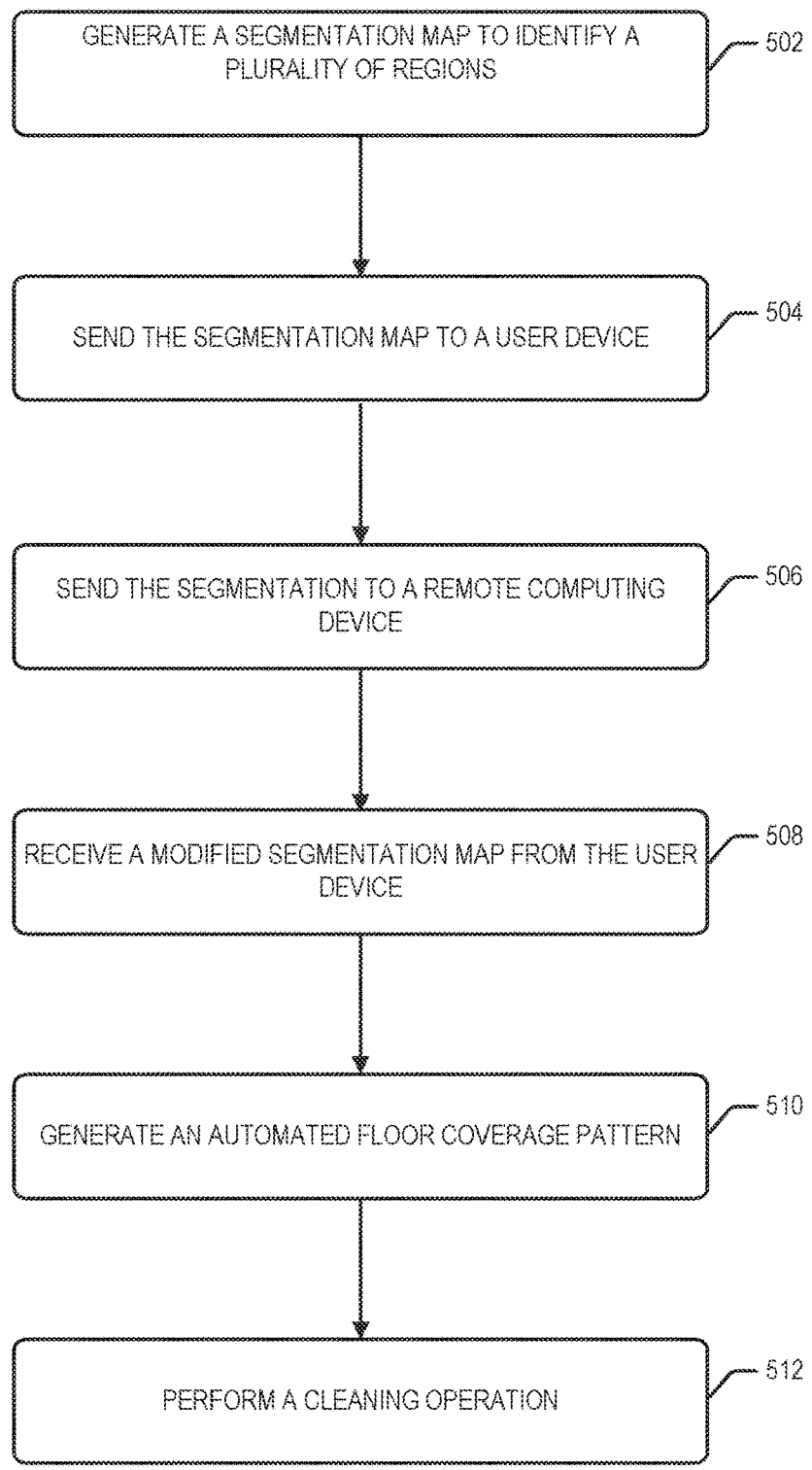
FIG. 5 is a block diagram illustrating a method for operating a mobile floor cleaning robot according to some embodiments of the present invention.

FIG. 5 is a block diagram illustrating a method for operating a mobile floor cleaning robot according to some embodiments of the present invention. The method includes generating a segmentation map of a surface of an enclosed space or other operating environment using the mobile floor cleaning robot 100 to identify multiple regions of the surface (block 504). In some embodiments, an enclosed space may include an occupancy, whether occupied or not, including, for example, a residential building, a commercial building, a storage building, a manufacturing building and/or a portion thereof.

In some embodiments, the segmentation map is generated from an occupancy grid that is generated by the mobile floor cleaning robot during one or more exploration and/or cleaning missions, more generally referred to herein as navigation. For example, the occupancy grid may be generated by exploring the surface of the enclosed space with the mobile floor cleaning robot by generating one or more visual maps for localization of the mobile floor cleaning robot within the enclosed space. In some embodiments, the visual maps may be generated by detecting features using multiple images that may be captured by one or more cameras in the mobile floor cleaning robot. For example, visual features (VSLAM) generated from the video images may be used in order build the "visual map" used to localize the robot. For each feature, a feature description may be determined and the feature may be classified by performing a feature lookup in a feature database. The occupancy grid may be integrated with the visual map, and may further include information generated from bumper hits or collisions ("bumping" events) and/or IR/PixArt data (i.e., time of flight and/or ranging sensor data for obstacle detection).

Some embodiments provide that extracted regions are then merged into corridors and rooms according to heuristic decision rules. Then for each region, starting locations and directions are calculated for systematic room cleaning. Finally, regions are systematically cleaned by the robot according to the shortest sequence computed by route optimization and/or by a sequence selected by a user. Final segmentation is then used on the robot for systematic room-by-room cleaning. In some embodiments, both automatic and user-guided segmentation results are stored in the Cloud in order to incrementally evaluate and improve the segmentation procedure. In other embodiments, the automatic and/or user-guided segmentation results may be stored in a memory of the robot or at a local hub, for example, for sharing with one or more other robots that are local to the operating environment.

A pose and/or position of the mobile floor cleaning robot may be determined and associated with the corresponding images. A landmark in the occupancy grid may be generated based on the images. The landmark may be associated with the pose and/or the position of the mobile floor cleaning robot. Some embodiments provide that the occupancy grid may be augmented and/or updated with updated landmark data that is generated over multiple missions of the mobile floor cleaning robot. Features may also be generated from the grid map, for example, to transfer an existing occupancy grid to a recently generated one. This may be used to transfer existing room segmentation to a newly generated map. That is, embodiments of the present invention may utilize multiple mechanisms in combination, such as, but not limited to, robot mapping and localization based on visual features, and transfer of segmentation based on features generated from the occupancy grid.

In some embodiments, the occupancy grid includes multiple pixels each having a grayscale value that corresponds to whether the pixel location corresponds to a surface location that is occupied, traversable or unexplored. As used herein, the term "traversable" may refer to any surface location in the enclosed space that is traversable by a robot as disclosed herein. Some embodiments provide that the segmentation map may be generated by applying a median filter to the pixels. In some embodiments, the median filter may replace each pixel value with a median value corresponding to pixels that surround the corresponding pixel. For example, some non-limiting embodiments provide that the median value is determined based on the values of the pixels that are within five pixels of each pixel. In this manner, a filtered occupancy grid may be generated.

A binary image of the filtered occupancy grid may be computed by applying a thresholding function to the filtered occupancy grid. A watershed transformation may be performed on the binary image to partition the binary image into multiple regions and to identify the vertices of each of the regions by applying a distance transform.

Some embodiments further include performing a clutter removal operation on the regions in the binary image. For example, removing clutter may be performed by identifying a boundary of the binary image, identifying and removing pixels that correspond to obstacles that are detached from the boundary of the binary image and identifying and removing pixels that correspond to obstacles that are attached to the boundary region of the binary image, for example, by accessing a data store including ground truth information generated at least in part from labeling inputs received from multiple users as described in greater detail below with reference to FIGS. 35A-35D. Some embodiments further include merging the vertices of the regions to join the regions and to define corridors that are adjacent the regions.

Some embodiments provide further processing operations that identify clutter in a map represented by the image M. First, a boundary of an image X is identified by taking the distance transform to its inverse. The boundary may refer to the connected set of all obstacle pixels starting at pixel (1, 1). Note that for a map M it can be assumed that all pixels on the edges of the image have value 1 after thresholding, i.e., the map is bounded by either obstacles or unexplored regions. Detached obstacles $R_{det}$, i.e., obstacles that are not connected to the boundary, are then determined. The attached obstacles $R_{att}$ are computed by segmenting the boundary using watershed segmentation ws(·) and removing regions that contains pixels on the edges of the original image. Algorithm 1, which follows, describes the computation of the obstacle regions from a binary image in detail:

```
Algorithm obstExt(X)
|       DT ← dt (X̄)
|       C ← ∅, Q ← ∅// Closed list and queue
|       Q.PUSH((1,1))//Initial pixel//
|       Initialize Boundary
|       for u ← 1 . . . n do
|       |       for v ← 1 . . . m do
|       |       ⌊B(u,v) ← 0
|       ⌊
|       while Q ≠ ∅ do
|       |       p ← Q.POP( )
|       |       C ← C ∪ {p}
|       |       B(p) ← 1
|       |       if DT(p) ≥ 1 then
|       |       |       for q ∈ Neighbors(p) do
|       |       |       |       if q ∉ C then
|       |       |       |       ⌊Q.PUSH(q)
|       |       |       ⌊
|       |       ⌊
|       ⌊
|       𝓡_det ← cc_R(X − B)
|       𝓡_att ← cc_R(ws(B))
|       𝓡_bou ← {r|r ∈ 𝓡_att, (x,y) ∈ r, x = 1 or y = 1}
|       𝓡_att ← 𝓡_att \ 𝓡_bou
⌊       𝓡_obs ← 𝓡_att ∪ 𝓡_det
```

The region set $R_{obs}$ contains the obstacles which can be discriminated between clutter and walls. The following filter rules distinguish between walls and clutter, i.e., $R_{obs} \setminus R_3$ is the clutter and $R_3$ contains no clutter.

$$R_1 = R_{obs} \setminus \{r_i \in R_{obs} | A(r_i) < \eta_1 \wedge E(r_i) < \eta_2\}$$

$$R_2 = R_2 \setminus \{r_i \in R_1 | \text{maxline}(r_i) < \eta_3\},$$

$$R_3 = R_2 \setminus \{E(r_i) < \eta_4 \wedge S(r_i) < \eta_5\}.$$

The function $l = \text{maxline}(r_i)$ returns the length of the longest line segment found on the boundary of region $r_i$. A Split-and-Merge algorithm can be utilized for detecting lines in region boundaries. In some embodiments, $\eta_1 = 0.0$, $\eta_2 = 2.0$, $\eta_3 = 0.7$, $\eta_4 = 0.8$, $\eta_5 = 0.38$ were used as examples. Additionally or alternatively, clutter can be distinguished responsive to predetermined movements of the robot over a given time period or surface area. For example, obstacles detected responsive to a predetermined number of robot collision events or non-contact obstacle detection with an optical or acoustic sensor and/or changes in direction in a relatively small area and/or distance of travel may be used to distinguish clutter. In a specific example, numerous detections of obstacles to the left or right of the robot when traveling in a substantially straight path over longer distances may be indicative of walls or corridors, while numerous detections of obstacles to the left or right of the robot responsive to non-linear travel over shorter distances (and accompanying changes in the direction of travel) may be indicative of clutter. Also, a "shape" of an obstacle defined by the collision events and/or changes in direction of the robot may be detected and matched with shapes known to correspond to clutter, for instance, as stored in a data store based on labeling inputs received from multiple users.

For example, a robot encountering an obstacle or collection of obstacles constituting clutter may detect and avoid the clutter by turning from a forward heading at least three times in a two foot distance. For example, a robot encountering an obstacle or collection of obstacles constituting clutter may detect and avoid the clutter by turning left and/or right at least three times in a distance of less than 10 feet. For example, a robot attempting to wall follow along an edge of an obstacle or collection of obstacles constituting clutter may detect and avoid the clutter by turning left and/or right at least three times in a distance of less than 5 feet. For example, a robot attempting to wall follow along an edge of an obstacle or collection of obstacles constituting clutter may detect and avoid the clutter by turning left and/or right at least three times in a distance spanning the length of the clutter over a length of 10 feet or less. For example, a robot encountering an obstacle or collection of obstacles constituting clutter may detect and avoid the clutter by turning from a forward heading at least three times in a two foot distance. For example, a robot encountering an obstacle or collection of obstacles constituting clutter may detect and avoid the clutter by turning left and/or right at least three times in a distance of less than 10 feet along one primary direction and at least 10 feet along a direction orthogonal to the primary direction so as to identify an outer boundary of the clutter region.

Once the segmentation map is generated, the segmentation map may be sent to a user device that includes a display that is configured to display the segmentation map of the surface (block 504). Some embodiments provide that the user device includes a wireless communication device 400. In some embodiments, the segmentation map may be wirelessly transmitted using at least one wireless communication link.

Some embodiments provide that the wireless communication link may include a local area network that provides communication between the user device and the mobile floor cleaning robot. In some embodiments, the user device and the mobile floor cleaning robot may communicate with one another directly via one or more near field communications protocols, such as Bluetooth or Wi-Fi, among others. In some embodiments, the user device and mobile floor cleaning robot may communicate with one another through one or more intervening wireless communication devices. In some embodiments, the wireless communication link includes a server that is configured to provide a persistent storage of the occupancy grid, the segmentation map and/or a modified segmentation map, among others.

In some embodiments, the segmentation map includes operational data corresponding to the mobile floor cleaning robot, such as the segmentation maps shown in FIGS. 20G-20K. Operational data may include a cleaning function map that identifies dirt and/or debris collection that corresponds to the quantity of dirt and/or debris that is collected by the mobile floor cleaning robot as a function of location on the segmentation map. In some embodiments, the cleaning function map may be a heat map that indicates which portions of the enclosed space were the dirtier than other portions. Some embodiments provide that the cleaning function map may be provided for each of the regions individually. In some embodiments, the cleaning function map may correspond to either a single cleaning mission or multiple cleaning missions. The multiple cleaning missions may include a defined subset of all cleaning missions completed in the enclosed space and/or region or may corresponding to all of the cleaning missions for which data is stored.

Some embodiments include sending the segmentation map of the surface to a remote computing device (block 506). Some embodiments provide that the remote computing device may include electronic device 300 described above. In some embodiments, the remote computing device 300 may communicate with the mobile floor cleaning robot and with a user mobile terminal, such as wireless communication device 400 described above. Some embodiments provide that the segmentation map is sent to the remote computing device 300 in response to the generation of the segmentation map. In this manner, historical data corresponding to the mobile floor cleaning robot may be preserved, maintained, and/or analyzed.

Some embodiments provide that a modified segmentation map may be received from the user device based on inputs received from the user into the user device (block 508). The modified segmentation map may identify a subset of the regions to be cleaned. For example, a user device may receive an input instructing that specific regions be cleaned without cleaning other ones of the regions, that is, an input specifying "keep-out" regions, as shown for example, in FIG. 27. Additionally, some embodiments provide that the modified segmentation map identifies a specific order in which the selected regions are to be cleaned, as shown for example, in FIG. 15. In some embodiments, the modified segmentation map may include different cleaning schedules for different times and/or intervals. For example, a first cleaning schedule may choose a first subset of regions for cleaning on certain days of the week while a second cleaning schedule may choose a second subset of regions for cleaning on other days of the week. Some embodiments provide that some regions may be included in both the first and the second subset.

Operations also include generating an automated floor coverage pattern (block 510). Some embodiments provide that the automated floor coverage pattern is based on the segmentation map that includes different regions, as discussed below with reference to FIGS. 29A-29D. In some embodiments, the automated floor coverage pattern includes identification of sub-regions as clutter areas and non-clutter areas, as shown for example in FIG. 29A, and selection of cleaning sequence and rank direction for each of the regions and/or sub-regions, as shown for example in FIGS. 30A-30G. Rank direction may be the primary direction that the mobile floor cleaning robot travels in when cleaning a particular region. For example, the rank direction may define a dimension of a given region that is longer than other dimensions of the region, as shown for example in FIG. 31A. By selecting the rank direction, each region may be cleaned with fewer turns and/or less time.

Figure 9A:
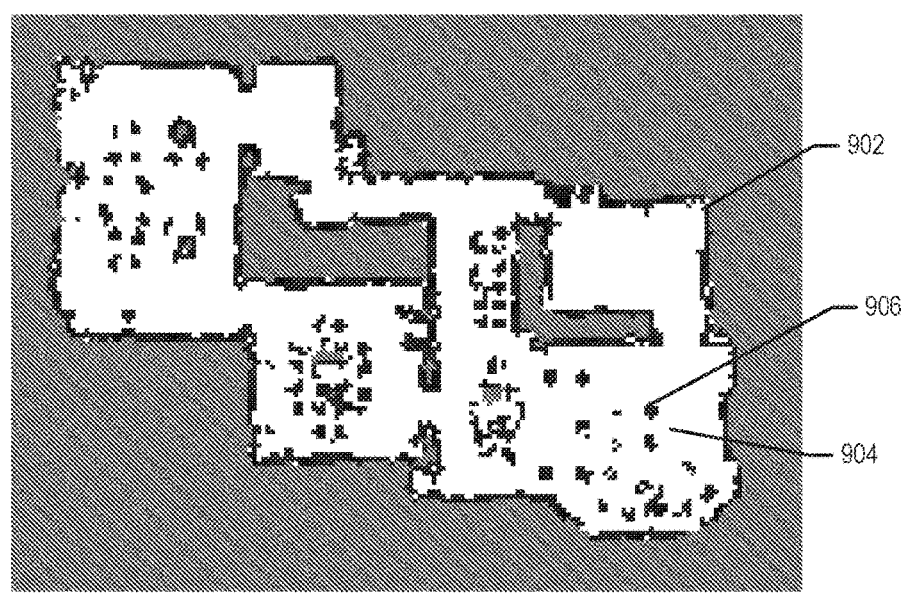
FIGS. 9A through 9C are graphical representations that may be displayed via a user interface of a communication device illustrating user display preference options of a raw data map, a segmentation map with clutter pixels and segmentation map with clutter regions in operations according to some embodiments of the present invention.
Figure 9B:
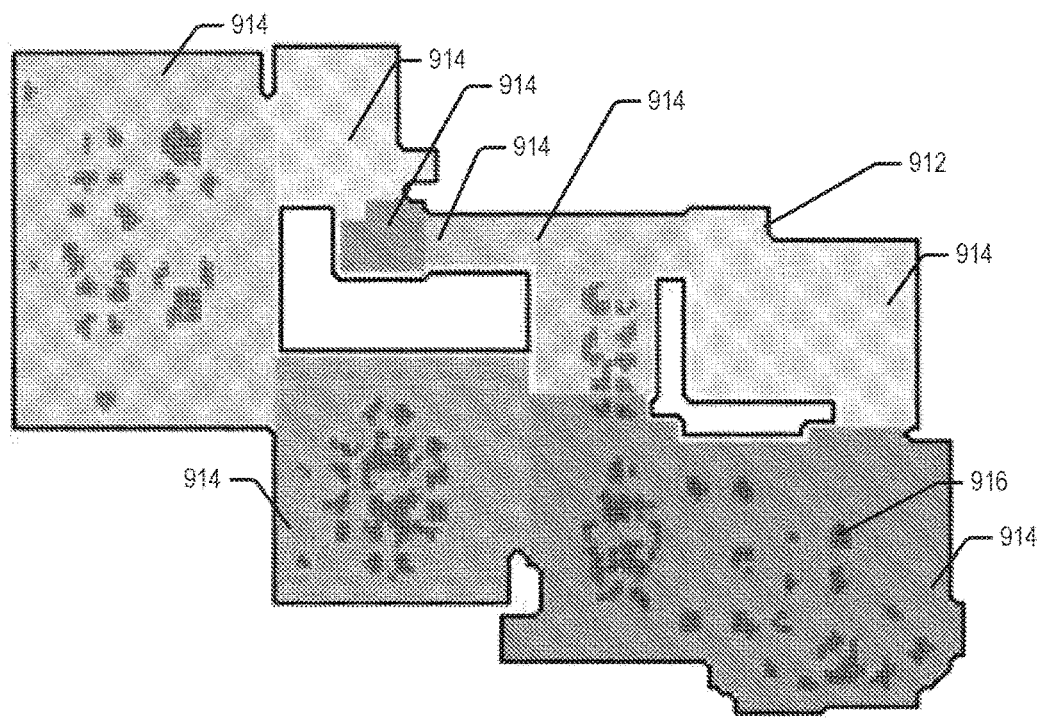

In some embodiments, the rank direction may define a dimension of a sub-region or portion of a region that is without obstacles, that is, a non-clutter area or region, such as the regions 914 that do not include detected clutter 916 shown in FIG. 9B. For example, in a region that includes significant clutter areas, the rank direction may be selected based on the dimensionality of the non-cluttered region, regardless of the overall dimensions of the region. Some embodiments provide that the automated floor coverage pattern includes, for each region, a cleaning pattern that includes sequentially selecting an uncluttered portion of the region for coverage (FIG. 29B), a perimeter of the region for coverage (FIG. 29D), and a cluttered portion of the region for coverage (FIG. 29C).

Some embodiments include performing a cleaning operation on the surface by sequentially performing the cleaning operation in individual ones of the regions and/or sub-regions based on the automated floor coverage pattern (block 512). As such, the cleaning operation in a given region or sub-region (such as a non-clutter area or areas) is completed before starting the cleaning operation in another region (such as a clutter area or areas), according to the sequence specified by the automated floor coverage pattern. Some embodiments provide that the cleaning operation is further performed based on the modified segmentation map. For example, the cleaning operation may only be performed on a subset of the regions or sub-regions responsive to a selection input received from the user device.

In some embodiments, the cleaning operation may be performed on specific regions at different respective cleaning levels that may be selected by the user. Different cleaning levels may correspond to a different number of cleaning passes that the mobile floor cleaning robot makes in a given region. For example, the user may specify that a first region gets a higher level cleaning operation that corresponds to the mobile floor cleaning robot making three cleaning passes in the region. In contrast, a second region may be specified to have a lower level of cleaning that corresponds to a single cleaning pass in the region.

Figure 6:
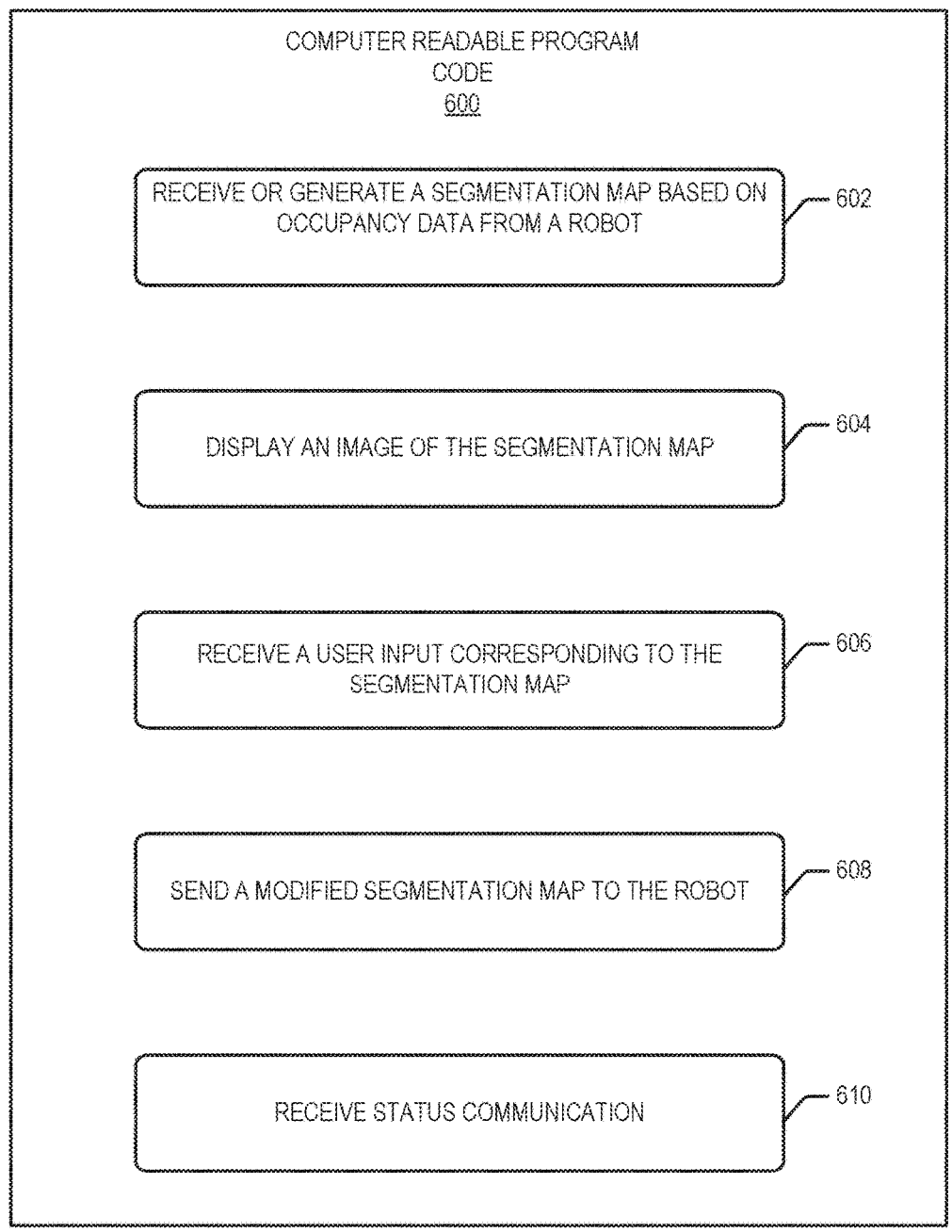
FIG. 6 is a block diagram illustrating operations of computer readable program product on a user device according to some embodiments of the present invention.

FIG. 6, which is a block diagram illustrating operations of computer readable program product including computer readable program code 600 on a user device according to some embodiments of the present invention. Some embodiments provide that the user device includes a user mobile terminal, such as wireless communication device 400 described above. Operations include receiving occupancy data and/or a segmentation map of a surface of an enclosed space from a robot (block 602). As used herein, a segmentation map may refer to a segmented map showing demarcated regions on a mapped area. The segmentation map may include multiple regions of the surface and the robot may be a mobile floor cleaning robot.

In some embodiments, the segmentation map is generated by the robot based on data gathered during exploration and/or cleaning missions on the surface. Some embodiments provide that the segmentation map is generated by a remote computing device that may include electronic device 300 as described above. In such cases, the remote computing device may receive raw data corresponding to surface of the enclosed space from the robot and the raw data may be used to generate the segmentation map.

An image of the segmentation map may be displayed on the display of the user device (block 604). Some embodiments provide that user device is a hand-held mobile terminal and the display is a touch-screen display. In such embodiments, a graphical user interface may be generated and displayed via the touch-screen display and the user input may be received via the graphical user interface using the touch-screen. The display may include a monitor, a tablet computer, a networked device including a screen and a mouse or touch interface, and/or a combination of remote and local computing devices that are communicatively coupled via a network.

A user input corresponding to the segmentation map of the surface may be received via a user input device of the user device (block 606), as shown for example in FIGS. 10A-10F. Some embodiments provide that the user input received includes a user input to modify an appearance of the image of the segmentation map. For example, the user input may be to change an angle of perspective of the user relative to the image, such as changing the pan or tilt of the image. The user input may correspond to a dimensional selection such as two-dimensional or three-dimensional. Additionally, a user input may change the zoom to view some or all of the image at different sizes.

Figure 24:
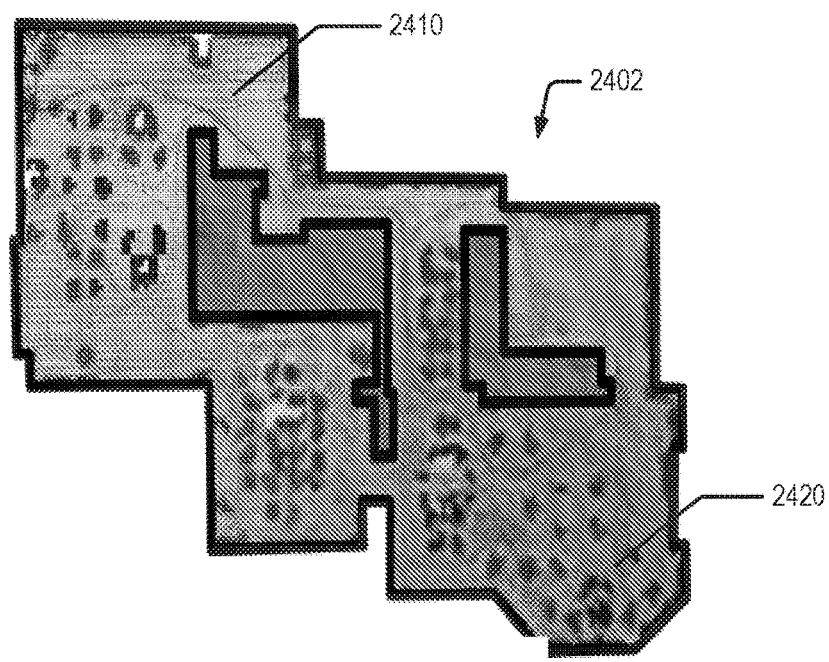
FIG. 24 is a graphical representation that may be displayed via a user interface of a communication device illustrating an occupancy map illustrating a multi-mission coverage display according to some embodiments of the present invention.

In some embodiments, the user input may include a map feature selection such as a heat map selection that causes the image of the segmentation map displayed to illustrate a level of dirt and/or debris collected as a function of location on the segmentation map, as shown for example in FIG. 24. In this manner, the image may illustrate which portions and/or regions have required more cleaning 2420 relative to other portions and/or regions 2410. Some embodiments provide that a map feature may include a clutter map selection that causes the image of the segmentation map displayed to selectively illustrate clutter on the segmentation map, as shown for example in FIGS. 9B and 9C.

Some embodiments provide that the user input to the segmentation map may be used to modify the segmentation map and/or regions thereof. For example, a user input may be a divide region input that is configured to cause one of the regions to be divided into more than one region, as shown for example in FIGS. 11A-11C. Similarly, a user input may be a combine region input that is configured to cause multiple ones of the regions to be combined into a single region, as shown for example in FIGS. 10A-10F.

Some embodiments provide that the user input to the segmentation map may include a cleaning mission instruction. For example, a cleaning mission instruction may include a cleaning order instruction that includes an identification of the order in which the regions are to be cleaned in a given mission, as shown for example, in FIG. 15. The cleaning order instruction may include an identification regarding a subset of the regions that are to be cleaned in the given mission. Embodiments directed to cleaning mission instructions and associated user inputs are described in greater detail below with reference to FIGS. 29A-32.

In some embodiments, the user input may include one or more cleaning mission schedules for the enclosed space. For example, a cleaning mission instruction may include a first cleaning mission instruction that identifies a first selection of the regions to be cleaned and a second cleaning mission that identifies a second selection of the regions to be cleaned. In this example, the first cleaning mission instruction may be scheduled to be performed on certain days of the week and/or times of day, while the second cleaning mission instruction may be scheduled to be performed on different days and/or at different times.

In some embodiments, the cleaning mission instruction includes different levels of cleaning for different regions. For example, a first region or set of regions may be designated to receive a first cleaning level and a second region or set of regions may be designated to receive a second cleaning level that is different from the first cleaning level. Different cleaning levels may be accomplished by specifying the number of times the robot has to traverse the corresponding region, also referred to herein as the number of cleaning passes.

Figure 27:
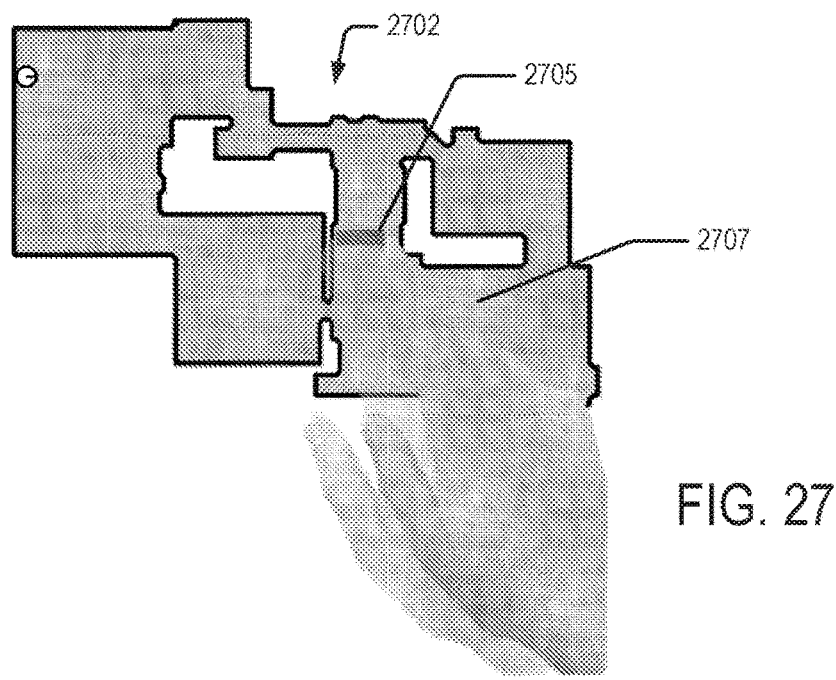
FIG. 27 is a graphical representation of receiving user input to define a cleaning mission boundary responsive to a gesture on a touch screen of a communication device according to some embodiments of the present invention.

In some embodiments, the cleaning mission instruction includes an identification of a portion of the enclosed space floor space that is not to be cleaned by the mobile floor cleaning robot, as shown for example in FIG. 27. Such designations may be selected by region and/or by portion of the region. In some embodiments, the cleaning mission instruction may specify that the portion of the enclosed space floor space that is not to be cleaned is a global instruction and thus is persistent from mission to mission. However, some embodiments provide that the identification of the portion of the enclosed space floor space that is not to be cleaned is a one mission and/or a limited number of missions instruction.

Figure 29A:
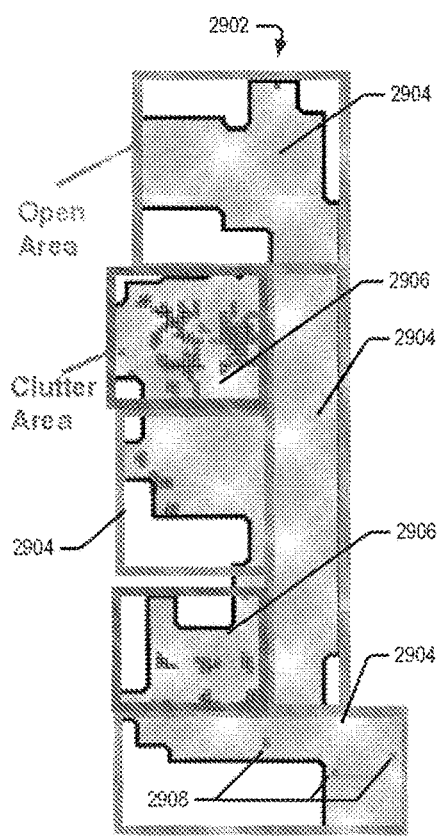
FIGS. 29A through 29D are graphical representations that may be displayed via a user interface of a communication device illustrating a segmentation map that includes respective area-specific cleaning operations according to some embodiments of the present invention.

Some embodiments provide that the cleaning mission instruction includes a primary cleaning direction for each of the regions, as shown for example in FIG. 29A. The primary cleaning direction, which may be referred to as rank, identifies a primary cleaning direction that the mobile floor cleaning robot may clean in obstacle free portions of a cleaning operation. In some embodiments, rank may be determined for an entire region and/or a portion thereof.

Some embodiments provide that the user input includes a request for user preference data, which may be displayed responsive thereto. User preferences that may be displayed include historical user preference data and/or user preference data that corresponds to a single cleaning mission.

In some embodiments, the user input includes a robot team configuration input that corresponds to multiple different robots. The robot team configuration may include a first cleaning mission instruction corresponding to a first mobile floor cleaning robot and a second cleaning mission corresponding to a second mobile floor cleaning robot. In some embodiments, the first and second cleaning missions correspond to the entire segmentation map of the surface of the enclosed space. For example, a first cleaning mission may clean a first portion of the regions and a second cleaning mission may clean a second portion of the regions.

However, some embodiments provide that the first and second cleaning missions correspond to different segmentation maps of different portions of the enclosed space. For example, in the context of a multilevel occupancy, a first segmentation map may correspond to a first level and a second segmentation map may correspond to a second level.

Some embodiments provide that the first mobile floor cleaning robot performs a first type of cleaning operation and the second mobile floor cleaning robot performs a second type of cleaning operation. For example, the first mobile floor cleaning robot may be a vacuuming robot including sophisticated mapping sensors and the second mobile floor cleaning robot may be a mopping robot having less sophisticated sensors and relying on the mapping created by the vacuuming robot.

Some embodiments include sending a modified segmentation map that is modified corresponding to the user input to the mobile floor cleaning robot (block 608). Some embodiments provide that the modified segmentation map is sent to a remote server, such as the remote computing device 300, that is configured to provide a persistent storage of the modified segmentation map.

A status communication that is generated by the mobile floor cleaning robot may be received (block 610). Some embodiments provide that a message is displayed in the on the display responsive thereto.

In some embodiments, the status communication includes a progress update corresponding to a cleaning mission. The progress update may be displayed as an animated graphic of a cleaning operation on the image of the segmentation map. Some embodiments provide that the progress update is updated in real time and includes a visual indication on the image of the segmentation map that is displayed, as shown for example in FIG. 13.

Some embodiments provide that the status communication includes an alert message that identifies a condition that is detected by the mobile floor cleaning robot. For example, the alert message may be reporting an incomplete mission condition that renders the robot unable to complete a cleaning mission. For example, the mobile floor cleaning robot may indicate that it is stuck and unable to proceed, as shown for example in FIG. 14. The condition may correspond to an unexpected obstacle condition. In some embodiments, the mobile floor cleaning robot may detect an obstacle that is not included in the segmentation map and report that this is a new obstacle.

Figure 7:
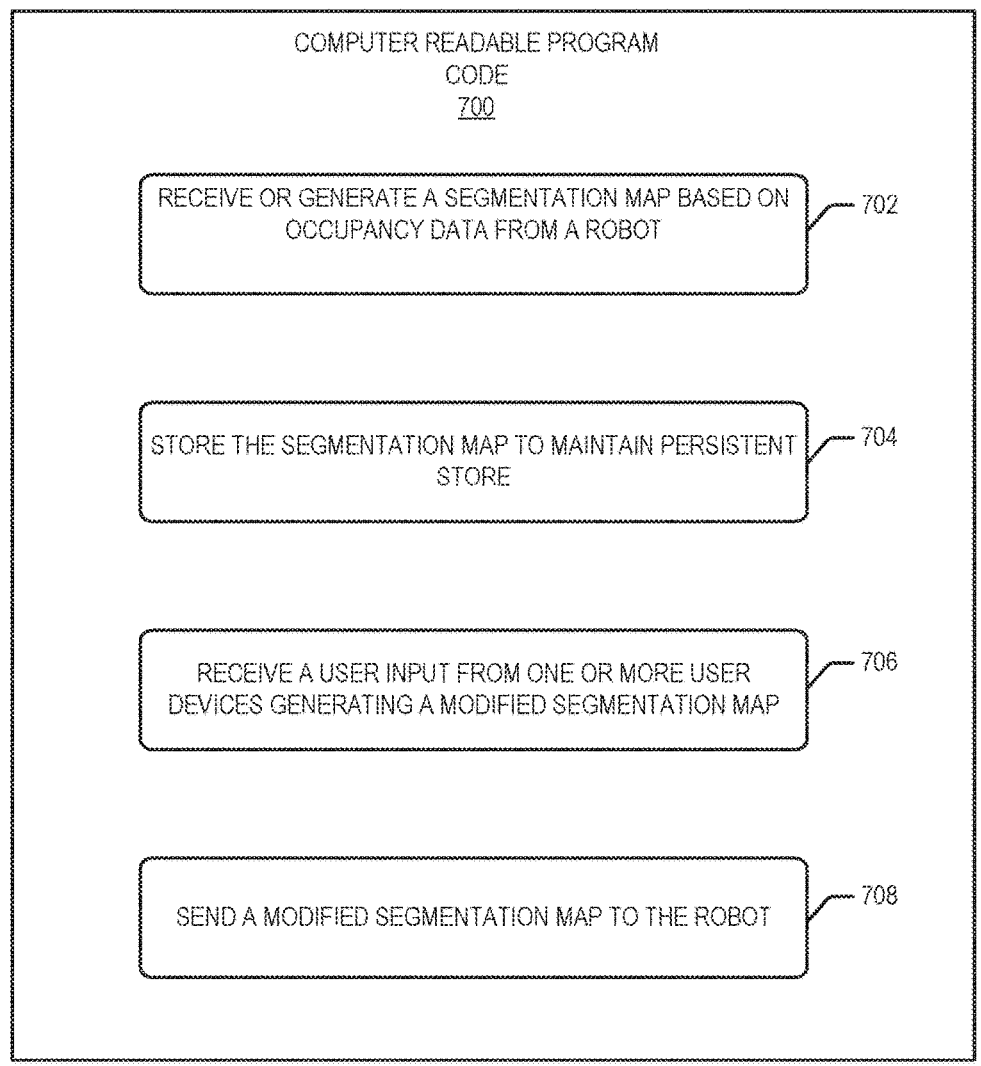
FIG. 7 is a block diagram illustrating operations of computer program product on a robot management node according to some embodiments of the present invention.

FIG. 7 is a block diagram illustrating operations of computer program product 700 on a robot management node according to some embodiments of the present invention. The robot management node may be implemented on and/or include electronic device 300 as described above. Some embodiments provide that the processer and the memory are included in a cloud-based server that is remote from the robot and the enclosed space.

In some embodiments, a cloud-based server may aggregate data corresponding to multiple different users at multiple different enclosed spaces. Examples of the aggregated data may include data corresponding to standard features, fixtures, floorplans, footprints and/or arrangements. For example, multiple users may share a floor plan that is the same as other users and that may be identified by name, number and/or specific dimensional features. Having the data collected corresponding to the same or similar features, fixtures, floorplans, footprints and/or arrangements may provide a data repository that accessible for other users to improve performance and/or accuracy regarding operations such as classifying obstacles.

Operations may include receiving occupancy data and/or a segmentation map of a surface of an enclosed space from a robot (block 702). The segmentation map may identify multiple regions of the surface based occupancy data that is collected by the robot. Some embodiments provide that multiple segmentation maps that are generated by the robot during multiple cleaning missions are received. In such embodiments, the segmentation map may be updated and/or augmented by later received segmentation maps to provide persistent maps. Some embodiments provide that the segmentation map includes operational data corresponding to the robot.

The segmentation map of the surface of the enclosed space may be stored in a data store that is associated with the robot (block 704). Some embodiments include storing multiple segmentation maps that are received, and transferring common features between the multiple segmentation maps using feature matching and outlier removal operations described herein to generate persistent maps. In this manner, historical segmentation map data including the modified segmentation map may be stored.

User input data is received from a user device (block 706). The user device is configured to receive a user input corresponding to the segmentation map. Responsive to receiving the user input, the segmentation map is modified based on the user input data to generate a modified segmentation map. The modified segmentation map may identify a subset of the regions that are to be cleaned, portions or sub-regions of one or more of the regions to be cleaned, and/or an order in which the regions and/or sub-regions are to be cleaned. The modified segmentation map may also be stored and re-used in subsequent navigation and/or cleaning operations performed by the mobile robot.

In some embodiments, the segmentation map includes operational data corresponding to the robot. Operational data may include a cleaning function map that identifies dirt and/or debris that was collected in a single cleaning mission and/or in multiple cleaning missions as a function of location on the segmentation map. In this manner, a heat map that identifies regions and/or portions thereof that require more cleaning activity relative to other regions and/or portions thereof may be communicated. For example, some embodiments provide that the operational data includes a cleaning function map that identifies a quantity of passes that are performed by the robot as a function of location on the segmentation map.

In some embodiments, the user input data includes a robot team configuration input that includes a first cleaning mission instruction corresponding to a first robot and a second cleaning mission corresponding to a second robot.

Operations include sending the modified segmentation map based on the user input data and the segmentation map to the robot (block 708). The robot may be operable to perform a cleaning mission responsive to the modified segmentation map.

In some embodiments, the cleaning mission includes performing a cleaning operation of regions at different cleaning levels that are selected by the user. The cleaning mission may further provide a rank direction that corresponds to a largest dimension of area in the respective region without obstacles. The different levels may be associated with a number of cleaning passes the robot makes in the corresponding regions. In some embodiments, the rank direction defines a dimension of the region that is longer than other dimensions of the region. Some embodiments provide that the rank direction defines a dimension of a portion of the respective region that is without obstacles and that is different from a dimension of the region that is longer than other dimensions of the region.

Figure 8A:
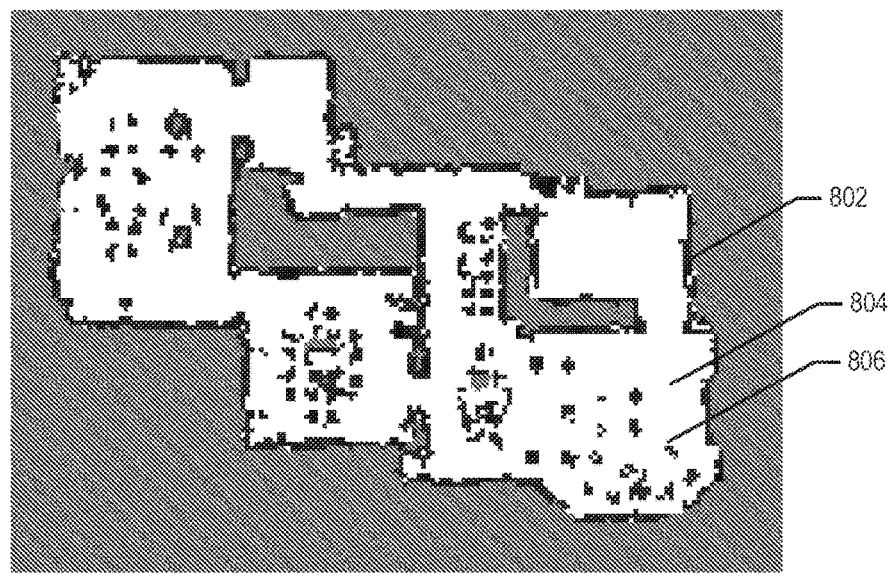
FIGS. 8A through 8C are graphical representations that may be displayed via a user interface of a communication device illustrating a raw data map, a cleaned map and a segmentation map in an automated map cleaning and segmentation operation according to some embodiments of the present invention.
Figure 8B:
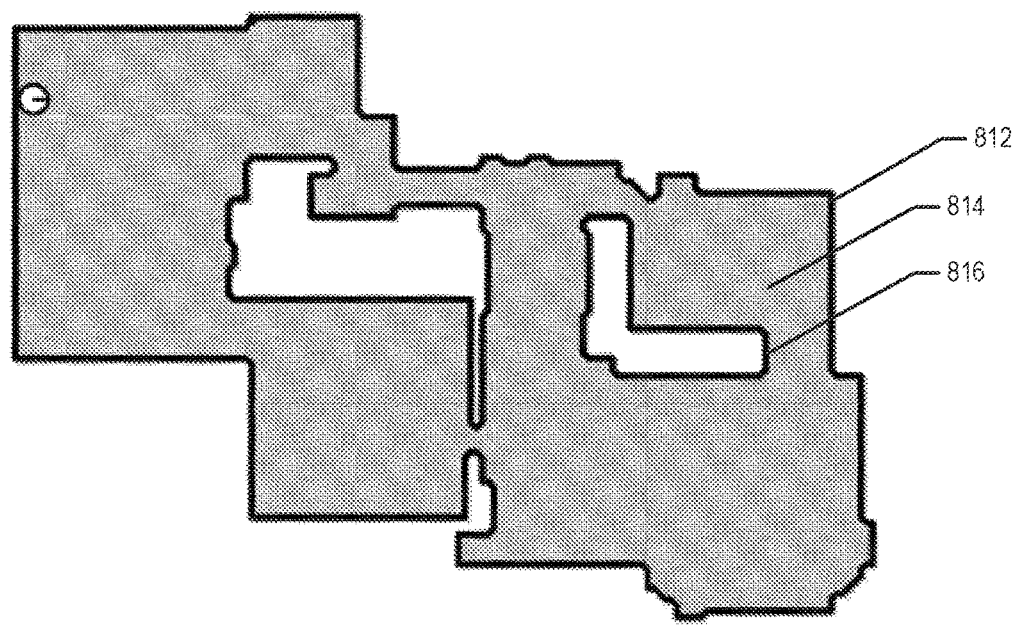
Figure 8C:
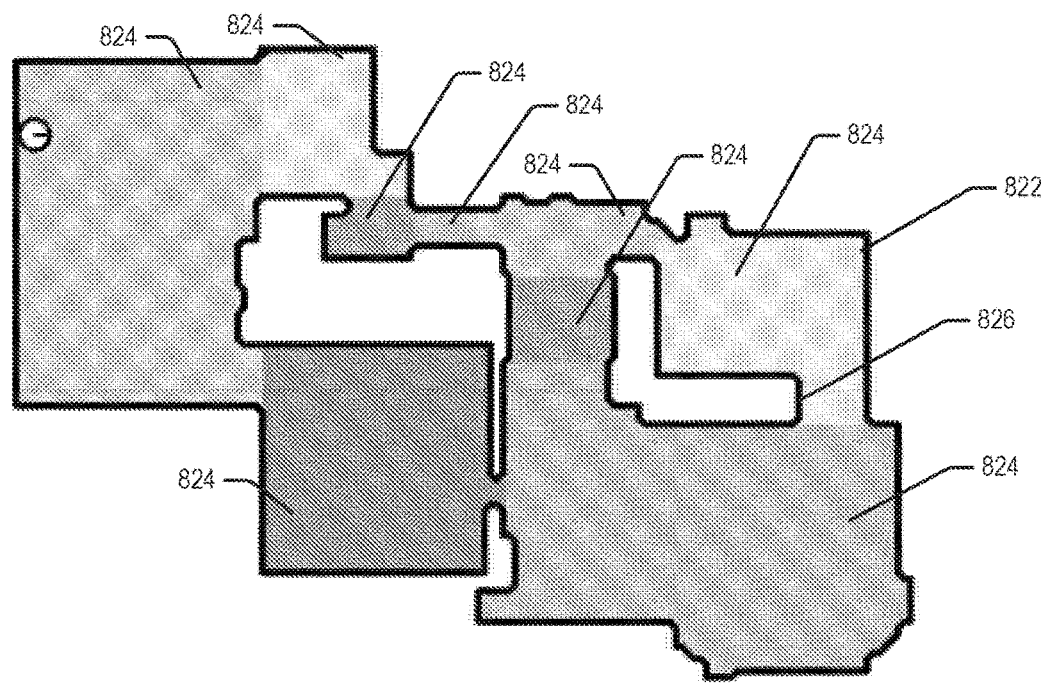

FIGS. 8A through 8C are graphical representations that may be displayed via a user interface of a communication device illustrating a raw data map, a cleaned map and a segmentation map in an automated map cleaning and segmentation operation according to some embodiments of the present invention. Some embodiments provide that a robot explores a surface of an enclosed space during a first pass. An occupancy grid is generated that includes raw data that is generated during the first pass. The occupancy grid is presented to a user on a user device as a raw data map 802 as illustrated in FIG. 8A. The raw data map 802 may include multiple pixels that may be shaded white for traversable space and black for obstacles, including occupancy walls.

Referring to the embodiment of FIG. 8B, the robot generates a cleaned map 812 that is displayed to the user on the user device. The cleaned map 812 may illustrates the enclosed space with the boundary data 816 cleaned up or simplified to be substantially more linear than the raw data. The cleaned map 812 also highlights the traversable space 814 of the enclosed space surface, for example, by removing visual indications of the detected clutter.

FIG. 8C illustrates a segmentation map 822 that may be displayed to the user on the user device. Similar to the cleaned map 812, the segmentation map 822 illustrates the enclosed space with the boundary data 826. Additionally, the traversable space is segmented into regions 824 that may correspond to different rooms in the enclosed space according to some embodiments. Based on the segmentation map 822, the robot may perform room-by-room cleaning in which the cleaning operation in a given region 824 is completed before the robot begins to perform a cleaning operation in another region 824.

Figure 33B:
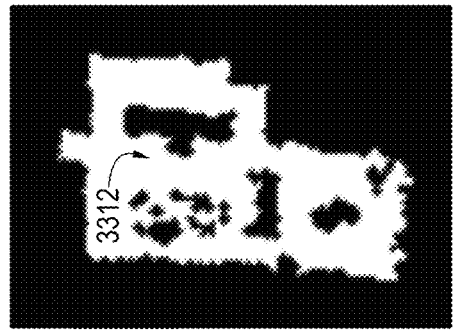
FIGS. 33A through 33D illustrate operations for generating a simplified map for display via a user interface of a communication device according to some embodiments of the present invention.
Figure 33D:
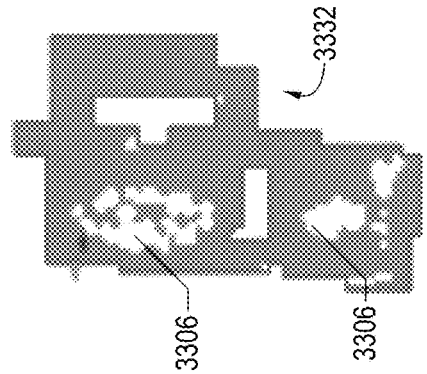
Figure 33A:
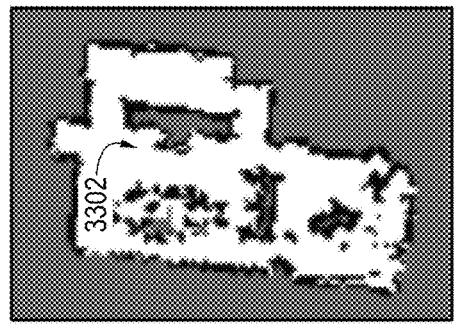
Figure 33C:
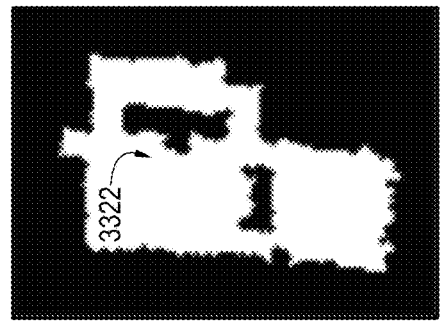

FIGS. 33A through 33D illustrate operations for generating simplified map boundaries for display via a user interface from raw data maps, such as the map 802 in FIG. 8A, in greater detail. Referring now to FIG. 33A, a raw data map 3302 is generated from data collected during navigation of a mobile robot an operating environment, such as occupancy data and VSLAM feature detection data. The raw data map 3302 provides a pixelated representation of the operating environment, which may not be aesthetically pleasing and/or intuitive to a user. As such, the raw data map 3302 can be visually simplified for presentation to a user by removing noise to generate the de-noised map 3312 shown in FIG. 33B, and removing areas identified as clutter to generate a de-cluttered map 3322 as shown in FIG. 33C. The de-noised map 3312 may have reduced distortion relative to the raw data map 3302, for example, by sharpening or reducing blurred edges. Pixelated edges of the decluttered map 3322 are replaced by linear segments and/or polygonal shapes to generate the simplified map 3332 shown in FIG. 33D. The simplified map 3332 thus replaces data indicating actual boundaries detected by navigation of the mobile robot with simplified boundaries, which may be more aesthetically pleasing and/or intuitive for a user viewing the map 3332 via a user interface of a user device, such as the user device 202. Generating the simplified map 3332 may also involve merging rooms or regions as described herein. In some embodiments, clutter regions 3306 representing the areas identified as clutter in FIG. 33B may be added back into to the simplified map 3332 to provide a more accurate representation of the operating environment to the user. Also, because clutter obstacles can represent recognizable structures, such as furniture, the inclusion of the clutter regions 3306 in the simplified map 3332 may make it easier for the user to recognize rooms and corridors. The operations to generate the simplified map 3332 from the raw data map 3302 may be performed by the robot 100, the robot management server 200, and/or the user device 202.

Figure 9C:
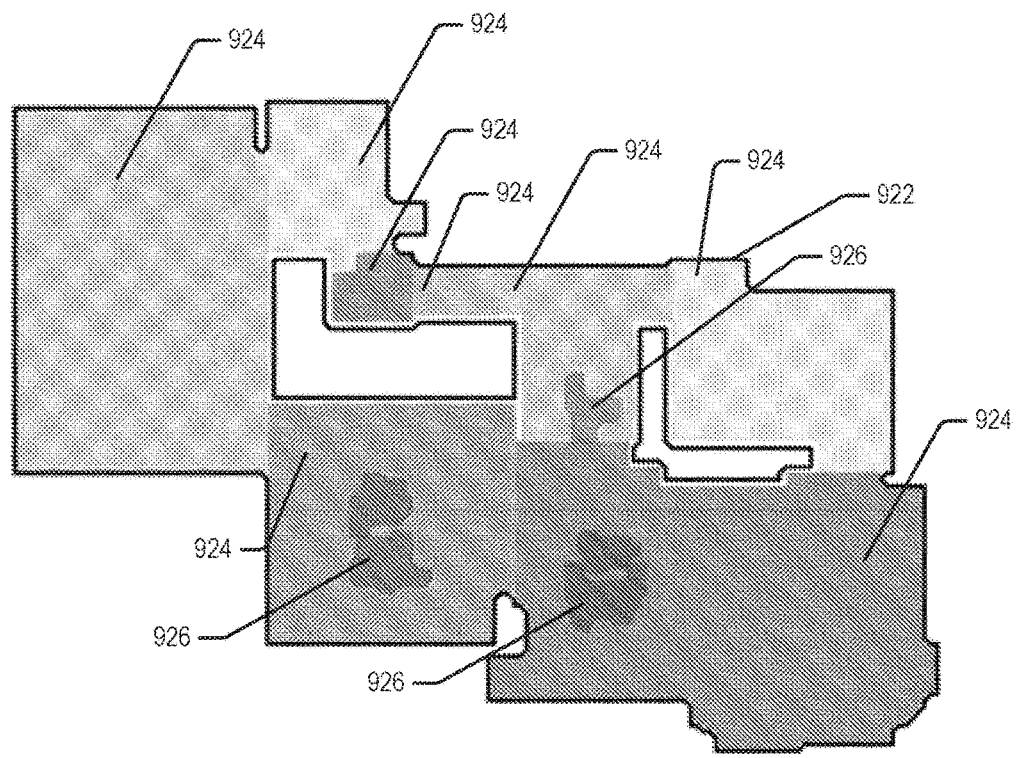

Some embodiments provide that a user may have a display preference relative to how clutter regions may be displayed. FIGS. 9A through 9C are graphical representations that may be displayed via a user interface of a communication device illustrating user display preference options of raw data, a segmentation map with clutter pixels and segmentation map with clutter regions in operations according to some embodiments of the present invention. Referring to FIG. 9A, a raw data map 902 may include the identification of multiple pixels that correspond to clutter 906 or other obstacles in the enclosed space. As shown in FIG. 9B, a segmentation map 912 may include multiple regions 914 and the clutter 916 or other obstacles may be illustrated in each of the regions 914. In some embodiments, as illustrated in FIG. 9C, a segmentation map 922 may include clutter regions 926 within the regions 924 that illustrate specific areas in which multiple obstacles are detected. As described herein, clutter may refer to a concentration of obstacles occupying a region of space and preventing systematic, deterministic coverage of the region, and regions including clutter may be referred to herein as clutter or cluttered regions. As described in greater detail below, once the cluttered regions are identified, cleaning operations based on rank optimization may be performed on non-cluttered regions.

Figure 10A:
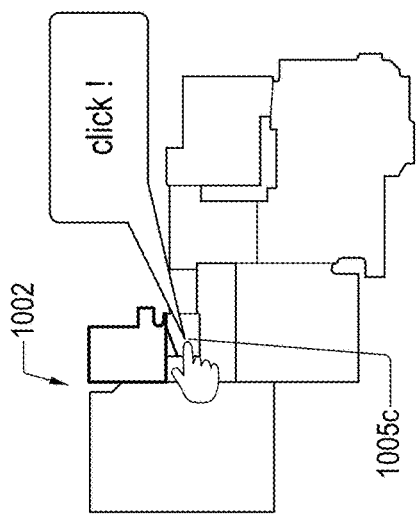
FIGS. 10A through 10F are graphical representations that may be displayed via a user interface of a communication device illustrating operations for performing user region merging on a segmentation map according to some embodiments of the present invention.
Figure 10B:
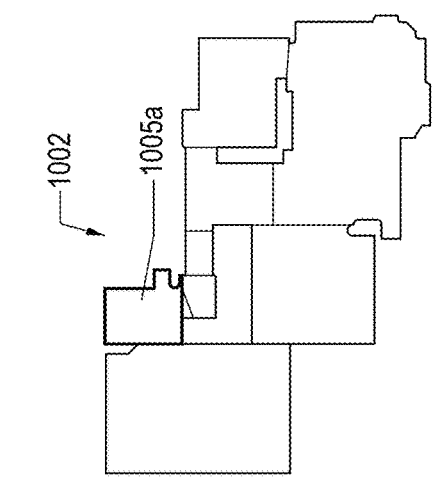

FIGS. 10A through 10F are graphical representations 1002 that may be displayed via a user interface of a communication device illustrating operations for performing user region merging on a segmentation map according to some embodiments of the present invention. Referring to FIG. 10A, a user may select a particular region 1005a of the displayed image of the segmentation map. The selection may be performed using a pointing input such as a mouse, trackball and/or stylus and/or via a touch screen user input. FIG. 10B illustrates the displayed image of the segmentation map with the selected region 1005a highlighted.

Figure 10C:
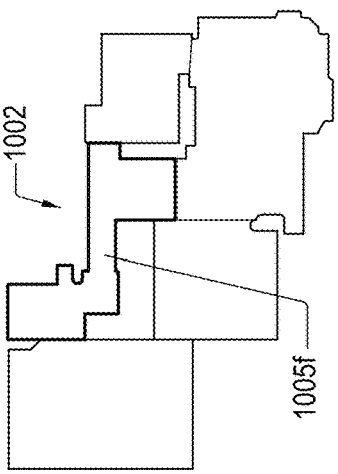
Figure 10D:
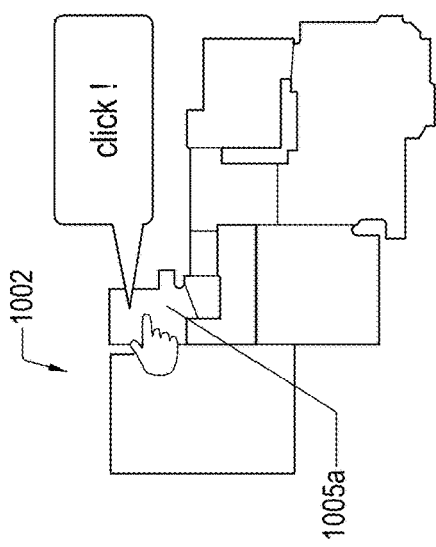
Figure 10E:
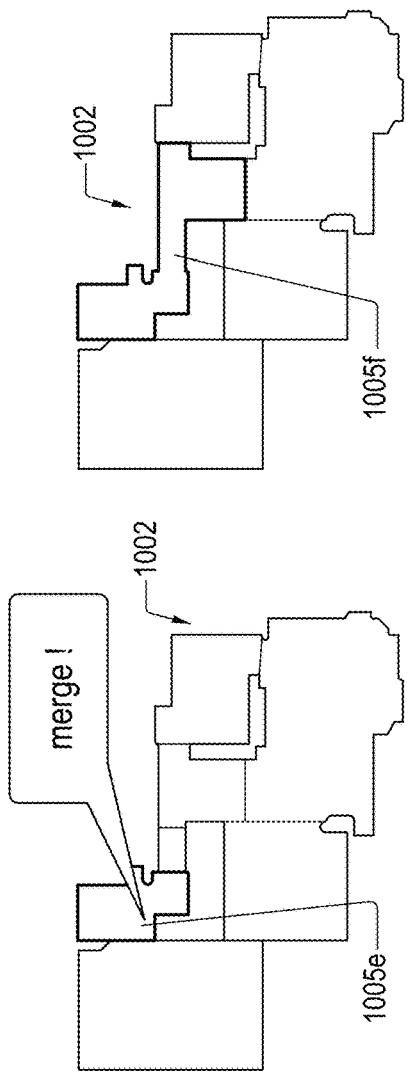
Figure 10F:
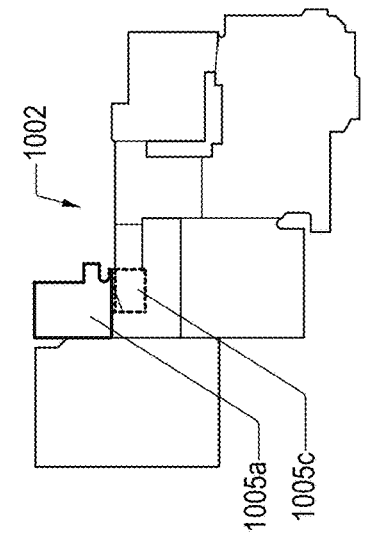

Referring to FIG. 10C, the user may select another region 1005c of the displayed image of the segmentation map that is adjacent the first selected region. FIG. 10D illustrates the displayed image of the segmentation map with both of the selected regions 1005a, 1005c highlighted. Referring to FIG. 10E, the user may provide a user input to merge the selected regions 1005a, 1005c into a single region 1005e. The user input may be received via a menu that identifies actions and/or by a voice command. FIG. 10F illustrates the displayed image of the segmentation map with multiple of the original regions merged into a single region 1005f. In some embodiments, the merge operation may be performed multiple times on two regions to generate a single region that includes more than two of the originally defined regions. Some embodiments provide that more than two of the regions may be selected before the user input to perform the merge operation is received.

Figure 11A:
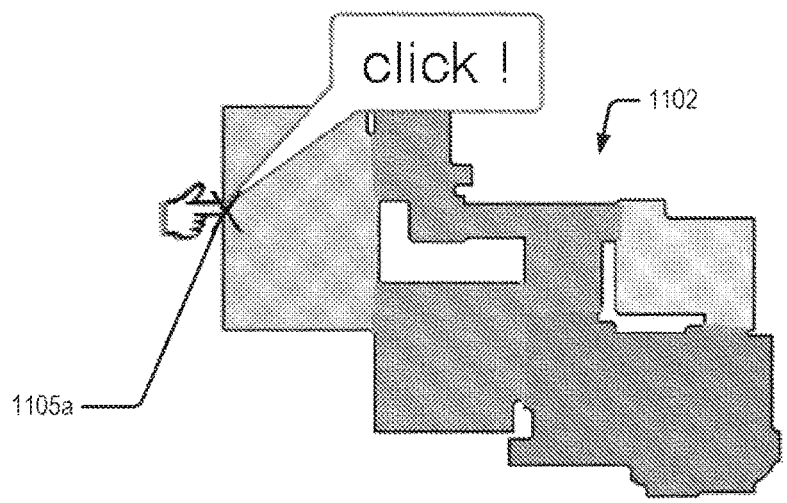
FIGS. 11A through 11C are graphical representations that may be displayed via a user interface of a communication device illustrating operations for performing user region splitting on a segmentation map according to some embodiments of the present invention.
Figure 11B:
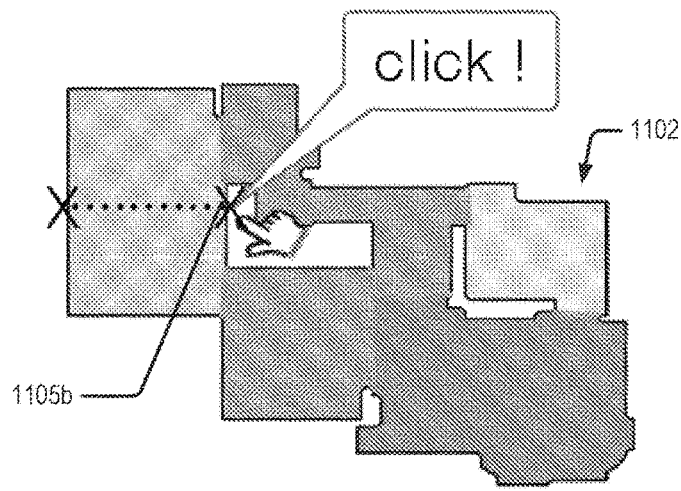
Figure 11C:
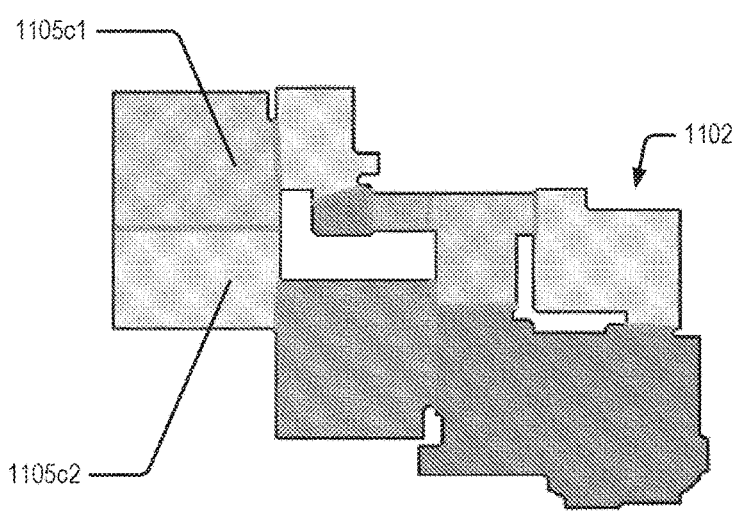

FIGS. 11A through 11C are graphical representations 1102 that may be displayed via a user interface of a communication device illustrating operations for performing user region splitting on a segmentation map according to some embodiments of the present invention. In some embodiments, for various reasons, a user may determine that a region as provided in the segmentation map should be divided into more than one region. For example, a single space may have a defined kitchen area and adjoining living space separated by various design artifacts, such as flooring type changes, and may be treated differently based on cleaning need. Referring to FIG. 11A, an endpoint 1105a of a division line in the region to be divided may be selected by the user. Then, referring to FIG. 11B, the other endpoint 1105b of the division line in the region to be divided may be selected by the user. The user may thus provide a user input to divide the selected region into the two regions 1105c1, 1105c2 shown in FIG. 11C. In some embodiments, the division operation is selected before the endpoints 1105a, 1105b of the division line are identified. In such embodiments, the division operation may automatically be performed once the second endpoint 1105b of the division line is selected.

Figure 12A:
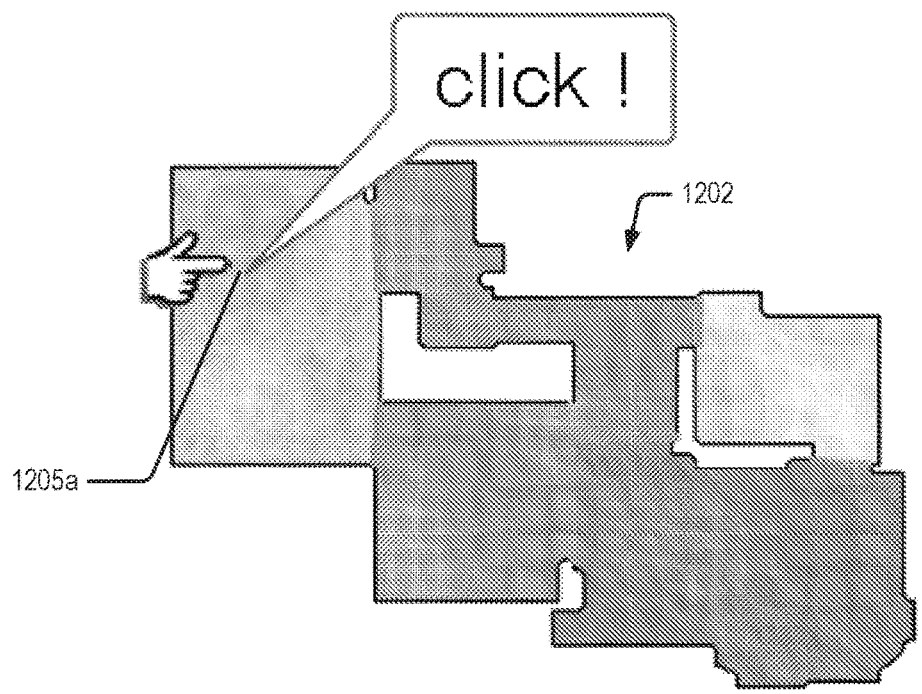
FIGS. 12A through 12D are graphical representations that may be displayed via a user interface of a communication device illustrating operations for performing user region labeling on a segmentation map according to some embodiments of the present invention.
Figure 12B:
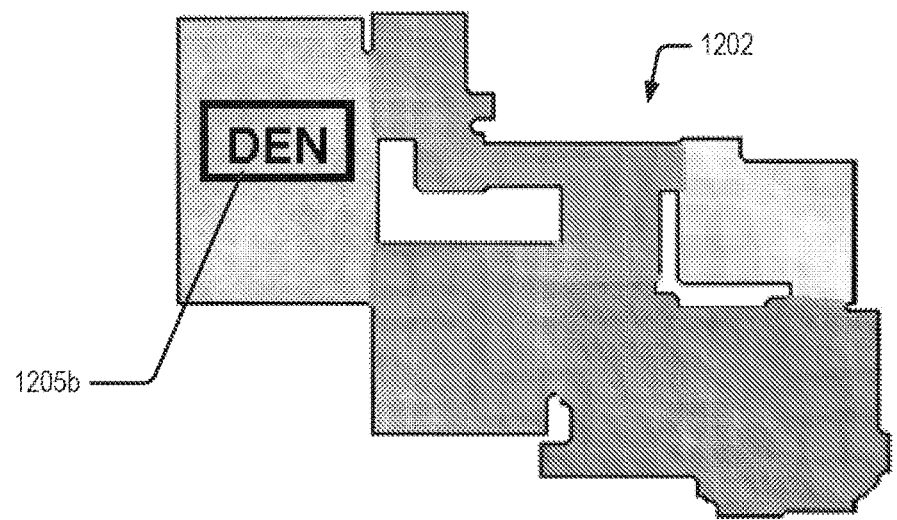
Figure 12C:
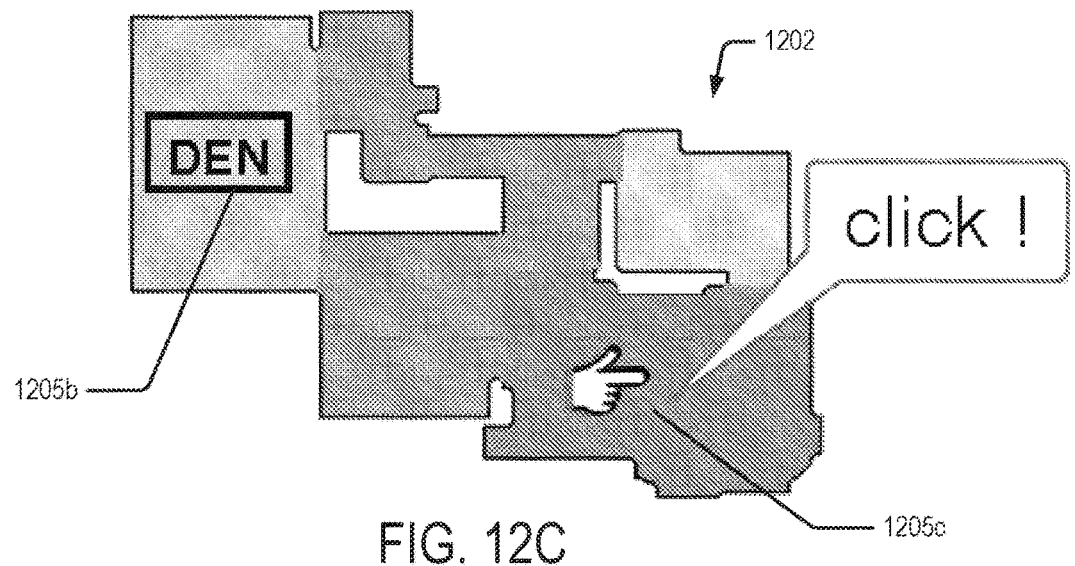
Figure 12D:
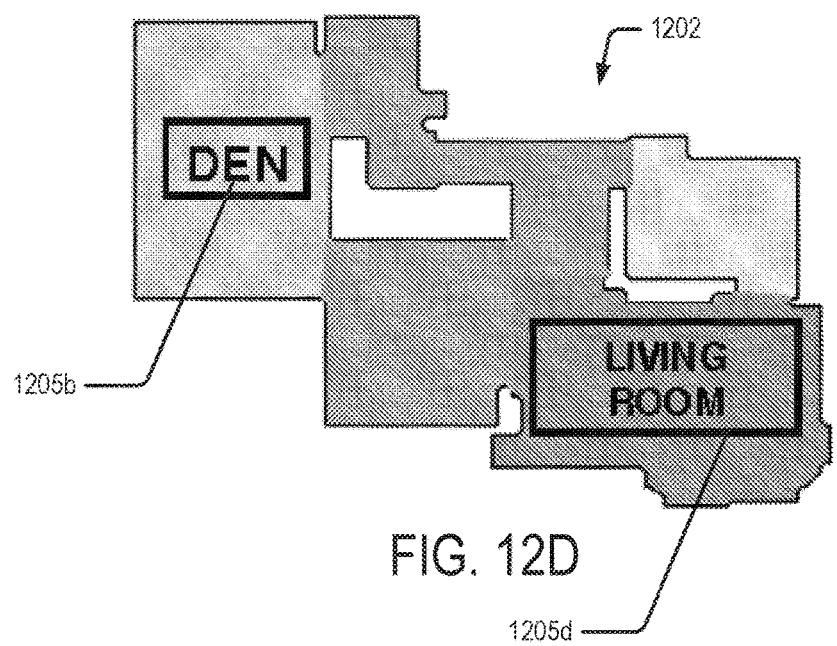

FIGS. 12A through 12D are graphical representations 1202 that may be displayed via a user interface of a communication device illustrating operations for performing user region labeling on a segmentation map according to some embodiments of the present invention. Each of the regions of the segmentation map may be labeled according to a user preference. Referring to FIG. 12A, a labeling operation may begin with the user selecting a region 1205a of the segmentation map. FIG. 12B illustrates text box 1205b that may be displayed that includes the label provided by the user. For example, in the current example, the user selects a region in FIG. 12A and then inputs the label "DEN" 1205b for the selected region 1205a in FIG. 12B. FIGS. 12C and 12D illustrate similar operations corresponding to the selection 1205c and labeling 1205d of the "LIVING ROOM" region.

Figure 13:
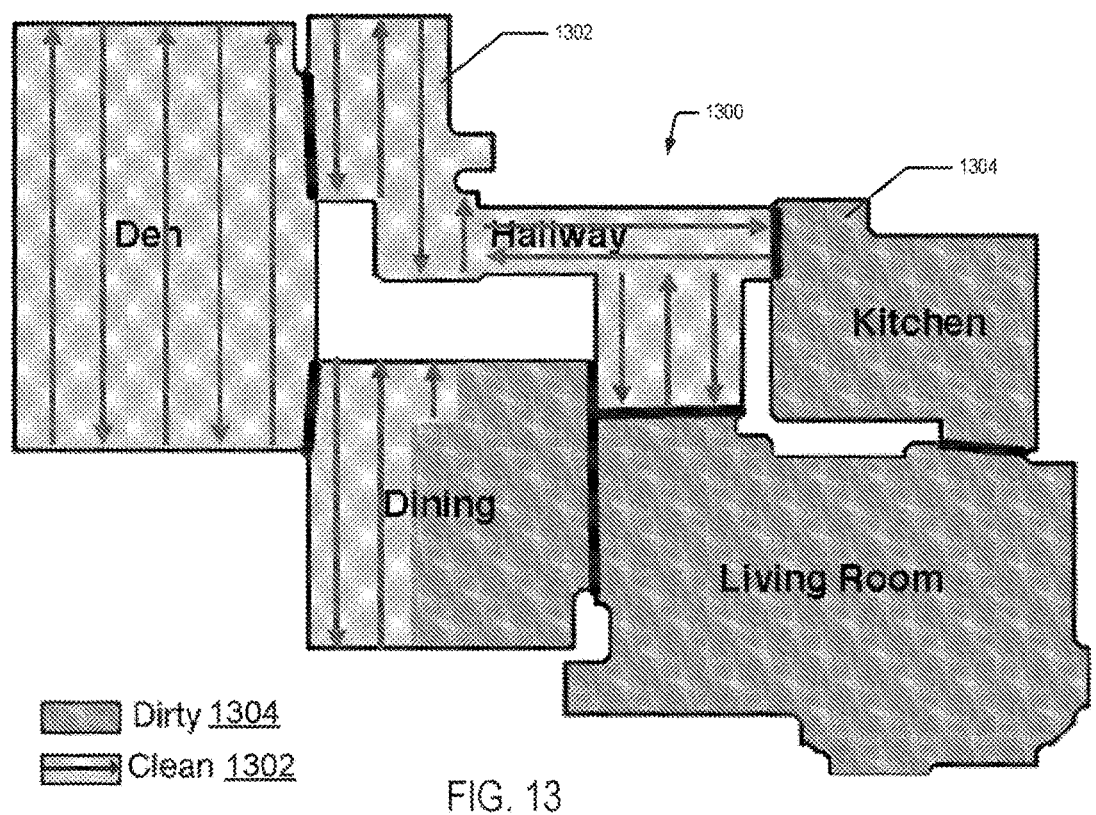
FIG. 13 is a graphical representation that may be displayed via a user interface of a communication device illustrating operations for displaying progress of a robot on a segmentation map according to some embodiments of the present invention.

FIG. 13 is a graphical representation 1300 that may be displayed via a user interface of a communication device illustrating operations for displaying progress of a robot on a segmentation map according to some embodiments of the present invention. As illustrated, the display of the segmentation map may include an indication of the cleaning progress corresponding to a cleaning mission being performed. For example, cleaned regions and/or portions thereof 1302 may be represented by a first color, pattern, and/or shading that is different from the color, pattern and/or shading representing uncleaned regions and/or portions thereof 1304. In this manner, a user may be informed as to which regions and/or portions thereof may expect or not expect to be occupied by the robot.

Figure 14:
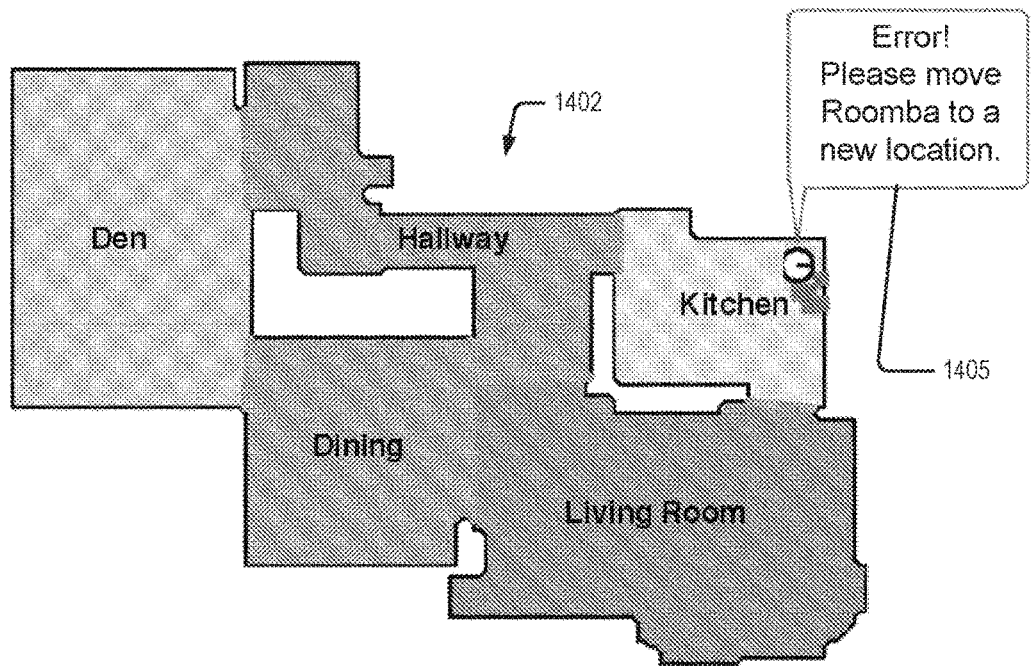
FIG. 14 is a graphical representation that may be displayed via a user interface of a communication device illustrating operations for providing an alert to a user of a failure condition on a segmentation map according to some embodiments of the present invention.

FIG. 14 is a graphical representation 1402 that may be displayed via a user interface of a communication device illustrating operations for providing an alert 1405 to a user of a failure condition on a segmentation map according to some embodiments of the present invention. In some embodiments, the display may include a message and/or other symbol that is generated based on a message from the robot. For example, the communication device may receive a message that is generated by the robot that indicates a condition that has or is occurring during a cleaning mission. For example, if the robot gets stuck or trapped, an alert message may be received and displayed to the user. Other examples may include alerts generated by the robot that indicate that the robot may not have completed a cleaning mission.

Figure 15:
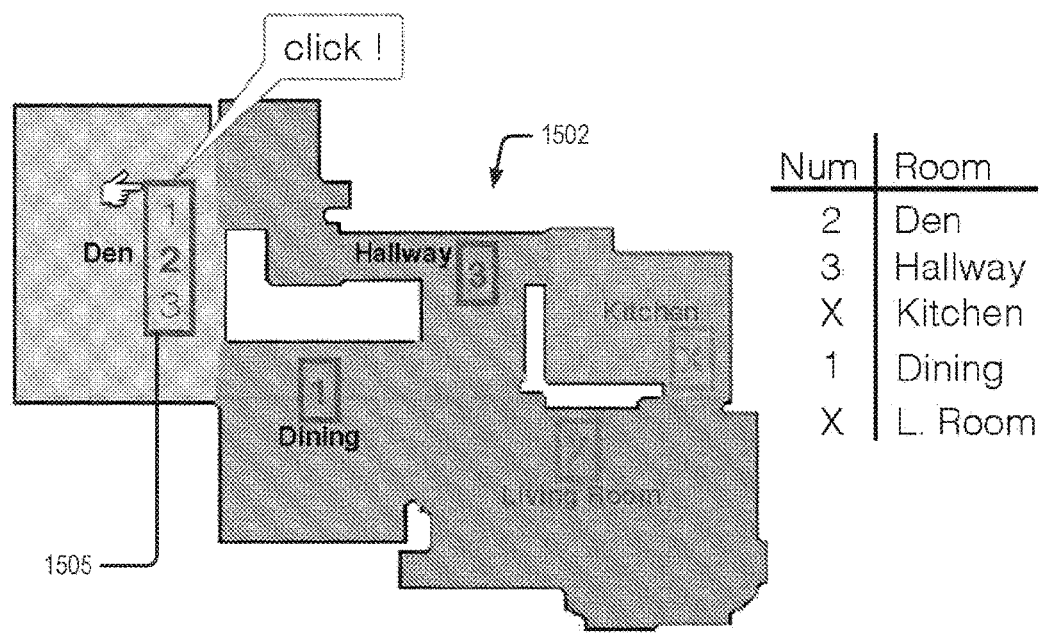
FIG. 15 is a graphical representation that may be displayed via a user interface of a communication device illustrating operations for receiving user input to provide a cleaning sequence of a robot on a segmentation map according to some embodiments of the present invention.

FIG. 15 is a graphical representation 1502 that may be displayed via a user interface of a communication device illustrating operations for receiving user input to provide a cleaning sequence (1, 2, 3) of a robot on a segmentation map according to some embodiments of the present invention. In some embodiments, a user may provide a user input corresponding to a cleaning order. For example, each of the regions of the segmentation map may be labeled with a cleaning order number 1, 2, 3. In some embodiments, the cleaning order may be entered via a table 1505 of the regions that is displayed to the user, while other embodiments provide that the user simply selects the region and enters the value corresponding to the order of cleaning. Some embodiments provide that some of the regions may be deselected for cleaning during a given mission. For example, as illustrated, the kitchen and living room may have an order number of "X" that indicates that these regions are not to be cleaned.

Figures 16A, 16B, 16C, 16D:
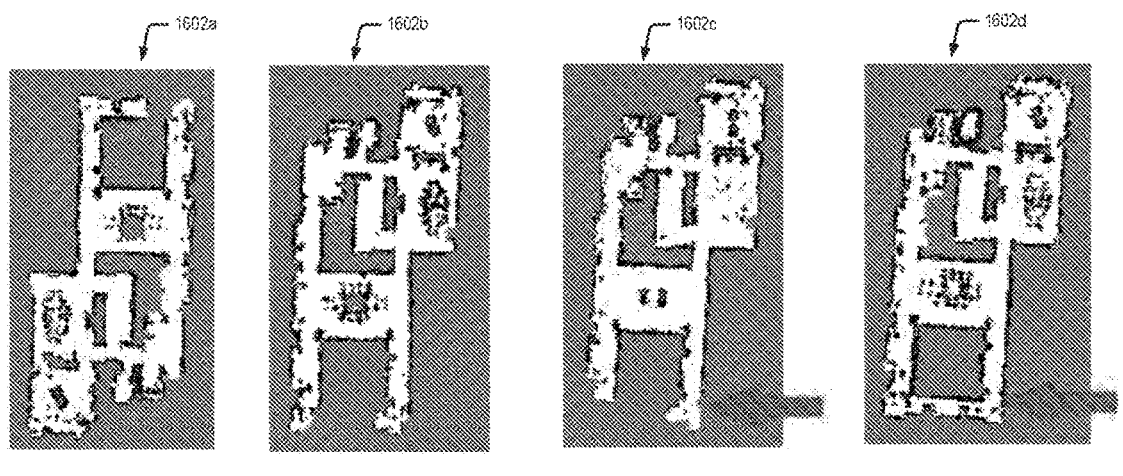
FIGS. 16A through 16G are graphical representations that may be displayed via a user interface of a communication device illustrating operations for map aggregation using multiple runs in the same occupancy according to some embodiments of the present invention.
Figure 16E:
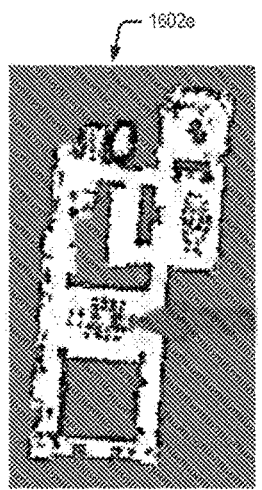
Figure 16F:
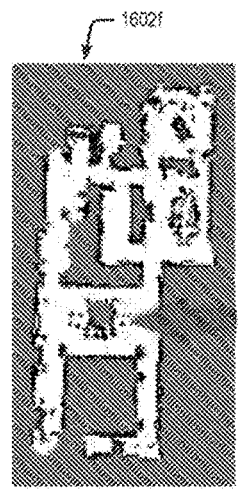
Figure 16G:
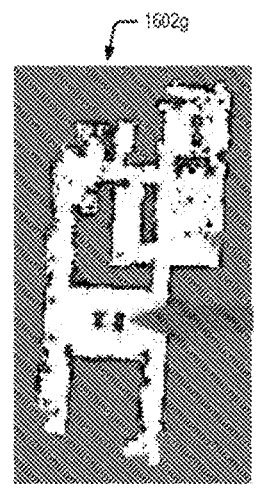

FIGS. 16A through 16G are graphical representations 1602a-1602g that may be displayed via a user interface of a communication device illustrating operations for map data aggregation using multiple runs in the same occupancy according to some embodiments of the present invention. FIGS. 16A-16D illustrate displays of a raw data maps that include additional raw data that is gathered by the robot during subsequent runs in the same occupancy. For example, for FIG. 16A to FIG. 16B the raw data map undergoes autorotation (180 degrees) and alignment. As illustrated, the raw data from FIG. 16B reflects an alignment of different portions of the raw data relative to FIG. 16A and a 180 degree rotation relative to the initial raw data illustrated in FIG. 16A. FIGS. 16C and 16D illustrate that additional raw data is used to substantially complete the raw data map. For example, FIG. 16C illustrates additional raw data being added relative to FIG. 16B, thus advancing the overall completion of the raw data map. Similarly, FIG. 16D illustrates even further map completion of the raw data. FIGS. 16E through 16G illustrate the removal of non-static obstacles detected intermittently or only on one or some of the total missions. In this manner, the integrity, accuracy and/or content of the raw data map may be increased during each additional run. For example, FIG. 16E illustrates clutter detection in a portion of a room. FIG. 16F illustrates identification of non-static objects that are part of the detected clutter and FIG. 16G illustrates the removal of non-static objects from the raw data map. It will be understood that persistency of the map may be required in order to accurately overlay maps from each run shown in FIGS. 16A-16D with each other. Also, clutter detection can be significantly improved because, when observing obstacles over time, the location of static obstacles may stay the same whereas the locations of clutter/non-static obstacles may change over time.

Figure 17A:
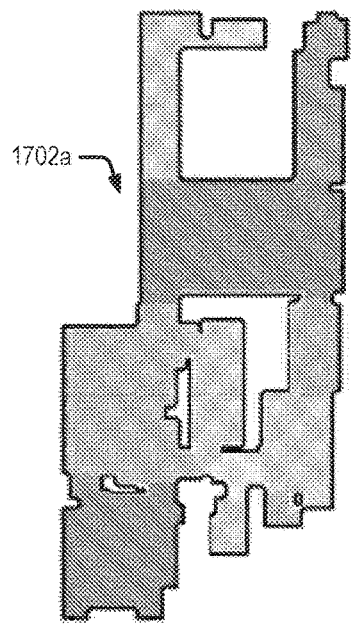
FIGS. 17A and 17B are graphical representations that may be displayed via a user interface of a communication device illustrating a segmentation map from the aggregating operations based on the raw data maps illustrated in FIGS. 16A-16G that are without clutter and that include clutter, respectively, according to some embodiments of the present invention.
Figure 17B:
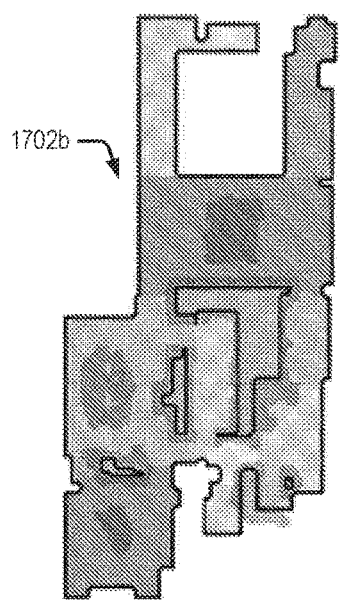

FIGS. 17A and 17B are graphical representations 1702a and 1702b that may be displayed via a user interface of a communication device illustrating a segmentation map from the aggregating operations based on the raw data maps illustrated in FIGS. 16A-16G that are without clutter and that include clutter, respectively, according to some embodiments of the present invention. As illustrated, FIG. 17A is an image of a segmentation map 1702a corresponding to the raw data maps illustrated in FIGS. 16A-16G without clutter. In contrast, FIG. 17B is an image of a segmentation map 1702b corresponding to the raw data maps illustrated in FIGS. 16A-16G with clutter regions identified in the corresponding segmentation map regions.

Figure 18A:
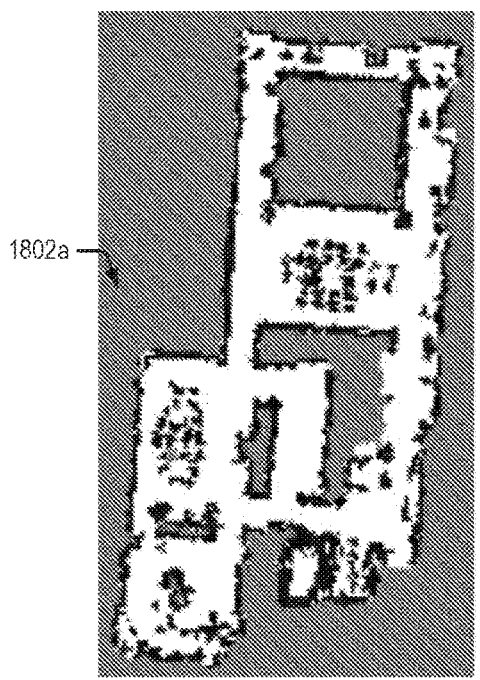
FIGS. 18A and 18B are graphical representations that may be displayed via a user interface of a communication device illustrating raw data of an occupancy map and a three-dimensional representation of the occupancy map, respectively, based on the raw data maps illustrated in FIGS. 16A-16G according to some embodiments of the present invention.
Figure 18B:
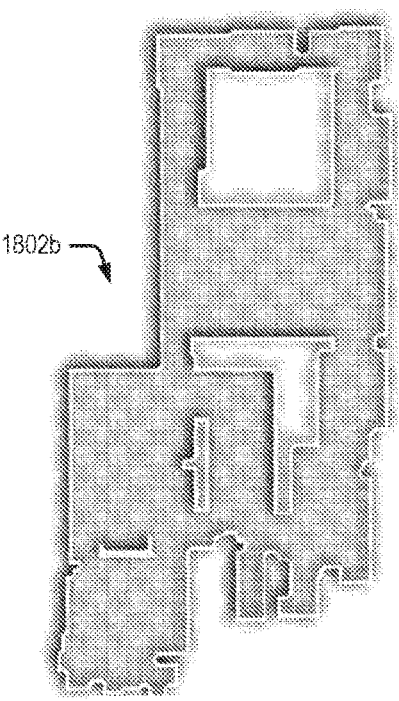

FIGS. 18A and 18B are graphical representations 1802a and 1802b that may be displayed via a user interface of a communication device illustrating raw data of an occupancy map and a three-dimensional representation of the occupancy map, respectively, based on the raw data maps illustrated in FIGS. 16A-16G according to some embodiments of the present invention. As illustrated, FIG. 18A is the raw data map 1802a illustrated above as FIG. 16E and FIG. 18B is an image of a three-dimensional representation 1802b of the occupancy map based thereon.

Figure 19:
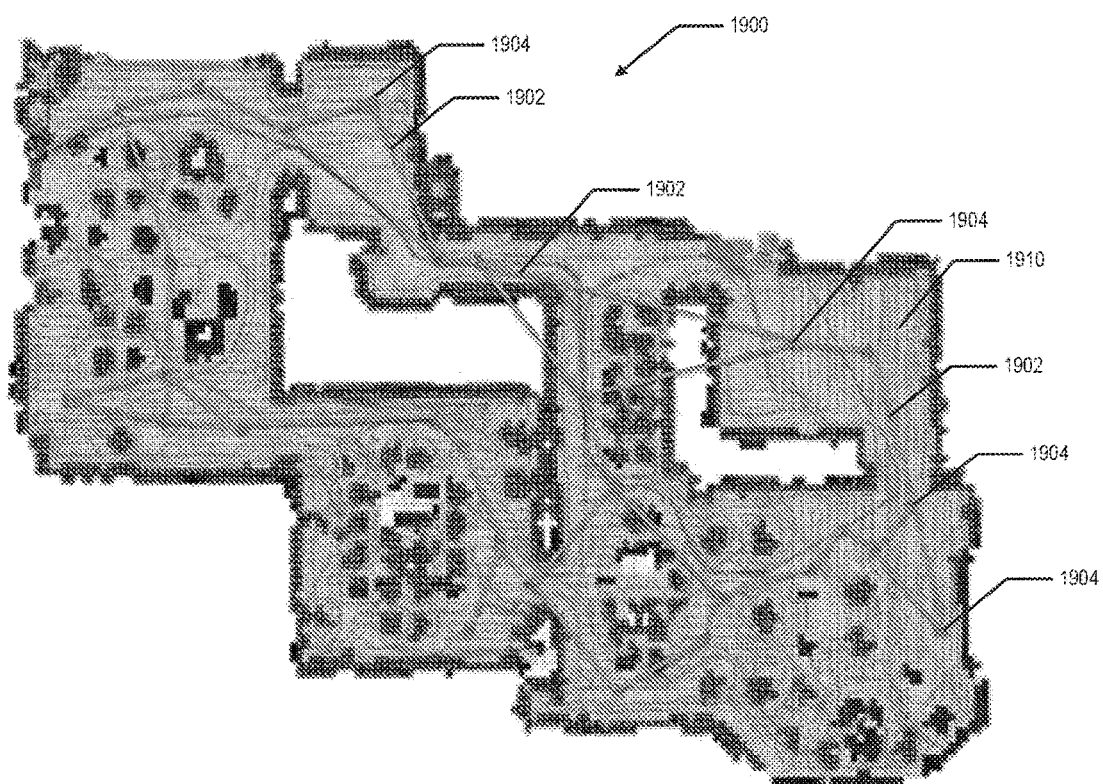
FIG. 19 is a graphical representation that may be displayed via a user interface of a communication device illustrating an occupancy map illustrating operations for generating persistent information corresponding to an enclosed space according to some embodiments of the present invention.

FIG. 19 is a graphical representation 1900 that may be displayed via a user interface of a communication device illustrating an occupancy map illustrating operations for generating persistent information corresponding to an enclosed space according to some embodiments of the present invention. The occupancy map 1900 illustrates the floor plan of the enclosed space as mapped by the robot. The robot cleaning path 1910 is identified over all of the available floor surface of the enclosed space. Additionally, landmarks 1904, which may be determined, generated and/or assigned by the robot, are identified throughout the occupancy map 1900. Specific regions corresponding to multiple ones of the landmarks 1904 may be identified as landmark regions 1902 and may include trajectories and/or primitives defined by the landmarks 1904. In some embodiments, the term "landmark" may include locations that are specifically identified in one or more maps and may also be referred to as waypoints.

Figure 20A:
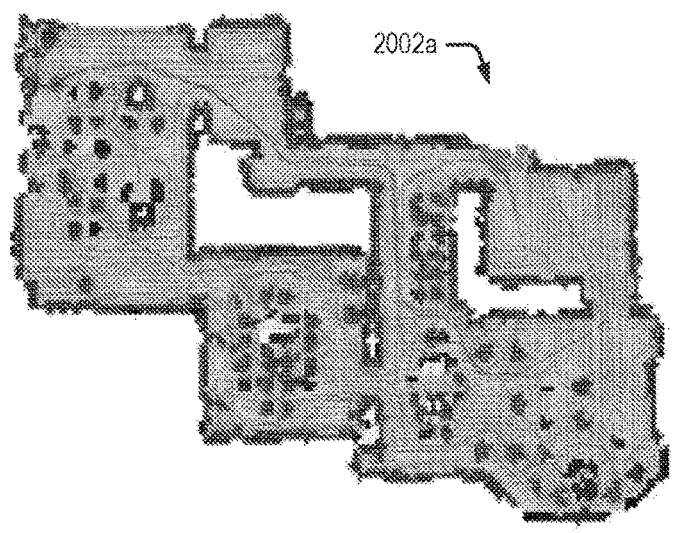
FIGS. 20A through 20K are graphical representations that may be displayed via a user interface of a communication device illustrating views of occupancy maps and segmentation maps corresponding to data gathered during robot exploration according to some embodiments of the present invention.
Figure 20B:
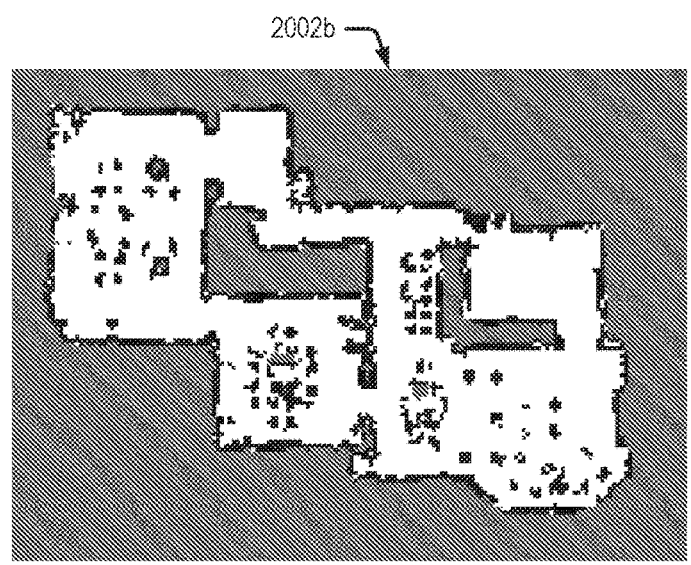
Figure 20C:
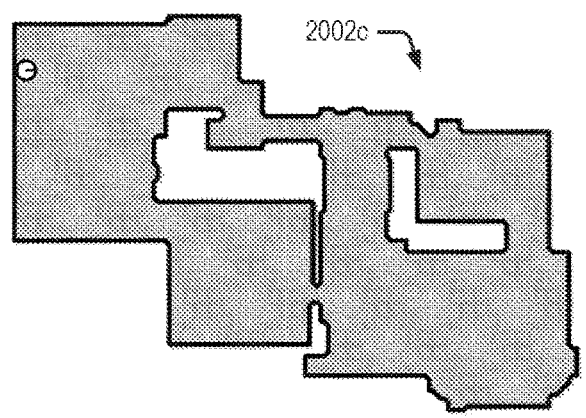
Figure 20D:
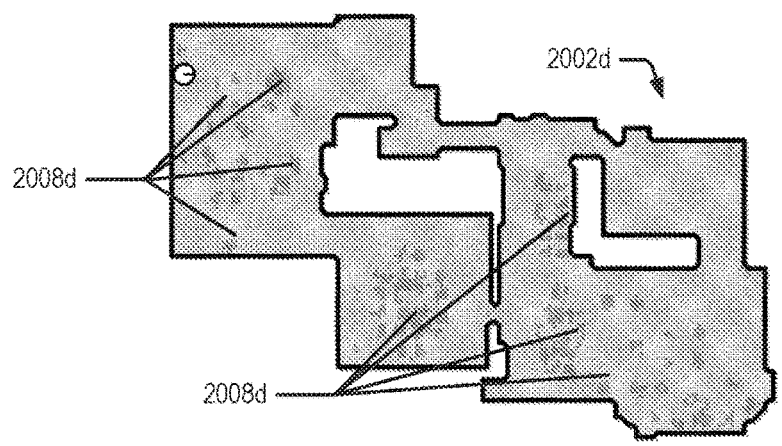
Figure 20E:
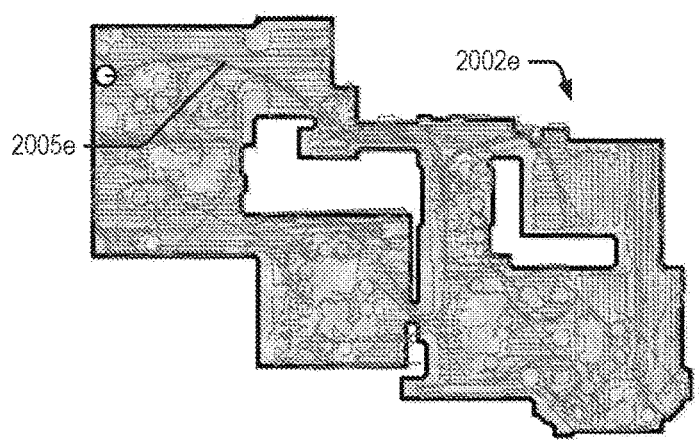
Figure 20F:
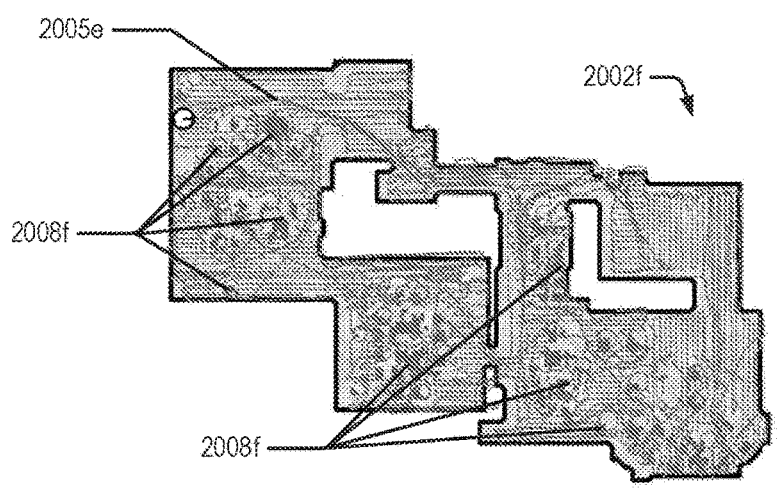

FIGS. 20A through 20K are graphical representations 2002a-2002k that may be displayed via a user interface of a communication device illustrating views of occupancy maps and segmentation maps corresponding to data gathered during robot exploration of an enclosed space according to some embodiments of the present invention. As illustrated, FIG. 20A includes an image of a raw data occupancy map 2002a that includes clutter and other non-traversable regions within the traversable floor space and the path that the robot traversed during the exploration and/or cleaning pass of a cleaning mission. A raw data map 2002b of the enclosed space is provided in FIG. 20B and a clean occupancy map 2002c is illustrated in FIG. 20C. FIG. 20D illustrates a display of a clean occupancy map 2002d with clutter pixels 2008d. A clean map 2002e including the path 2005e that the robot traversed without clutter displayed is illustrated in FIG. 20E and a clean map including the path 2005e that the robot traversed with clutter displayed as solidly filled patches 2008f is illustrated in FIG. 20F.

Figure 20G:
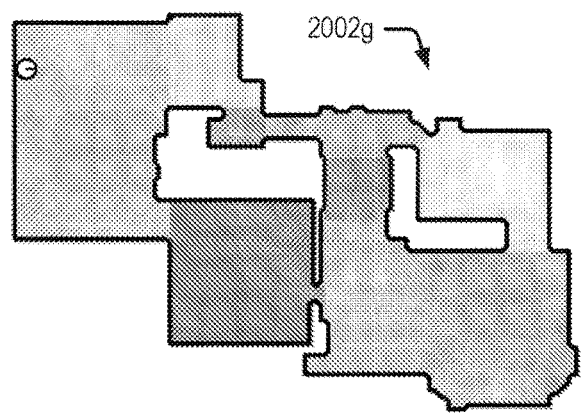
Figure 20H:
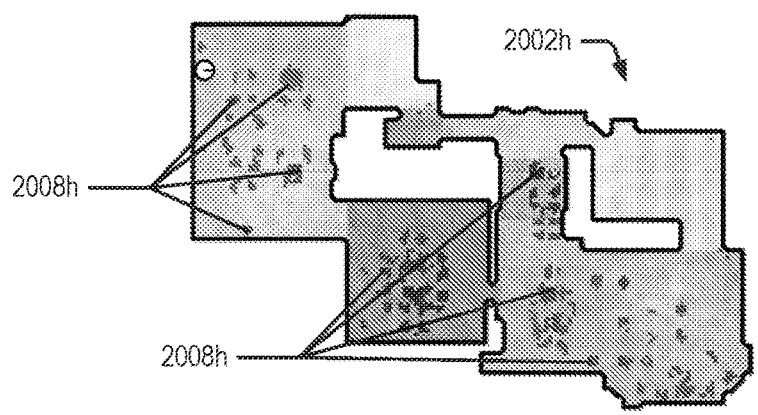
Figure 20I:
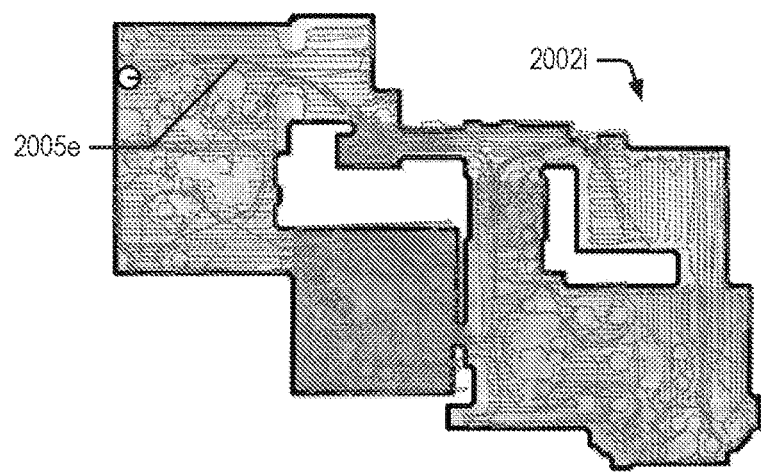
Figure 20J:
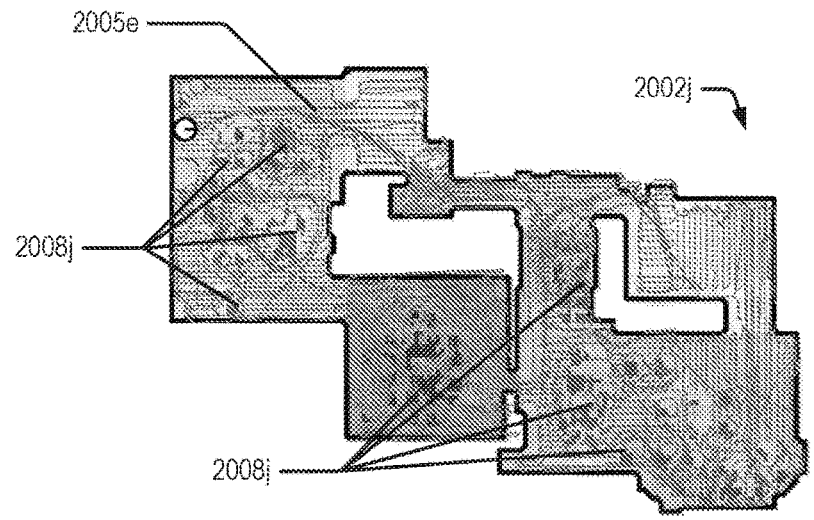
Figure 20K:
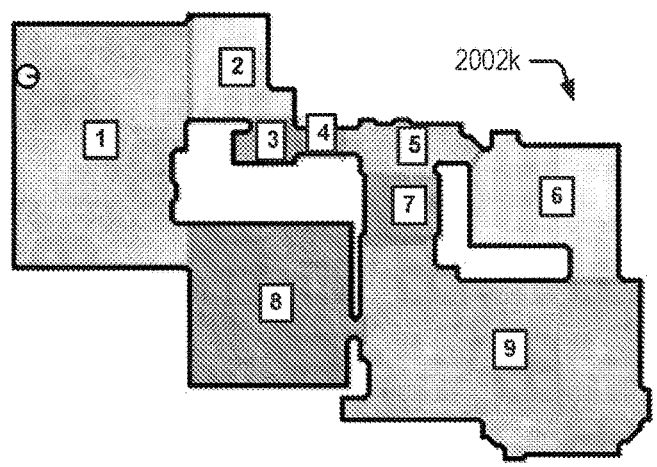

A display of a segmentation map 2002g of the enclosed space without clutter is illustrated in FIG. 20G and a display of the segmentation map 2002h of the enclosed space with clutter displayed as solidly filled patches 2008h is illustrated in FIG. 20H. FIG. 20I illustrates a display of a segmentation map 2002i including the path 2005e that the robot traversed without the clutter displayed and FIG. 20J illustrates a display of a segmentation map 2002j including the path 2005e that the robot traversed with the clutter 2008j displayed. A display of the segmentation map 2002k that includes boundaries between regions therein and that includes region numbers 1-9 is illustrated in FIG. 20K.

Figure 21:
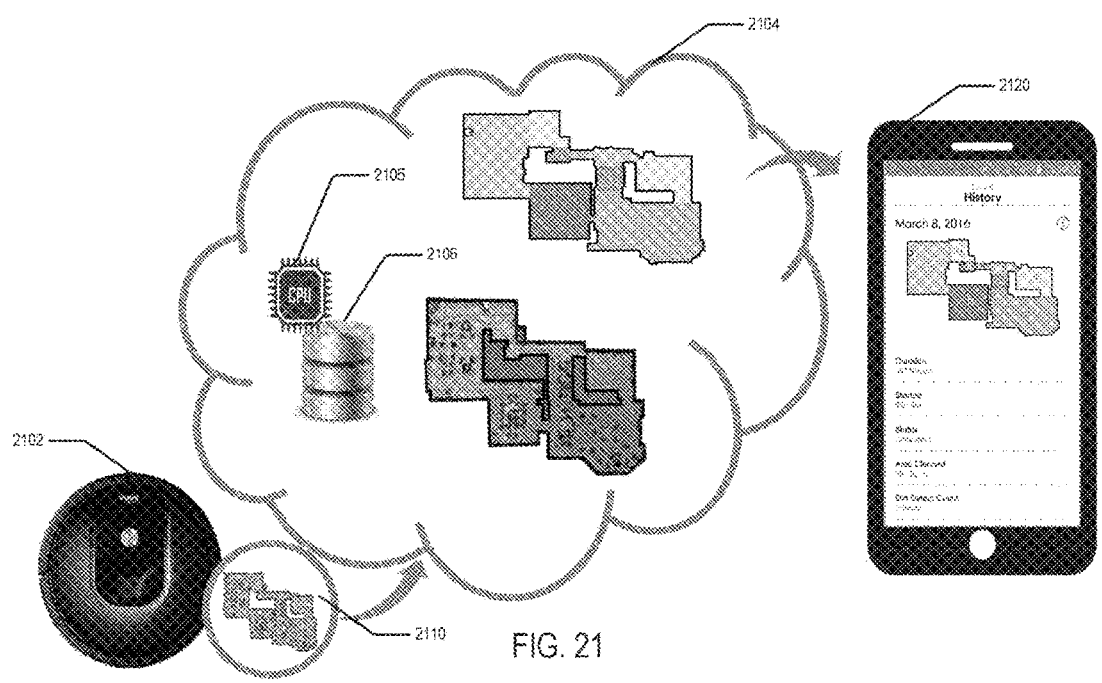
FIG. 21 is a diagram illustrating a system of devices that may be used to provide robot management according to some embodiments of the present invention.

FIG. 21 is a diagram illustrating a system of devices that may be used to provide robot management according to some embodiments of the present invention. The system may include a robot 2102 that may generate occupancy data and/or a segmentation map 2110 of a floor surface of an enclosed space. The robot 2102 may be the same as the robot 100 described herein. As such, additional description thereof will be omitted. In some embodiments, the occupancy data and/or segmentation map 2110 may be transmitted to a cloud device and/or system 2104. In some embodiments, the cloud device and/or system 2104 may include the robot management node 200 described herein. The cloud device and/or system 2104 may include a processor 2105 and user data store 2106 that may store user input history (including identifications of clutter patterns from a plurality of users), occupancy map history, segmentation map history, and/or robot performance and/or communication history, which may be used in accordance with embodiments described herein to maintain and update persistent maps. While some embodiments provide that the robot 2102 performs the computation of the segmentation map 2110, in some embodiments the computation may be performed by the cloud device and/or system 2104 based on the occupancy data collected by the robot 2102.

In some embodiments, the cloud device and/or system 2104 may provide a communication channel between the robot 2102 and a user device 2120. The user device 2120 may be the same as the user device 202 described herein. The user device 2120 may provide user inputs that allow a user to edit and/or label an occupancy and/or segmentation map. Further, the user device 2120 may be used to modify the segmentation map to include specific instructions for one or more cleaning missions. Such instructions may include cleaning order, rank direction, and/or cleaning level, among others. The user device 2102 may also provide inputs for selecting display characteristics such as clutter inclusion/ exclusion, view dimensionality, zoom, viewing angle, cleaning mission playback options, cleaning progress, expected time of cleaning mission completion, historical, per use and/or aggregate data, among others.

Additionally, the user device 2120 may be operative to receive messages and/or data from the robot 2102 and/or the cloud device and/or system 2104. For example, the user device 2120 may receive performance data corresponding to the status and/or performance of the robot 2102 and/or alert messages that are generated by the robot 2102, among others. For example, a heat map that displays the level of cleaning that was performed and/or the amount of dirt and/or debris that was collected as a function of location may be provided.

Figure 22:
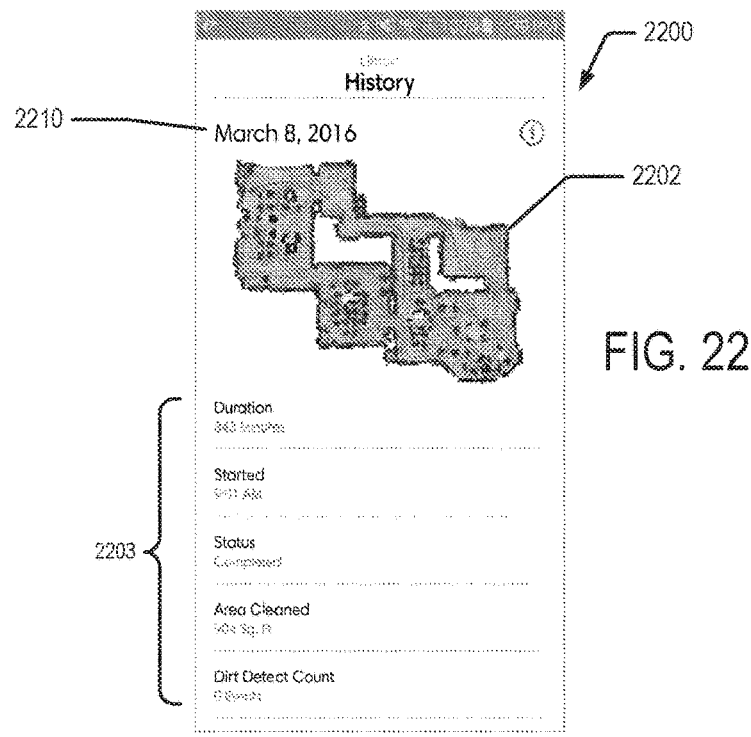
FIG. 22 is a graphical representation that may be displayed via a user interface of a communication device illustrating a history screen including a mission coverage map corresponding to a cleaning mission according to some embodiments of the present invention.

FIG. 22 is a graphical representation that may be displayed via a user interface of a communication device illustrating history screen 2200 including a mission coverage map 2202 corresponding to a cleaning mission according to some embodiments of the present invention. As illustrated, responsive to receiving a user input to provide cleaning history, the user device may display a history screen 2200 that includes time information such as the date 2210, a mission coverage map 2202, and cleaning mission performance data 2203. Cleaning mission performance data 2203 may include the duration of the cleaning mission, the start and/or end time, a mission status, the amount of area cleaned during the cleaning mission and/or a dirt detection count.

Figure 23:
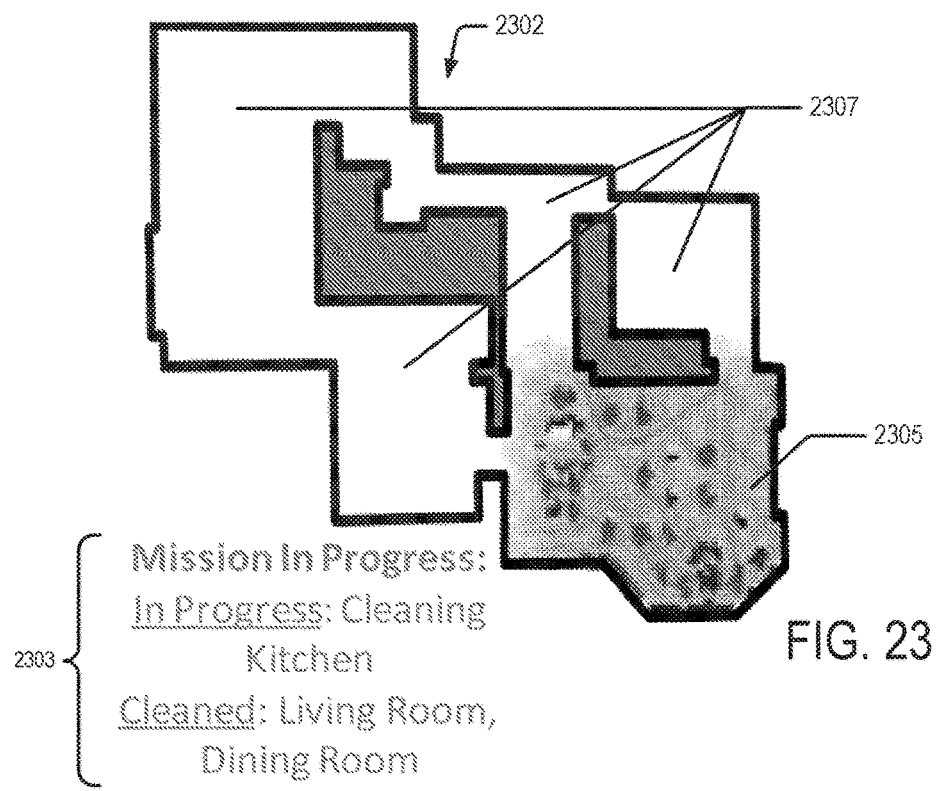
FIG. 23 is a graphical representation that may be displayed via a user interface of a communication device illustrating an occupancy map illustrating real-time reporting corresponding to a cleaning mission according to some embodiments of the present invention.

FIG. 23 is a graphical representation that may be displayed via a user interface of a communication device illustrating a map 2302 including real-time reporting corresponding to a cleaning mission of an enclosed space according to some embodiments of the present invention. Responsive to receiving a user input requesting cleaning mission progress data, the user device may display the occupancy map and/or segmentation map 2302 including an identification of which regions and/or portions thereof are cleaned 2305 and which regions and/or portions thereof that are not cleaned 2307 in the current cleaning mission. Some embodiments provide that additional text 2303 may be provided that identifies which regions have been cleaned and which region is in the cleaning process.

FIG. 24 is a graphical representation that may be displayed via a user interface of a communication device illustrating a map including a multi-mission coverage display according to some embodiments of the present invention. As illustrated, the occupancy and/or segmentation map may be displayed to include historical coverage data corresponding to multiple cleaning missions. For example, a heat map 2402 may be generated that identifies areas of the enclosed space that have been historically dirtier relative to other areas. The heat map 2402 may include different colors, shading, and/or brightness/intensity to illustrate a level of dirt and/or debris collected at respective locations. For example, the shading in the lower right area 2420 indicates a greater amount of detected and/or collected debris and/or dirt relative to the upper left area 2410, which is not shaded.

Figure 25:
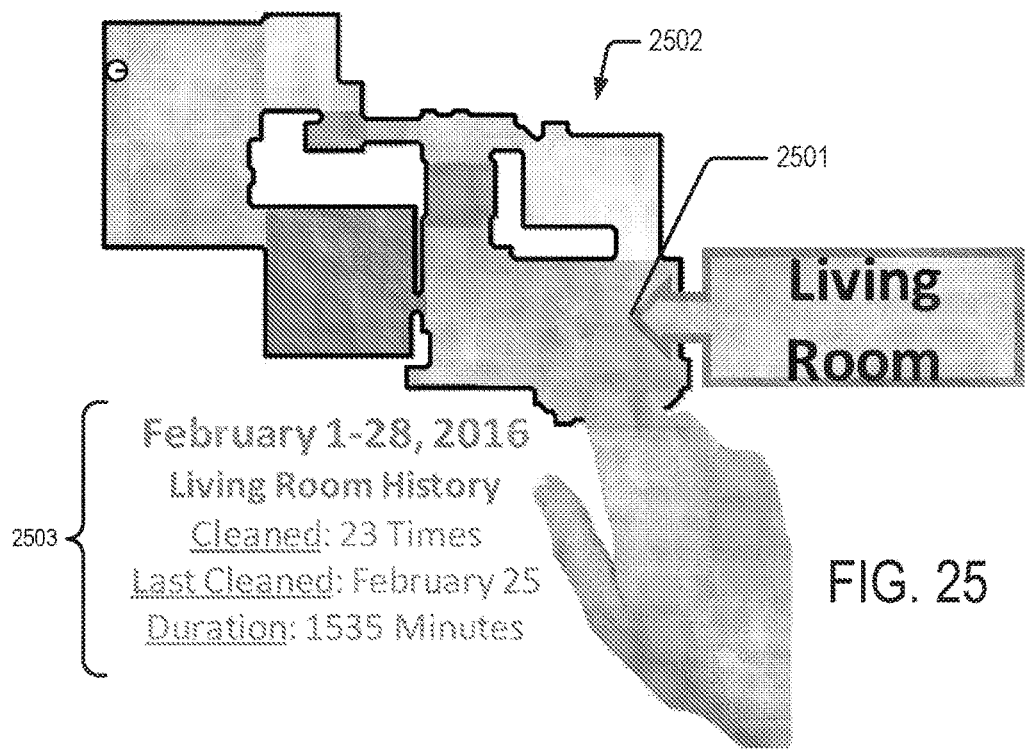
FIG. 25 is a graphical representation that may be displayed via a user interface of a communication device illustrating room-based data that may be displayed according to some embodiments of the present invention.

FIG. 25 is a graphical representation that may be displayed via a user interface of a communication device illustrating room-based data 2503 that may be displayed according to some embodiments of the present invention. In some embodiments, the user device may include a user input for display of room based statistics 2503. For example, some embodiments provide that a user may select a region 2501 on a segmentation map 2502 and that data 2503 corresponding to that region 2501 may be displayed responsive to receiving the input. For example, in response to a user input selecting the living room 2501 on the segmentation map 2502, the user device may display summary cleaning mission data 2503 corresponding to the living room including how many times the living room was cleaned, the date of the last cleaning, the total time spent cleaning the living room, and/or a date range corresponding to the displayed data.

Figure 26:
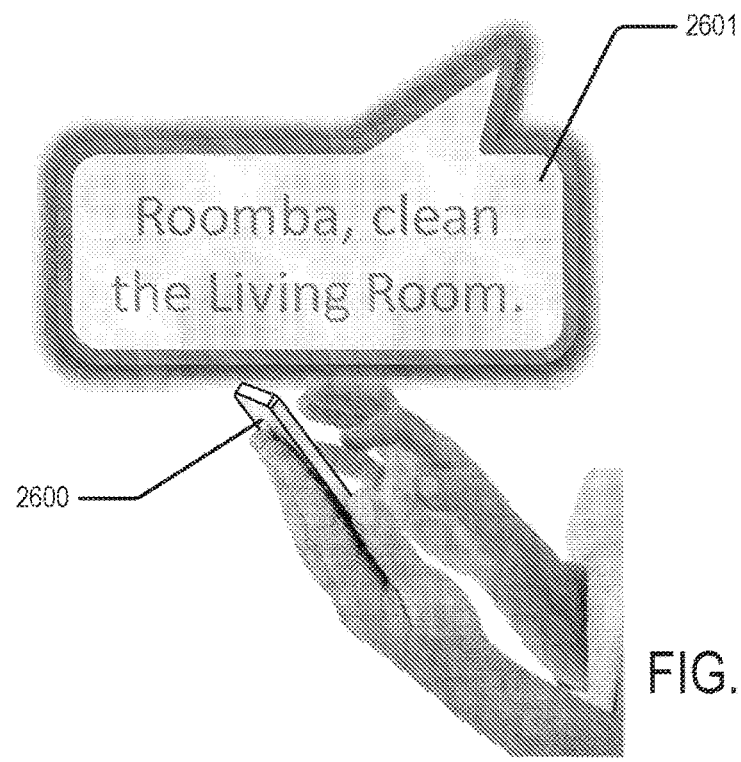
FIG. 26 is a graphical representation demonstrating operations in which user input may be provided via a communication device using a voice command according to some embodiments of the present invention.

FIG. 26 is a graphical representation demonstrating operations in which a user input may be provided via a communication device using a voice command 2601 according to some embodiments of the present invention. In some embodiments, the user device 2600 may include user inputs to clean a specific room. For example, the user input may be to clean a specific room immediately. In some embodiments, the user input may be received via voice command 2601 using voice recognition technology. Some embodiments provide that the voice command 2601 may be received from a device that is external to the user device 2600. For example, household management devices that may receive voice commands to perform other functions such as HVAC control, entertainment system control, etc. may receive the voice command 2601 and translate the message to the user device 2600, the robot 100, and/or the robot management node 200.

FIG. 27 is a graphical representation of receiving a user input to define a cleaning mission boundary 2705 responsive to a gesture on a touch screen of a communication device according to some embodiments of the present invention. In some embodiments, a condition in a particular room of the enclosed space 2702 may be utilized in a manner that renders the cleaning operation undesirable. In such circumstances, a boundary 2705 may be added to a region of the segmentation map via a user input of the user device. For example, a simple gesture on a touch screen blocking a region 2707 may cause the modified segmentation map to exclude that region 2707 from subsequent cleaning missions.

Figure 28A:
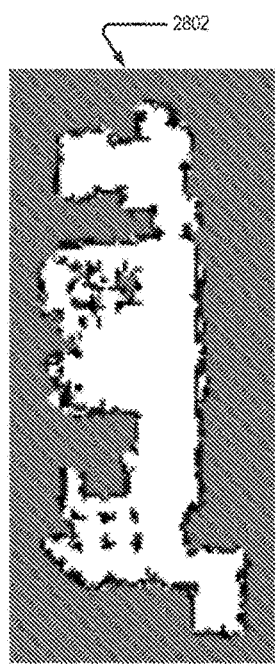
FIGS. 28A through 28C are graphical representations that may be displayed via a user interface of a communication device illustrating a raw data map, a cleaned map and a cleaned map with detected clutter regions according to some embodiments of the present invention.
Figure 28B:
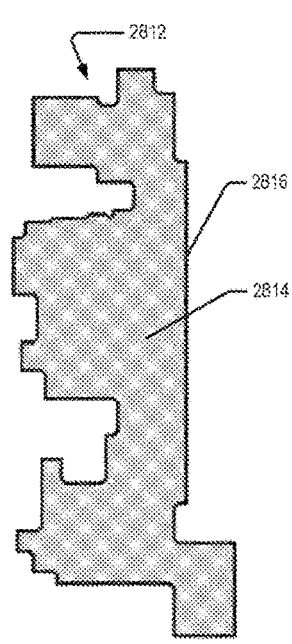
Figure 28C:
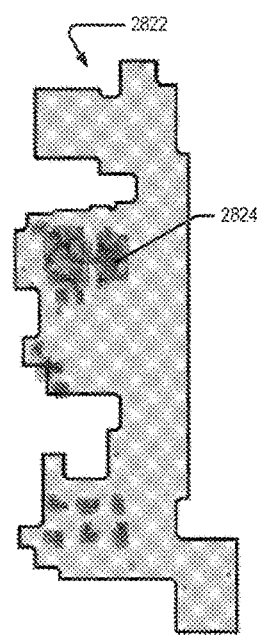

FIGS. 28A through 28C are graphical representations that may be displayed via a user interface of a communication device illustrating a raw data map 2802, a cleaned map 2812, and a cleaned map 2822 with detected clutter regions 2824 according to some embodiments of the present invention. As discussed above regarding FIG. 8A, some embodiments provide that a robot may explore a surface of an enclosed space during a first pass. An occupancy grid may be generated that includes raw data that is generated during the first pass. The occupancy grid may be presented to a user on a user device as a raw data map 2802 as illustrated in FIG. 28A. The raw data map 2802 may include multiple pixels that may be shaded white for traversable space and black for obstacles, including occupancy walls.

Referring to FIG. 28B, the robot may generate a cleaned map 2812 that may be displayed to the user on the user device. The cleaned map 2812 may illustrate the enclosed space with the boundary data 2816 cleaned up to be substantially more linear than the raw data and may highlight the traversable space 2814 of the enclosed space surface.

FIG. 28C illustrates cleaned map with detected clutter regions 2822 that may be displayed to the user on the user device. Relative to the cleaned map 2812, the cleaned map with detected clutter regions 2822 illustrates the enclosed space with the clutter regions 2824. In some embodiments, the operations may further determine whether the clutter 2824 is dynamic clutter or static clutter. For example, the robot may determine that clutter 2824 is static clutter by determining a probability that the clutter will be encountered more frequently, and/or by accessing a data store including patterns of clutter identified by one or more other robots and/or users, as described below with reference to FIGS. 35A through 35D. Some embodiments provide that clutter that is determined to be static may be marked on the map using darker cells relative to clutter that has a lower probability of being encountered repeatedly. The darker cells may indicate known areas that are not traversable. By identifying such features, the robot may be operative to identify clutter regions that may be cleaned after traversable space is cleaned deterministically in ranks. Cleaning non-clutter regions first can increase mission efficiency.

FIGS. 29A through 29D are graphical representations that may be displayed via a user interface of a communication device illustrating a segmentation map that includes respective area-specific cleaning operations according to some embodiments of the present invention. Referring to FIG. 29A, a segmentation map 2902 includes regions and portions thereof identified as open area 2904 and clutter area 2906. As provided herein, an open area may refer to an identified area of the enclosed space, regions and/or portion thereof that is identified as having few or no identified clutter or clutter areas, and is also referred to herein as a non-clutter area. As mentioned, clutter may refer to obstacles occupying a surface and preventing systematic and deterministic coverage of the surface in ranks (rows). In some embodiments, an entire region of a segmented map may be determined to be an open area or a clutter area. Some embodiments provide that an open area and/or a clutter area may be defined as a portion of a region, also referred to herein as a sub-region. For example, the clutter area 2906 is a portion of a region that also includes defined open areas 2904. Also, an open area 2904 may include small areas of clutter therein. As shown in FIG. 29A, the displayed segmentation map 2902 may visually highlight these differently-classified sub-regions 2904 and 2906, for example, by displaying visually-distinct boundaries around the clutter area 2906 and the non-clutter areas 2904.

In some embodiments, the clutter area may be determined based on a clutter density determination. For example, some embodiments provide that clutter density may be determined by measuring dimensions between specific clutter points and nearby obstacles or clutter points. This dimension and/or function thereof may be compared to some dimension of the robot and/or portion thereof. A result of the comparison may determine whether or not to classify the obstacle as clutter. For example, if the measured distance is less than a threshold that is based on a dimension of the robot, then the obstacle may be determined to be clutter. Relative dimensions of the robot may include total robot length, width, and/or cleaning head work width, among others. Non-limiting examples include a range of about 70% to about 300% of the work width of the cleaning head. In other words, obstacles that are spaced apart by a distance of about 70% to about 300% of the width of the cleaning head or roller(s) of the robot may constitute (or be interpreted as) "clutter" because the robot cannot traverse floor space occupied by such obstacles in unimpeded, deterministic ranks. In the example of FIG. 29A, the lowermost area shown is classified as an open or non-clutter area 2904 based on the relatively low density of clutter 2908 therein.

Once the open areas 2904 and/or the clutter areas 2906 are identified, a route and strategy for cleaning the different areas of the surface of the enclosed space, also referred to herein as a coverage pattern, may be determined by the mobile robot 100, the robot management node 200, and/or the user device 202. The coverage pattern may define an improved or optimized cleaning strategy that treats areas differently with respect to their recognized context or classification, for instance, by indicating sequential cleaning of regions or sub-regions of the surface based on their respective classifications. For example, the coverage pattern may indicate first executing cleaning of the open areas 2904 as shown in FIG. 29B so as to temporarily ignore and avoid the clutter areas 2906, then executing cleaning of the clutter areas 2906 as shown in FIG. 29C, and then executing cleaning of the perimeter 2930 as shown in FIG. 29D.

Figure 29B:
Figure 29C:
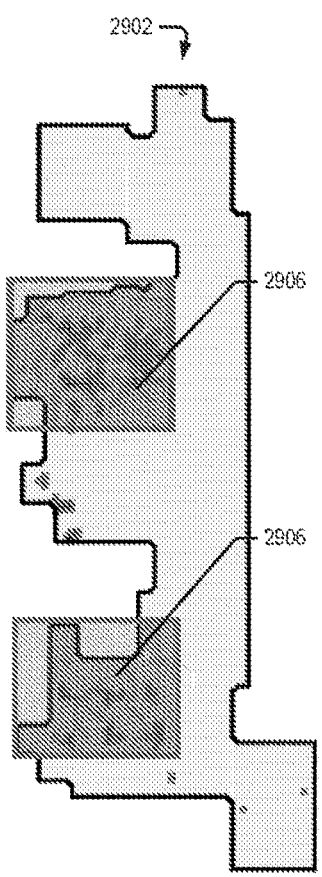

Referring to FIG. 29B, in performing the open area cleaning, a rank direction 2910 may be determined for each of the open areas 2904. In some embodiments, the rank direction 2910 may correspond to the longest dimension in the given region. However, some embodiments provide that the rank direction is based on the dimensionality of the open area that may be different from that of the region, for example, as specified by a user input. Once the cleaning operation of the open areas is determined, then an open area cleaning operation may be performed. This improves efficiency in some embodiments because the robot is not slowed by navigation of clutter (and associated battery depletion) in areas 2904. As the open areas 2904 can represent a majority of the floor space to be cleaned, the robot can complete cleaning of a majority (for example, up to 80% to 90% or more) of the floor space first, and then focus on the more laborious and potentially mission-disrupting clutter areas 2906. For example, the robot could be trapped between chairs or other furniture in cleaning the clutter areas 2906 in some instances, thereby disrupting the cleaning mission with respect to open areas 2904.

The open area cleaning may include determining advantageous locations for ending the cleaning operation in a particular region or portion thereof. For example, a cleaning operation for a first space that ends proximate a planned starting point for a next region to be cleaned may reduce the unnecessary traversal across a region or portion thereof that has already been cleaned. In some embodiments, the next region to be cleaned may be determined based on its proximity to the ending point of the previous cleaning operation. For example, the room adjacent the closest doorway at the completion of the current cleaning operation may be selected to be the next region and/or portion thereof to be cleaned.

Figure 29D:
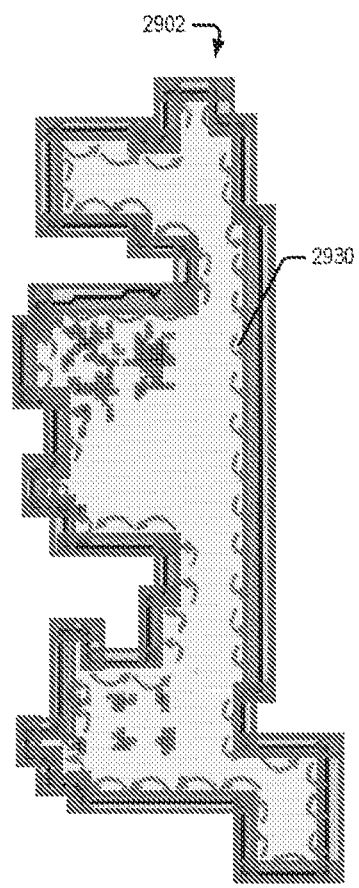
Figures 30A, 30B, 30C, 30D:
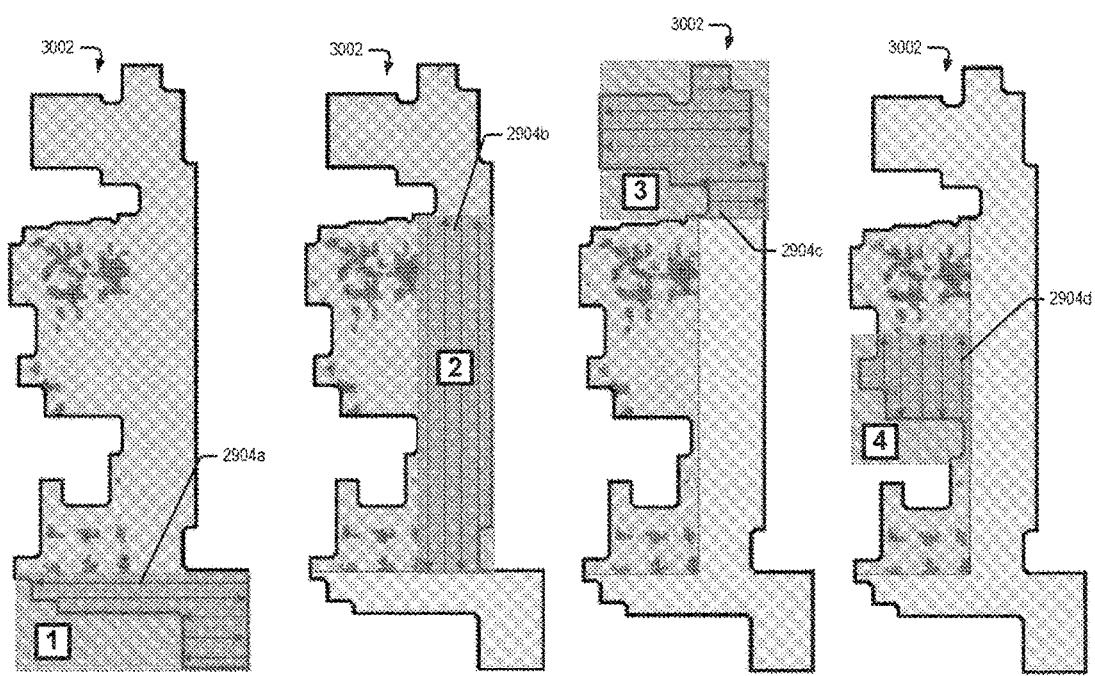
FIGS. 30A through 30G are graphical representations that may be displayed via a user interface of a communication device for user selection of respective area-specific cleaning operations and/or a sequence of performing the area cleaning operations according to some embodiments of the present invention.
Figure 30E:
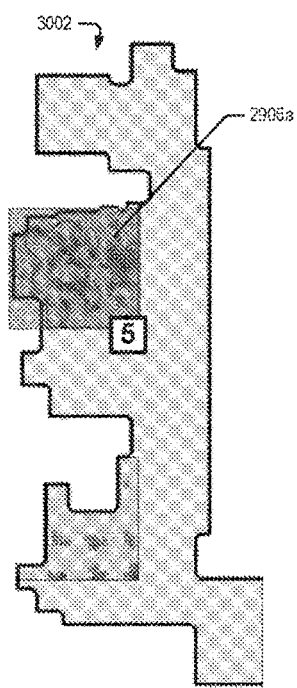
Figure 30F:
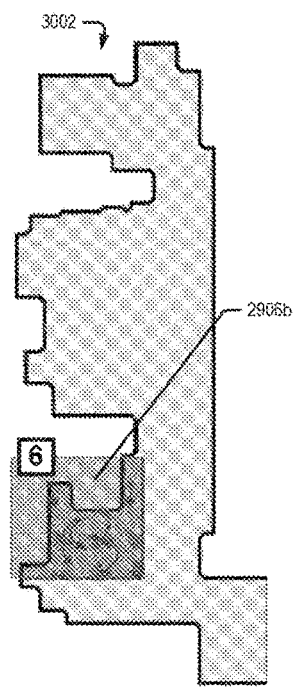
Figure 30G:
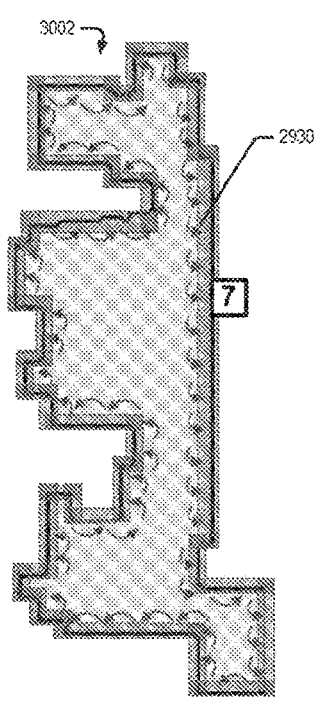

In the examples of FIGS. 29A through 29D, the coverage pattern indicates sequential navigation of differently-classified areas, that is, once the open area cleaning operation is performed, the clutter area cleaning operation is performed. For example, FIG. 29C illustrates the remaining uncleaned areas are the clutter areas 2906 and the cleaning path for cleaning those areas (shown by arrows indicating a random pattern of movement within the clutter areas 2906). As illustrated in FIG. 29D, once the open areas and clutter areas are cleaned, a perimeter cleaning operation may be performed along the perimeter 2930 of the enclosed space.

It will be understood that the coverage pattern may not be determined and/or modified upon initial detection of the clutter areas 2906, as learning and generation of the map 2902 may require that at least one navigation or cleaning operation has been performed. That is, in computing the coverage patterns as described herein, clutter detection may be based on several navigations of the surface using persistent map data. For example, detected obstacles may be stored in a data store, such as the data store 2106 in the cloud 2104, after each navigation. By comparing obstacles and/or structures from several maps generated over time, probabilities may be computed for each region of the surface, denoting the degree or density of static versus dynamic obstacles (such as walls versus clutter) therein, which may be used to classify the regions as clutter areas 2906 or open areas 2904. This information can also be displayed via a user interface of the user device 202, so that the classification of the regions as clutter areas 2906 or open areas 2904 is observable by a user.

More particularly, after multiple navigations of the surface, the robot 100 may be better informed about regions in which the locations of obstacles may change over time, and such regions can therefore be classified as clutter areas 2906. Other regions may be determined as being static, such as either static free or static occupied, and may be classified as open areas 2904. Based on this information, a coverage pattern or cleaning strategy can be computed. For example, the coverage pattern may specify cleaning of the open areas 2904 more efficiently in a ranking pattern (as shown in FIG. 29B), and cleaning the clutter areas 2906 in an edge cleaning pattern (as shown in FIG. 29C). These example cleaning behaviors shown in FIGS. 29B and 29C in response to the determined coverage pattern can be observed and distinguished. In a particular example, the robot 100 may first clean efficiently all static free areas 2904 by ranking without entering clutter areas 2906. After completing cleaning of the open areas 2904, the robot 100 may perform the edge cleaning behavior by traversing all cluttered areas 2906 sequentially. Also, in some embodiments, the robot 100 may repeatedly execute the same pattern during subsequent navigations of the surface. However, when the environment is changed (for example, when clutter is removed from one or more of the clutter areas 2906), the computed coverage pattern may be modified by re-classifying one or more of the clutter areas 2906 as an open area 2904, resulting in a change in the behavior of the robot 100 in navigation of the same surface after the re-classification.

For example, in FIG. 29A, elongated open area 2904 may represent the entrance corridor of a house. The majority of such a corridor may be free, so that people can walk when entering or leaving the house. The lowermost clutter area 2906 to the left of the elongated open area 2904 may be a place where people leave their shoes when entering the house. In this area 2906, the robot 100 may therefore frequently bump into these obstacles (shoes) or otherwise detect the obstacles via a non-contact sensor (for example, a PixArt sensor). In addition, the arrangement of the shoes will typically differ each time the robot 100 cleans the area 2906, because the placement of the shoes may frequently change over time. Consequently, the robot 100 can learn and classify this particular area 2906 as dynamically changing (and thus, cluttered), whereas portions of the elongated corridor 2904 (such as the middle and lower areas of the corridor) can be learned and classified as static free (such as traversable, open floor space).

Accordingly, a coverage pattern may be determined and provided to the robot 100 such that the robot 100 first cleans the elongated corridor 2904 by efficient ranking without entering the shoe-cluttered area 2906. After executing the cleaning of the elongated corridor 2904, the robot 100 will sequentially clean the clutter area 2906 (to the left of the corridor) by edge cleaning, according to the coverage pattern. However, if people subsequently begin placing shoes near the right wall of the elongated corridor 2904 (and no longer in the area 2906 to the left), the area classifications and coverage pattern may be modified responsive to detection of this change after subsequent navigations, and the robot 100 may observably alter its cleaning behavior after a few cleaning runs. More particularly, the coverage pattern may be modified such that, in response to the coverage pattern, the robot 100 may first clean the now-open area (formerly classified as clutter area 2906) on the left side of the elongated corridor 2904, and then execute edge cleaning on the shoe-cluttered area along the right wall of the elongated corridor 2904. More generally, there may be multiple indications of clutter detection during navigation of the robot 100. These may include, but are not limited to, display and marking of the clutter areas 2906 and open areas 2904 via the user interface of a user device 202, different behavior of the robot 100 in navigating the open areas 2904 and clutter areas 2906, and repeated execution of the different behaviors in the same order or sequence (as well as changes to the repeated execution responsive to changes in the environment).

In some embodiments, the computing of the coverage pattern and the cleaning of the identified areas of the surface by the mobile robot 100 may be responsive to receiving a selection of regions/sub-regions to be cleaned, a cleaning sequence/priority, cleaning patterns, and/or a level of cleaning from a user device, for example, via a user interface 410 of the wireless communication device 400 or other user device 202. FIGS. 30A through 30G are graphical representations of segmentation map views 3002 that may be displayed via a user interface of a user device illustrating operations for user selection of respective area-specific cleaning operations and/or preferences to define the coverage pattern according to some embodiments of the present invention. For example, the segmentation maps 3002 of FIGS. 30A-30G may visually highlight the differently-classified regions to allow user selection of initial cleaning of the open areas 2904 and the sequence in which open areas 2904a, 2904b, 2904c, and 2904d are to be cleaned (illustrated in FIGS. 30A-30D by numerals 1-4), subsequent cleaning of the clutter areas 2906 and the sequence in which clutter areas 2906a and 2906b are to be cleaned (illustrated in FIGS. 30E-30F by numerals 5-6), and completion of cleaning by performing perimeter coverage of the perimeter 2930 of FIG. 29D (illustrated in FIG. 30G by numeral 7). In performing user-defined area cleaning operations based on the coverage pattern, the mobile robot 100 may treat areas selected for subsequent cleaning as a keep-out zone, until cleaning of the current area is completed. In some embodiments, the mobile robot 100 may traverse the differently-classified sub-regions 2904a-d in substantially linear rank directions corresponding to a longer dimension of the regions or sub-regions, and may further traverse the sub-regions 2906 in arcs or other non-linear patterns so as to navigate systematically around corners.

Figure 31A:
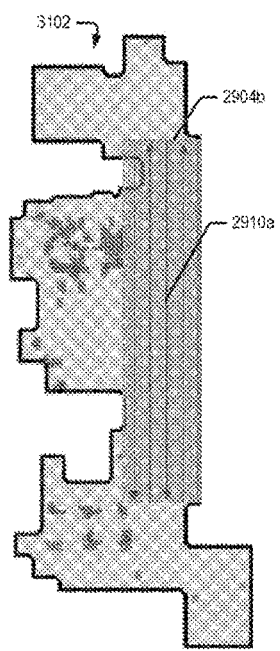
FIGS. 31A through 31C are graphical representations that may be displayed via a user interface of a communication device for user selection of cleaning patterns for open area cleaning operations according to some embodiments of the present invention.
Figure 31B:
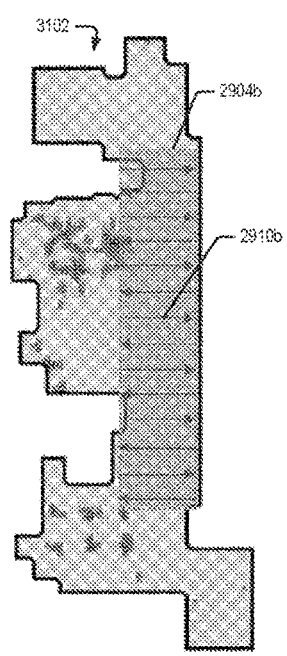
Figure 31C:
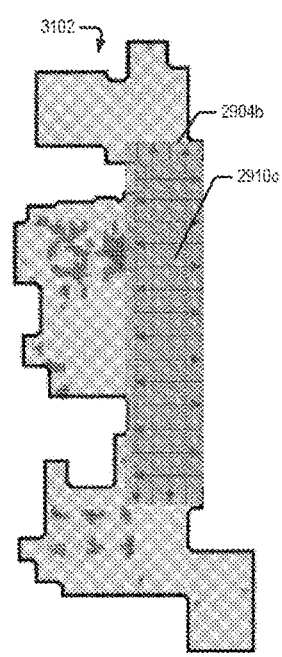

Such user-defined area cleaning operations may also allow for user selection of cleaning patterns (including the direction of travel) and/or cleaning level (including the number of passes) performed by the mobile robot 100 in executing the cleaning operations, thereby allowing for user-assigned cleaning levels. FIGS. 31A through 31C are graphical representations of segmentation map 3102 that may be displayed via a user interface of a user device for user selection of cleaning patterns for cleaning of the open area 2904b shown in FIG. 30B. The segmentation maps 3102 displayed via the user interface may thus allow for selection of a north-south rank direction 2910a, a west-east rank direction 2910b, or a criss-cross rank direction 2910c in the non-clutter region 2904b. A level of thoroughness of the cleaning (for example, a single cleaning pass or multiple cleaning passes in each direction of travel) may also be selected for each of the directions of travel 2910a-2910c. That is, in accordance with embodiments described herein, a coverage pattern may be determined not only based on the differently-classified sub-regions of a surface, but also based on user-specified parameters, including direction of travel, levels of cleaning, and/or order or priority of cleaning. User inputs labeling one or more regions of the segmentation map may further facilitate and/or optimize cleaning operations performed by a mobile robot as described herein.

Figure 32:
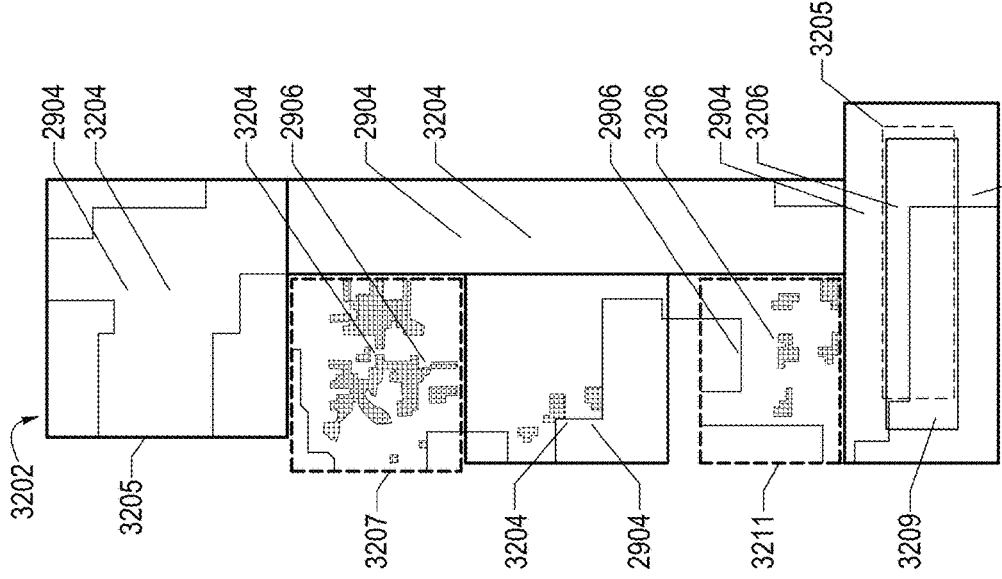
FIG. 32 is a graphical representation that may be displayed via a user interface of a communication device illustrating detection and/or user selection of floor types for area-specific cleaning operations according to some embodiments of the present invention.

Determining coverage patterns based on classification of clutter and non-clutter areas and/or user-defined area cleaning operations described herein with reference to FIGS. 29A-29D may also be based on flooring type (for example, wet cleaning of hard floors, dry cleaning of carpeted floors). FIG. 32 is a graphical representation of a segmentation map view 3202 that may be displayed via a user interface of a user device illustrating detection and/or user selection of floor types for area-specific cleaning operations according to some embodiments of the present invention. As shown in FIG. 32, the graphical representation 3202 may indicate flooring types including hard floor 3204 and soft floor or carpet 3206, in combination with the detected clutter areas 2906 and open areas 2904. That is, the clutter areas 2906 and open areas 2904 may be further identified as hard floor open areas 3205, hard floor clutter areas 3207, soft floor open areas 3209, and soft floor clutter areas 3211, based on detection or user indication of the corresponding flooring type. Also, areas identified as clutter 2906 or open 2904 may include more than one floor type 3206 or 3204, or vice versa. For example, the lowermost open area 2904 shown in FIG. 32 includes both a soft floor/carpet area 3206 and a hard floor area 3204.

The flooring types 3204, 3206 may be detected by the robot 100 during navigation of the surface based on inputs from one or more sensors thereof, and/or based on receiving identification of the floor types corresponding to one or more regions of the segmentation map 3202 from a user device via a user interface. For example, detection of the flooring types 3204, 3206 may be performed by the robot 100 as described in U.S. Patent Application Publication No. 2016/0235270 to Santini, filed Feb. 13, 2015, the disclosure of which is incorporated by reference herein. Also, although only hard floor 3204 and carpeted floor 3206 types are shown, it will be understood that additional flooring types, such as types of hard floor (for example, wood or concrete) and/or types of carpet (for example, shag or Berber) may also be detected by the robot 100 and/or specified via the user interface. Also, the type of cleaning operations (for example, wet or dry cleaning) to be performed by the robot 100 may be determined responsive to detection or identification of the flooring types 3204, 3206.

User-indicated flooring types (as received, for example, via the user interface) may also be aligned or otherwise determined to correspond with the flooring types 3204, 3206 detected by the robot 100 based on sensor inputs and/or machine learning. For example, via the user interface, a user may draw or otherwise define a boundary 3205 around a rug 3209 in lowermost open area 3204 shown in the map 3202 to indicate that it corresponds to a carpet area and/or a keep-out zone. The robot 100 may also detect (for example, using an acoustic sensor) edges of the rug 3209 on a hard floor area 3204; however, it may be determined that the user-defined boundary 3205 (as displayed on the map 3202) does not exactly correspond to the actual boundaries of the rug 3209 as detected by the robot sensor(s). For example, as shown in FIG. 32, the user defined boundary 3205 is shifted relative to the boundaries of the rug 3209. In response to detecting this discrepancy, the robot 100 may recognize a margin of error associated with the user-defined boundary 3205 based on the displayed map 3202 relative to the detected boundaries of the rug 3209 (particularly as the map 3202 may be simplified for display via the user interface), and may verify its detection of the transition between the hard floor area 3204 and the soft floor area 3206 responsive to the user-defined boundary 3205. In some embodiments, the user-defined boundary 3205 may be adjusted on the displayed map 3202 to correspond to the detected boundaries of the rug 3209, for example by shifting, re-sizing, or otherwise re-aligning the user defined boundary 3205 on the map 3202.

Coverage patterns based on user-defined area cleaning operations as described herein may be further improved by employing room-by-room cleaning, for example, based on room segmentation operations described herein. In some instances, room-by-room cleaning operations may allow for cleaning time reduction of up to 50%. Also, cleaning performance may be further improved when based on persistent mapping (for example, by updating static versus dynamic areas of an operating environment over time) in combination with user labeling of areas and/or context-sensitive behaviors. For example, in based on the determined coverage pattern, the robot 100 may perform edge cleaning responsive to encountering a perimeter or boundary after completing open area cleaning. As another example, after completing clutter area cleaning, the robot 100 may not traverse a previously-cleaned open area in the same rank direction that was used to clean the open area. The operations to compute the coverage patterns described herein may be performed by the robot 100, the robot management server 200, and/or the user device 202.

Clutter detection and classification operations described herein may utilize the occupancy data collected by a robot 100 in combination with feedback received from a user device in some embodiments. For example, objects (including static objects such as walls and dynamic objects such as clutter) can be detected by the robot 100 using a classifier including hard-coded or programmed rules. The programmed rules may be based on, for example, object area and eccentricity, object solidity, and/or object similarity to linear structures. However, as noted above, objects defined by pixels that appear to be attached to a detected boundary can be interpreted as being merged into walls. Such inaccurate interpretation of the collected occupancy data may result in generation of inaccurate maps for presentation to the user.

Figures 34A, 34B, 34C:
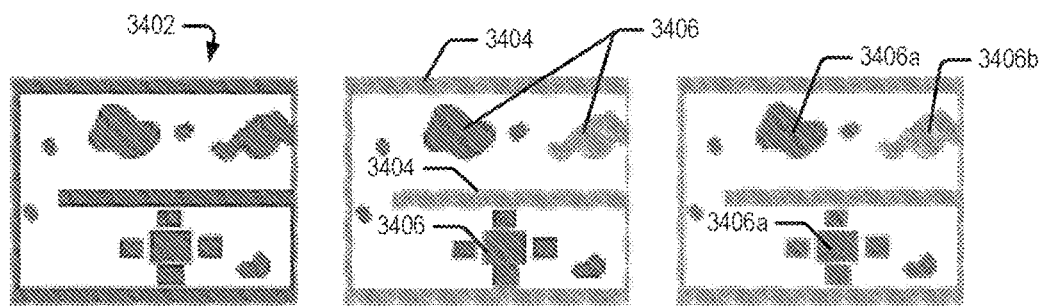
FIGS. 34A through 34F are graphical representations that may be displayed via a user interface of a communication device illustrating object detection operations according to some embodiments of the present invention.
Figures 34D, 34E, 34F:
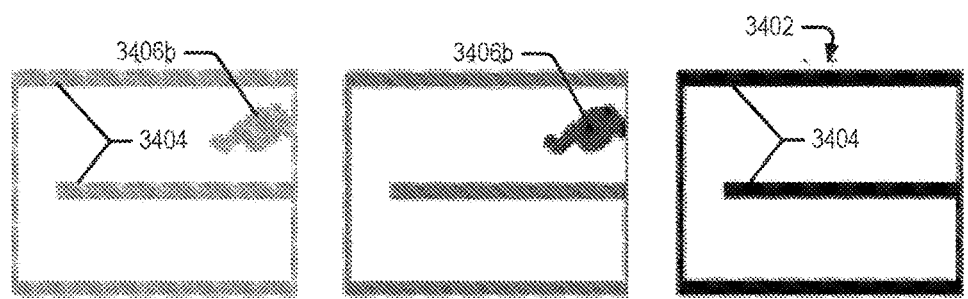

As such, in some embodiments, the classifier may be trained based on the occupancy data collected by the robot 100, and further fine-tuned based on feedback input received from a plurality of users. In particular, patterns of clutter identified by one user can be stored in a data store (for example, the data store 2106 of FIG. 21) and utilized by other users and/or robots, for example using convolutional neural net (CNN)-based object detection. FIGS. 34A through 34F illustrate example operations for distinguishing and removing clutter from map data. In particular, an occupancy or grid map 3402 generated based on data collected by navigation of the mobile robot (as shown in FIG. 34A) may be used to detect and distinguish pixel areas 3406 representing objects from pixel areas 3404 representing background areas (as shown in FIG. 34B). More particularly, from the map 3402 shown in FIG. 34A, a boundary 3404 shown in FIG. 34B is extracted, and the pixel areas 3406 representing objects are classified as boundary-detached obstacle pixels 3406a and boundary-attached obstacle pixels 3406b in FIG. 34C. The boundary-detached obstacle pixels 3406a are removed as shown in FIG. 34D, such that boundary-attached obstacle pixels 3406b remain as shown in FIG. 34E. In some embodiments, the boundary-attached obstacle pixels 3406b may be identified and classified as clutter (rather than as a wall) by accessing a data store including ground truth information generated at least in part from labeling inputs received from multiple users. The boundary-attached obstacle pixels 3406b are thereby removed such that only the boundaries 3404 representing walls remains in the grid map 3402 as shown in FIG. 34F.

A data store, such as the data store 2106 described above, that may be used in identifying and classifying pixels as clutter may be generated from user inputs labeling particular structures as walls (static structures) or clutter (dynamic structures). CNN-based object detection may be performed remote from the mobile robot 100, for example, by the robot management server 200 and/or other cloud server in some embodiments. The CNN classifier may be pre-trained using stored classification data collected by many robots (for example, based on static maps collected from robot navigation), and fine-tuned using stored data generated from user feedback received from one or more user devices.

Figure 35A:
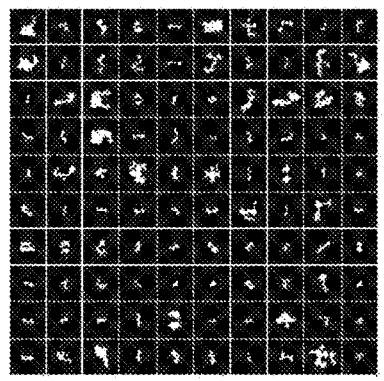
FIGS. 35A through 35D are graphical representations illustrating operations for clutter classification and feature extraction according to some embodiments of the present invention.
Figure 35C:
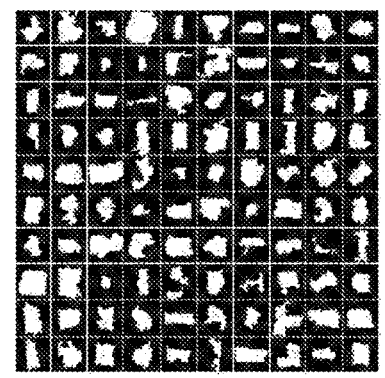
Figure 35B:
Figure 35D:

FIGS. 35A through 35D illustrate examples of patterns 3504, 3506 that may be stored in the data store and used for clutter classification and feature extraction as described herein. More particularly, FIGS. 35A-35B illustrate patterns 3506 indicating clutter, while FIGS. 35C-35D illustrate patterns 3504 indicating walls, as received and/or identified based on feedback received from a plurality of user labeling inputs. The user labeling inputs may be received via a user interface of the user device, such as the user device 202 and/or the wireless electronic device 400 described herein. Features represented by or corresponding to the patterns shown in FIGS. 35A through 35D may thus be learned and extracted from subsequent occupancy data collected by a robot 100 using, for example, an autoencoder. The patterns and/or shapes shown in FIGS. 35A through 35D may be further classified based on additional user labeling inputs. For example, particular ones of the patterns 3506 indicating dynamic structures in FIG. 35B may be distinguished as kitchen appliances rather than furniture, or vice versa, based on user labeling of the corresponding patterns. Likewise, types of furniture (for example, chairs vs. tables) may be distinguished responsive to accessing a data store that maintains an archive of user labeling inputs classifying types and sub-types of clutter, which may be subsequently used by one or more mobile robots in recognizing such patterns in one or more different operating environments. In further embodiments, pattern-based object detection in accordance with FIGS. 35A through 35D may used or combined with image-based data for image classification.

Figures 36A, 36B, 36C:
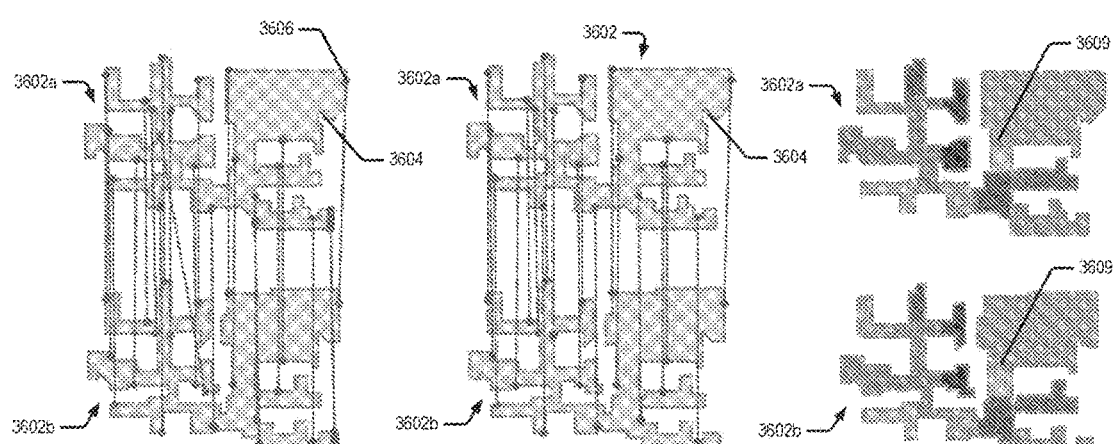
FIGS. 36A through 36C are graphical representations illustrating operations for updating persistent map data by feature matching and segmentation transfer between multiple maps according to some embodiments of the present invention.

FIGS. 36A through 36C are graphical representations illustrating operations for updating persistent map data by segmentation transfer and feature matching between multiple maps according to some embodiments of the present invention. In particular, grid maps 3602a, 3602b of an operating environment generated from occupancy data collected by a mobile robot 100 may differ from day-to-day navigation of the operating environment. These differences may arise, for example, from sensor noise and/or differing placement or movement of clutter (including people, animals, and/or furniture) in the operating environment.

In order to maintain consistent segmentation in such a dynamic operating environment, embodiments herein may transfer segmentation between maps collected at different times and/or under different conditions. Operations for such segmentation transfer may include feature matching (as shown in FIG. 36A) and outlier removal (as shown in FIG. 36B). Feature matching may include updating a subsequently obtained map 3602b of the operating environment with one or more features identified from a previous map 3602a, for example, by matching boundaries and/or correlating shapes that are common to the multiple maps 3602a, 3602b that were generated from occupancy data detected at different times and/or under different conditions in the same operating environment. The features 3606 that are present or persistent in multiple maps 3602a, 3602b may be recognized as corresponding to static features, such as walls or other non-movable structures. Outlier removal may include deleting areas 3604 (for example, doorways and/or hallways) appearing in some of the maps 3602a, 3602b but not in others. Feature matching operations can be based both on imaging and non-imaging data collected by the robot, for example, based on bumper hits captured by non-imaging sensors as well as images captured by the camera of the mobile robot.

Also, boundaries 3609 indicating room segmentation can be transferred between maps 3602a, 3602b that are generated based on occupancy data collected at different times and/or operating conditions (as shown in FIG. 36C). User inputs and/or modifications to a segmentation map displayed via a user interface of a user device may also be transferred in updating maps as described herein. Such maintenance of consistent segmentation 3609 may allow users to observe the same/similar cleaning behavior or sequence at each operation of the mobile robot, increasing predictability of robot operation. Also, transferring segmentation 3609 in updating maps as described herein may allow users to maintain previously-defined editing of the segmentation and/or a previously-defined operating sequence for room-by-room or region-based cleaning. As such, a user may observe relatively stable behavior by the mobile robot despite some changes in the operating environment itself.

Figure 37:
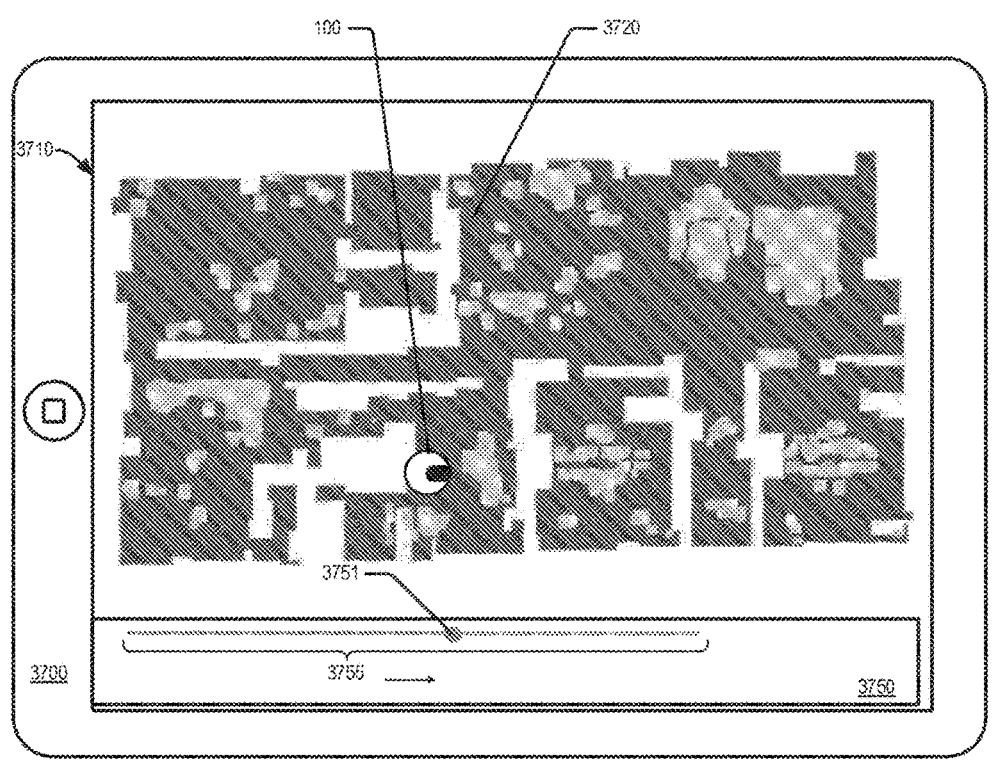
FIG. 37 is a graphical representation that may be displayed via a user interface of a communication device illustrating operation of a mobile robot responsive to user selection of temporal status according to some embodiments of the present invention.

FIG. 37 is a graphical representation that may be displayed via a user interface 3710 of a communication device 3700 illustrating operation of a mobile robot responsive to user selection of temporal status according to some embodiments of the present invention. As shown in FIG. 37, a map indicating navigation of the operating environment by the mobile robot 100 may be generated and stored along with temporal data indicating the times at which the robot was at each location shown in the map. Based on this data, a user input element 3750 (illustrated as a time slider user interface) may be presented via the user interface 3710 of a user device 3700. The user input element 3750 is configured to receive a user specification of a time for which operating state information for the robot 100 is desired. In some embodiments, an animation 3720 illustrating the location and operation of the mobile robot 100 may be generated and displayed responsive to receiving a user selection of a particular time or times via the user input element 3750.

More particularly, in the example of FIG. 37, the time-slider bar 3750 is configured to receive a user input that manipulates slider element 3751 to respective positions along a length of bar element 3755. The bar element 3755 visually represents a temporal range for which operating state information for the robot 100 been stored or is otherwise accessible. Markings indicating may be respective times may be provided along the length of the bar element 3755. The user interface 3710 is configured to detect a position of the slider element 3751 along the length of the bar element 3750 responsive to manipulation of the slider element or other user input, from which the device 3700 is configured to determine the time specified by the user input based on correspondence of the position of the slider element 3751 along the temporal range represented by the bar element 3755. The user interface 3710 is thereby configured to display status indications representing the operating states of the robot 100 that are associated with temporal data corresponding to the time specified by the user input. An animation 3720 illustrating the location and operation of the mobile robot 100 over a selected portion of its run-time may also be displayed responsive to user manipulation of the time-slider bar 3750.

The animation 3720 may visually represent actual robot operating status information (based on actual past or present operation of the robot 100, as previously logged or currently reported), and/or expected robot operating status information (based on scheduled future operation of the robot 100, as specified by a user). The actual and expected/scheduled operating states (and the past, present or future temporal data associated therewith) may be continually logged and updated, and may be stored in a database. For example, in some embodiments, a computing device (such as the robot management node 200) may receive data indicating actual operating states (and associated past or present temporal data) and/or expected operating states (and associated future temporal data) of the robot 100. The data indicating the operating states and associated temporal data may be requested (or "pulled") by the computing device, or may be reported (or "pushed") by the robot 100 and/or network sources in communication therewith. The animation 3720 of cleaning progress may also be presented with various granularity. For example, the cleaning progress on a sub-region or room level may be selected and displayed in an enlarged view, rather than as small squares as shown in FIG. 37. Additionally or alternatively, the animation 3720 may illustrate the trajectory of the robot 100, showing a previous- or real-time path of the robot 100 responsive to user selection. In some embodiments, the time selected via the input element 3750 is associated with a timestamp in a video feed collected and stored by the mobile robot 100, and the user interface 3710 may display images/video captured at that selected time by a camera mounted to the mobile robot 100. More generally, a viewable history 3720 of the instantaneous operation and operating patterns of the mobile robot 100 throughout the operating environment may be displayed at a user-specified time or over a user-specified time range.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. The program code may execute entirely on a user device, a mobile robot, or a remote server described herein, or partly on one or more of each. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing is illustrative of the present invention and is not to be construed as limiting thereof. Although a few example embodiments of this invention have been described, those skilled in the art will readily appreciate that many modifications are possible in the example embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed:

1. A method of operating a mobile robot, comprising:
    executing, by at least one processor, computer readable instructions stored in a non-transitory computer readable storage medium to perform operations comprising:
    receiving, at the mobile robot from a remote device, cleaning mission information, the cleaning mission information comprising an order of cleaning respective demarcated regions of a segmentation map, the segmentation map comprising a representation of a surface segmented to define the respective demarcated regions; and
    performing a cleaning operation based on the cleaning mission information, wherein performing the cleaning operation comprises operating a drive of the mobile robot to sequentially navigate areas of the surface represented by the respective demarcated regions of the segmentation map in the order indicated by the cleaning mission information.

2. The method of claim 1, wherein performing the cleaning operation further comprises operating the drive of the mobile robot to traverse an area of the surface represented by one of the respective demarcated regions in a direction of travel indicated by a rank direction included in the cleaning mission information.

3. The method of claim 2, wherein the rank direction is along a first dimension of the one of the respective demarcated regions that is longer than a second dimension thereof, and wherein operating the drive of the mobile robot to traverse the area of the surface represented by the one of the respective demarcated regions in the direction of travel indicated by the rank direction comprises fewer turns than in a direction of travel along the second dimension.

4. The method of claim 1, wherein the cleaning mission information comprises:
    a first cleaning mission instruction that identifies a first selection of the respective demarcated regions to be cleaned and the order of cleaning therefor, wherein the order of cleaning is indicated by numerical values; and a second cleaning mission instruction that identifies a second selection of the respective demarcated regions to be cleaned, wherein the second selection is different from the first selection.

5. The method of claim 4, wherein performing the cleaning operation comprises:
operating the drive of the mobile robot to navigate areas of the surface represented by the first and second selections of the respective demarcated regions of the segmentation map based on a first scheduled time associated with the first cleaning mission instruction and a second scheduled time associated with the second cleaning mission instruction, respectively.

6. The method of claim 1, wherein the cleaning mission information further indicates at least one of the respective demarcated regions that is not to be cleaned, and wherein performing the cleaning operation further comprises operating the drive of the mobile robot to avoid navigation of an area of the surface represented by the at least one of the respective demarcated regions as indicated by the cleaning mission information.

7. The method of claim 1, further comprising:
updating the segmentation map based on occupancy data that is collected responsive to navigation of the surface; and
transmitting the segmentation map to a mobile terminal for display thereon.

8. The method of claim 7, wherein the segmentation map is based on first occupancy data that is collected responsive to a previous navigation of the surface by at least one mobile robot during a first cleaning mission executed before the cleaning operation, and wherein the updating is based on second occupancy data that is collected responsive to the navigation of the surface by the at least one mobile robot.

9. The method of claim 1, wherein the respective demarcated regions of the segmentation map correspond to respective rooms, and wherein performing the cleaning operation comprises operating the drive of the mobile robot to complete navigation in an area of the surface corresponding to one of the respective rooms before traversing an area of the surface corresponding to a next one of the respective rooms based on the order indicated by the cleaning mission information.

10. The method of claim 1, further comprising:
transmitting room-based statistical information for one or more respective rooms to a mobile terminal for display thereon, wherein the one or more respective rooms correspond to the respective demarcated regions of the segmentation map.

11. The method of claim 1, wherein the cleaning mission information comprises:
a first cleaning mission instruction that indicates the order of cleaning the respective demarcated regions; and
a second cleaning mission instruction that indicates a date or time for cleaning the respective demarcated regions, wherein performing the cleaning operation comprises operating the drive of the mobile robot to sequentially navigate the areas of the surface represented by the respective demarcated regions of the segmentation map at the date or time indicated by the second cleaning mission instruction and in the order indicated by the first cleaning mission instruction.

12. A method of operating a mobile terminal, comprising:
executing, by at least one processor, computer readable instructions stored in a non-transitory computer readable storage medium to perform operations comprising:
displaying, via a user interface of the mobile terminal, an image of a segmentation map including respective demarcated regions, the segmentation map comprising a representation of a surface segmented to define the respective demarcated regions, and the segmentation map being based on occupancy data that is collected responsive to navigation of the surface by at least one mobile robot;
receiving, via the user interface, a selection of a cleaning operation that indicates an order of cleaning for one or more of the respective demarcated regions; and
transmitting cleaning mission information comprising the selection, wherein the cleaning mission information instructs the at least one mobile robot to sequentially navigate one or more areas of the surface represented by the one or more of the respective demarcated regions in the order.

13. The method of claim 12, further comprising:
receiving, via the user interface, a selection of one of the respective demarcated regions of the segmentation map, wherein the respective demarcated regions correspond to respective rooms,
wherein displaying the image of the segmentation map comprises displaying room-based statistical information for the one of the respective demarcated regions responsive to the selection thereof.

14. The method of claim 12, wherein the selection indicates a cleaning pattern including one or more directions of travel in the one or more of the respective demarcated regions, and wherein the cleaning mission information instructs the at least one mobile robot to traverse one or more areas of the surface represented by the one or more of the respective demarcated regions based on the cleaning pattern.

15. The method of claim 12, wherein the selection indicates a cleaning level including a number of passes in the one or more of the respective demarcated regions, and wherein the cleaning mission information instructs the at least one mobile robot to repeatedly traverse one or more areas of the surface represented by the one or more of the respective demarcated regions based on the number of passes.

16. The method of claim 12, wherein the selection image of the segmentation map displayed via the user interface numerically indicates the order of cleaning the one or more of the respective demarcated regions.

17. The method of claim 12, wherein the selection indicates at least one of the respective demarcated regions that is not to be cleaned, wherein the image of the segmentation map displayed via the user interface indicates the at least one of the respective demarcated regions that is not to be cleaned, and wherein the cleaning mission information instructs the at least one mobile robot to avoid navigation of at least one area of the surface represented by the at least one of the respective demarcated regions.

18. The method of claim 12, further comprising:
receiving, via the user interface, a zoom selection,
wherein displaying the image of the segmentation map comprises displaying an enlarged view of the image of the segmentation map based on the zoom selection.

19. The method of claim 12, wherein displaying the image of the segmentation map further comprises displaying a rank direction indicating a direction of travel of a mobile robot in at least one of the respective demarcated regions of the segmentation map.

20. The method of claim 12, further comprising:
updating the segmentation map based on occupancy data that is collected responsive to a subsequent navigation of the surface during a subsequent cleaning mission executed after the cleaning operation, wherein displaying the image of the segmentation map comprises displaying an updated image of the segmentation map based on the updating.

21. The method of claim 12, further comprising:

receiving, via the user interface, a user input to modify the image of the segmentation map, the user input comprising a divide region input or a combine region input, wherein displaying the image of the segmentation map comprises displaying a modified image of the segmentation map responsive to the user input, wherein the modified image comprises a division of one of the respective demarcated regions into more than one region or a combination of two or more of the respective demarcated regions into one region.

22. A method of operating a mobile robot, comprising:

executing, by at least one processor, computer readable instructions stored in a non-transitory computer readable storage medium to perform operations comprising:

receiving, at the mobile robot from a remote device, cleaning mission information for respective demarcated regions of a segmentation map, the segmentation map comprising a representation of a surface segmented to define the respective demarcated regions that represent respective rooms, wherein the cleaning mission information comprises:

a first cleaning mission instruction that identifies a first selection of the respective demarcated regions to be cleaned in a first cleaning mission; and a second cleaning mission instruction that identifies a second selection of the respective demarcated regions to be cleaned in a second cleaning mission, the second selection being different from the first selection; and performing a cleaning operation based at least in part on the cleaning mission information, wherein performing the cleaning operation comprises:

operating a drive of the mobile robot to sequentially navigate ones of the respective rooms represented by the first selection in executing the first cleaning mission; and then operating the drive of the mobile robot to sequentially navigate ones of the respective rooms represented by the second selection in executing the second cleaning mission at a time that is different from the first cleaning mission.

\* \* \* \* \*